United States Patent [19]
Takekoshi et al.

[11] Patent Number: 5,825,022
[45] Date of Patent: Oct. 20, 1998

[54] POLARIZER, INCLUDING THIN POLARIZING FILM, OPTICAL ELEMENT WITH POLARIZER, OPTICAL HEAD WITH POLARIZER AND METHODS AND APPARATUS FOR FORMING SAME

[75] Inventors: Taro Takekoshi; Masatoshi Yonekubo; Takashi Takeda; Toshio Arimura, all of Suwa, Japan

[73] Assignee: Seiko Epson Corporation, Tokyo, Japan

[21] Appl. No.: 637,033

[22] Filed: Apr. 30, 1996

Related U.S. Application Data

[63] Continuation of Ser. No. 204,351, Mar. 11, 1994, abandoned.

[30] Foreign Application Priority Data

| Jul. 14, 1992 | [JP] | Japan | 4-186885 |
| Mar. 17, 1993 | [JP] | Japan | 5-057431 |
| Mar. 23, 1993 | [JP] | Japan | 5-064348 |

[51] Int. Cl.⁶ .................................................. G02B 5/30
[52] U.S. Cl. ................... 250/225; 250/201.5; 359/485; 359/490
[58] Field of Search ............... 250/201.5, 201.4, 250/201.2, 201.1, 216, 225; 369/44.14, 44.37; 359/720, 625, 626, 629, 637, 639, 640, 485, 487, 488, 489, 490, 494, 495, 496, 497, 500, 583, 586, 587

[56] References Cited

U.S. PATENT DOCUMENTS

| 4,733,065 | 3/1988 | Hoshi et al. . | |
| 4,764,912 | 8/1988 | Ando et al. . | |
| 4,933,924 | 6/1990 | Yonekubo . | |
| 4,973,836 | 11/1990 | Matsuoka | 250/201.5 |
| 5,422,870 | 6/1995 | Kojima et al. . | |
| 5,559,634 | 9/1996 | Weber | 359/638 |
| 5,563,869 | 10/1996 | Horimai et al. | 369/112 |
| 5,568,315 | 10/1996 | Shuman | 250/225 |
| 5,612,820 | 3/1997 | Schrenk et al. | 359/498 |

FOREIGN PATENT DOCUMENTS

| A-0 573905 | 12/1993 | European Pat. Off. . |
| A 61-17103 | 1/1986 | Japan . |
| A 1-119929 | 5/1989 | Japan . |
| WO 92/22838 | 12/1992 | WIPO . |

OTHER PUBLICATIONS

M. F. Weber, "23.3: Retroreflecting Sheet Polarizer", Society of Information Display 92 Digest, pp. 427–429, May 1992.

*Primary Examiner*—Que Le
*Assistant Examiner*—John R. Lee
*Attorney, Agent, or Firm*—Oliff & Berridge

[57] ABSTRACT

A plurality of inclined planes (1419) are formed in the same substrate (1406) and a polarizing optical thin film is provided on these inclined planes. These inclined planes are filled with a transparent material so as to form a small sized and complexed polarizer. This polarizer is excellent in transmission ratio and in extinction ratio. With this polarizer, it is possible to detect a magneto-optical signal with a high signal-to-noise ratio. This polarizer is used as a cover of a package (1408) of an optical head in which a light receiving device (1410, 1411) and a light emitting device (1409) are contained in the form of a single piece. There is also provided an optical element capable of adjusting optical paths so that the optical length of a returning optical beam may be different from the optical length of a forward optical beam. With this optical element, it becomes possible to delete the initial offset in a focusing error signal, and thus adjustment process becomes unnecessary. With these arrangements, it is possible to achieve the size reduction, simplification, and improvement of performance associated with an optical head for use in a magneto-optical recording/reproducing device.

23 Claims, 39 Drawing Sheets

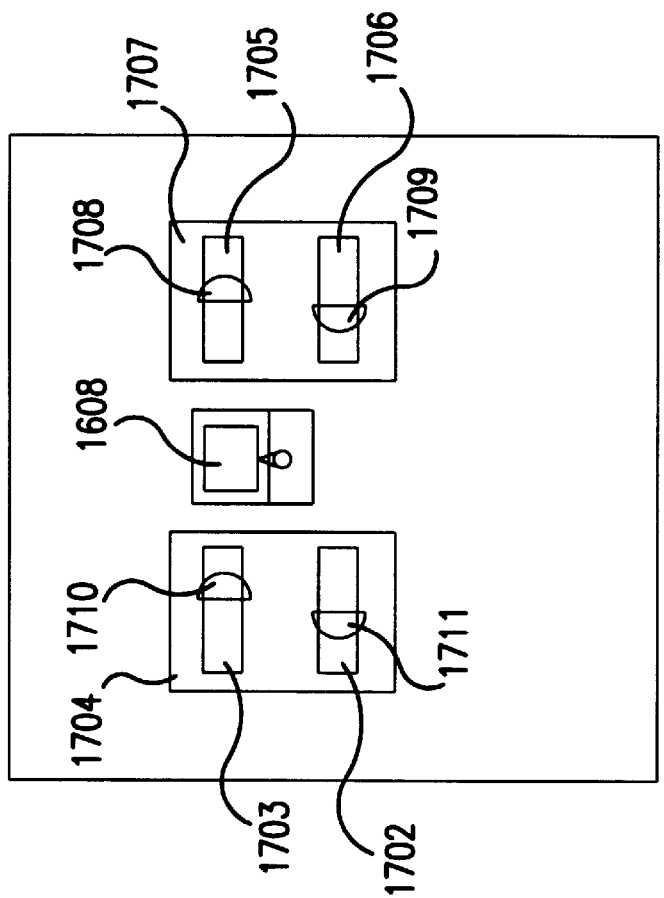
FIG. 24
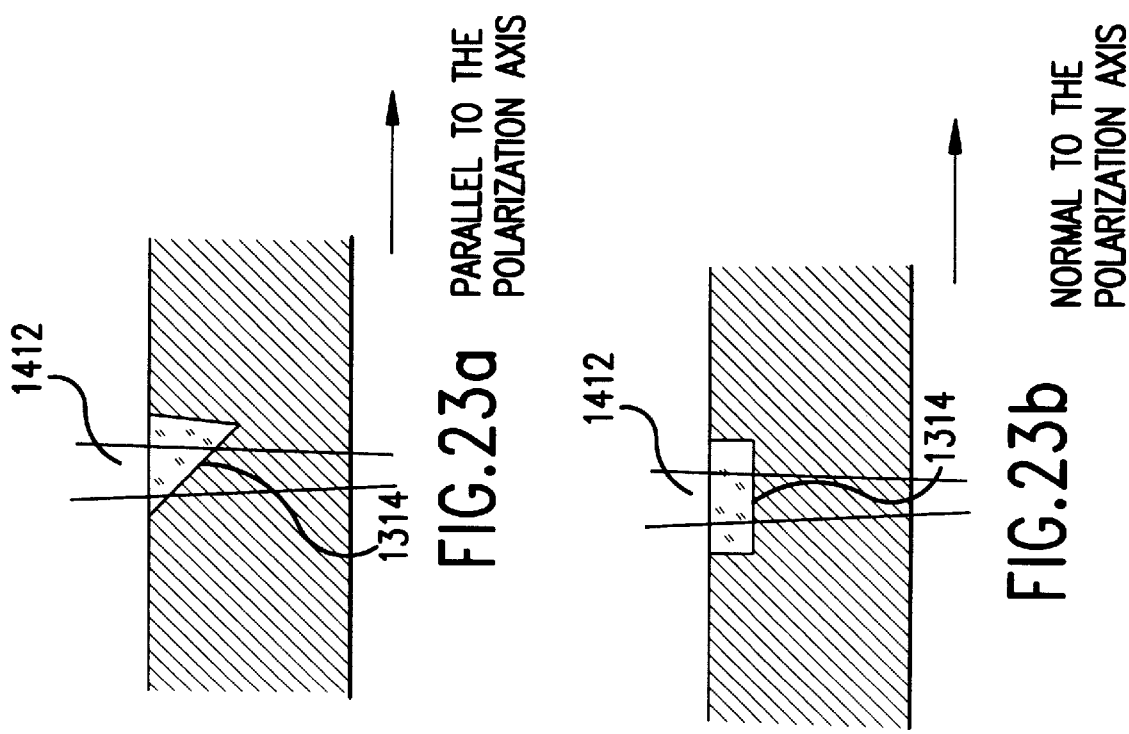
FIG. 23a PARALLEL TO THE POLARIZATION AXIS
FIG. 23b NORMAL TO THE POLARIZATION AXIS

POLARIZER, INCLUDING THIN POLARIZING FILM, OPTICAL ELEMENT WITH POLARIZER, OPTICAL HEAD WITH POLARIZER AND METHODS AND APPARATUS FOR FORMING SAME

This is a continuation of application Ser. No. 08/204,351 filed Mar. 11, 1994, now abandoned.

FIELD OF THE INVENTION

The present invention relates to a polarizer, an optical element, and a small sized optical head constructed with the polarizer and the optical element. In particular, the optical head in accordance with the present invention has a configuration suitable for recording and reproduction of information on a magneto-optical recording medium.

DESCRIPTION OF RELATED ART

A conventional polarizer, such as a polarizing beam splitter, is produced by depositing via vacuum evaporating a thin polarizing optical film on triangular prisms of glass, and further by bonding the triangular prisms to each other. Conventional optical heads for recording and reproducing of information on a magneto-optical recording medium are made, for example, with a polarizing beam splitter as disclosed in U.S. Pat. No. 4,764,912, or with a dichroic polarizing plate as disclosed in U.S. Pat. No. 4,933,924, or with a birefringent prism such as a Wollaston prism. The optical parts used in these techniques are of bulk type that are produced from optical glass by cutting and lapping.

However, conventional dichroic polarizers do not have high transparency. Therefore, it is impossible to obtain a sufficient amount of detected light required for signal detection. In conventional polarizing beam splitters, because a large difference occurs in the directions of detected light, one piece of a dichroic polarizing plate can detect light with respect to only one polarizing direction. On the other hand, a birefringent prism is expensive. Moreover, in the optical heads described above, the bulk-type optical part occupies a large volume and the processing is expensive. In addition, high accuracy positioning is required for various points in the assembly process that makes it difficult to achieve small size, low cost, and light weight. This further leads to sacrifice in performance associated with access speed. The foregoing obstacles have prevented widespread use of conventional optical heads.

Furthermore, the layout of an optical system that includes a separately arranged light emitting device and light detecting device presents a problem. As a result, separate optical parts are required for exclusive use in each optical system along a forward starting path that extends from a light emitting device and a return path that ends at a light detecting device. This leads to undesirable duplication in the number of parts and also in inefficient use of space. In addition, because positioning errors are accumulated, it is difficult to achieve desired positioning accuracy associated with the optical system. As a result, troublesome adjustment is required to eliminate the initial offset in detected signals such as focusing error signals.

SUMMARY OF THE INVENTION

Accordingly, it is an object of the present invention to solve the above problems by providing a thin polarizer with high transparency and a high extinction ratio, and a small sized and inexpensive polarizer formed in a single piece that can perform detection with respect to a plurality of polarization directions.

It is another object of the present invention to provide a means for deleting the initial offset in a focusing error signal to make adjustment unnecessary.

It is a further object of the present invention to provide a method for efficiently producing a polarizer and optical element of the above-mentioned type at a low cost.

It is still another object of the present invention to provide a great reduction in size and in the number of optical parts required for an optical head and also to provide a simplified adjustment process.

It is another object of the present invention to provide a means for obtaining a magneto-optical signal with a high signal-to-noise ratio.

To achieve the objects described above, the present invention provides a polarizer, an optical element, and an optical head as will be described in the following paragraphs.

1. A polarizer in which a sawtooth region is formed at one or more locations on the same transparent substrate. The sawtooth region includes edge lines, a section having a sawtooth-like shape, and a polarizing optical thin film. With this polarizer, it is possible to obtain a polarizing beam splitter having high transmission and extinction ratios. Moreover, it becomes possible to produce a polarizer that is as thin as a conventional dichroic polarizing plate.

2. A polarizer as defined in paragraph 1, wherein the sawtooth region is filled with a transparent material. With this arrangement, it becomes possible to obtain a polarizer in which the direction of a transmitted light beam does not change from the incident direction.

3. A polarizer as defined in paragraph 1, wherein each of vertical angles at the bottom and the top of the shape of the section of said sawtooth region is about 90°. With this arrangement, it becomes possible to obtain a polarizer in which reflected light reflects back in the opposite direction to the incident light and thus little stray light exists.

4. A polarizer as defined in paragraph 1, wherein edge lines in a first sawtooth region are arranged in the direction at angle +A° with respect to a reference direction of said substrate and edge lines in a second sawtooth region are arranged in the direction at angle −A° with respect to the reference direction of said substrate. With this arrangement, it becomes possible that polarization in two different directions is detected by only one polarizer. A high extinction ratio, reduction in the number of parts, and improvement of productivity in the assembly process also are achieved.

5. A polarizer as defined in paragraph 4, wherein said angle A representing the directions of said edge lines is about 45°.

6. A polarizer as defined in paragraph 1, wherein said sawtooth region having said polarizing optical thin film is formed at two locations on said substrate, said sawtooth regions being arranged in said two locations such that the direction of edge lines in one of said sawtooth regions is approximately perpendicular to the direction of edge lines in the other of said sawtooth regions.

7. A polarizer as defined in paragraph 1, wherein said polarizing optical thin film is formed by transferring a sawtooth-like shape to a transparent substrate by means of hot-stamping and further depositing a dielectric thin film on it by means of evaporation. With this arrangement, it becomes possible to obtain a simple polarizer that can be readily mass-produced.

8. A polarizer as defined in paragraph 1, wherein said polarizing optical thin film is formed by pressing and rolling a roller having a sawtooth-shaped structure on its surface on a transparent substrate for continuously transferring a sawtooth-like shape to said transparent substrate and further depositing a dielectric thin film on the transparent substrate by means of evaporation. With this arrangement, it becomes possible to obtain a polarizer more suitable for mass production.

9. A polarizer in which an inclined plane is formed at one or more locations on the same transparent substrate and a polarizing optical thin film is formed on said inclined plane. With this arrangement, it becomes possible to obtain an integrated polarizer with a simple configuration for detecting polarization.

10. A polarizer as defined in paragraph 9, wherein the angle between said inclined plane and the surface of said substrate is about 45°. With this arrangement, it becomes possible to design a polarizing optical thin film that has high performance in the transmission ratio and extinction ratio.

11. A polarizer as defined in paragraph 9, wherein said inclined plane is filled with a transparent material. With this arrangement, it becomes possible to obtain a polarizer in which the direction of a transmitted light beam does not change from the incident direction.

12. A polarizer as defined in paragraph 9, wherein:

inclined planes are formed at four or more locations on the same transparent substrate;

the normal line to each said inclined plane makes an angle equal to or larger than 20° with respect to the chief ray of an incident light beam;

regarding two of said inclined planes, the plane containing the optical axis of the light beam and the normal line to the inclined plane makes an angle of A° with respect to the plane containing the optical axis of the light beam and the polarization direction of the light beam;

regarding the other two of said inclined planes, the plane containing the optical axis of the light beam and the normal line to the inclined plane makes an angle of –A° with respect to the plane containing the optical axis of the light beam and the polarization direction of the light beam; and each of said inclined planes has a polarizing optical thin film. With this arrangement, it becomes possible to obtain a polarizer that can be easily assembled. With this polarizer, signals having the same amplitude with opposite phases can be obtained.

13. A polarizer as defined in paragraph 9, wherein:

inclined planes are formed at two or more locations on the same transparent substrate;

at least two light beams are incident on one inclined plane;

the normal line to each said inclined plane makes an angle of 20° or greater with respect to the chief ray of an incident light beam;

regarding one of said inclined planes, the plane containing the optical axis and the normal line to the inclined plane makes an angle of A° with respect to the plane containing the optical axis and the polarization direction of all the light beams which are incident on said inclined plane;

regarding the other one of said inclined planes, the plane containing the optical axis and the normal line to the inclined plane makes an angle of –A° with respect to the plane containing the optical axis and the polarization direction of all the light beams that are incident on said inclined plane; and each of said inclined planes formed at two locations has a polarizing optical thin film.

With this arrangement, it becomes possible to obtain a polarizer having a more simple structure.

14. A polarizer as defined in paragraph 12 or 13, wherein said angle A is about 45°. With this arrangement, it becomes possible to obtain a polarizer that provides the maximum amplitude of signal.

15. A polarizer as defined in paragraph 9, comprising a first optical member and a second optical member bonded to said first optical member, wherein said polarizer is formed by a method including the steps of:

forming a recess with an inclined plane in either said first optical member or said second optical member;

depositing a multi-layer dielectric thin film on said inclined plane by means of evaporation to obtain a function of a polarizing splitter;

filling said recess with a transparent resin or liquid; and bonding said first and second optical members to each other.

16. A polarizer as defined in paragraph 15, wherein refractive indices of all of said first optical member, said second optical member, and said transparent resin or liquid filled in said recess are nearly equal to each other. With this arrangement, it becomes possible to obtain a polarizer in which the direction of a transmitted light beam does not change from the incident direction.

17. A polarizer as defined in paragraph 15, wherein an optical beam incident on said inclined plane is a convergence or divergence light beam corresponding to a numerical aperture (NA) of 0.15 or less when measured in the medium. When the light beam is in the range of divergence or convergence described above, good polarizing characteristics can be obtained.

18. A polarizer as defined in paragraph 15, wherein said polarizer is produced by a method including the steps of:

coating a multi-layer dielectric thin film on said inclined plane to obtain a function of a polarizing splitter;

filling said recess with a transparent resin;

bonding said first and second optical members to each other; and after the above steps, performing an annealing process.

With this arrangement, it becomes possible to avoid birefringence in the transparent resin.

19. A polarizer as defined in paragraph 1 or 9, wherein the polarizing optical thin film is formed by a method including the steps of:

performing injection molding with a resin or glass so as to transfer a sawtooth structure or at least one inclined plane; and depositing a dielectric thin film on it by means of evaporation. This method can be accomplished by using a conventional molding equipment and evaporation equipment. With this arrangement, mass production becomes possible.

20. A polarizer formed by fixing or holding a polarizing plate or a polarizing film on the surface or in the inside of an optical member. In this arrangement, the polarizing plate is backed with the optical member thus increasing resistance to aging.

21. A polarizer as defined in paragraph 20 that is produced by performing an annealing process after fixing or holding said polarizing plate or said polarizing film on the surface or in the inside of said optical member. With this arrangement, it becomes possible to obtain a polarizer having high resistance to aging.

22. An optical head for use in an optical recording device for recording/reproducing information on/from an magneto-optical recording medium, comprising:
- a semiconductor laser acting as a light source;
- a light beam splitter means for splitting light into at least two directions;
- a light receiving device; and
- a polarizer as defined in paragraph 1, 9, or 20, said polarizer being disposed between said light beam splitter means and said optical receiving device.

With this arrangement, it becomes possible to realize a small sized optical head with a very simple configuration.

23. An optical head as defined in paragraph 22 for use in an optical recording device of said type, having a polarizer as defined in paragraph 9, wherein:
- a light beam that has passed through an inclined plane is sensed by a pair of sensors and the resultant outputs of the sensors are added together, wherein the plane containing the optical axis of the light beam and the normal line to said inclined plane makes an angle of A° with respect to the plane containing the optical axis of the light beam and its polarization direction;
- a light beam that has passed through another inclined plane is sensed by another pair of sensors and the resultant outputs of the sensors are added together, wherein the plane containing the optical axis of the light beam and the normal line to said inclined plane makes an angle of A° with respect to the plane containing the optical axis of the light beam and its polarization direction; and
- the difference between said addition outputs is detected;
- whereby a magneto-optical signal is reproduced.

With this arrangement, it becomes possible to realize an optical head that can be readily assembled and by which signals having the same amplitude with opposite phases can be obtained. Furthermore, because common-mode noise can be rejected, it is possible to obtain a magneto-optical signal with a high signal-to-noise ratio.

24. An optical head as defined in paragraph 22, wherein said light beam splitter is a hologram consisting of a diffraction grating. With this arrangement, it becomes possible to obtain a small sized optical head with a simple configuration which can be readily mass-produced.

25. An optical head as defined in paragraph 24, wherein said hologram is a blazed hologram on which blazing processing is performed.

26. An optical head as defined in paragraph 22, wherein said polarizer is bonded to said light beam splitter means with a transparent material. With this arrangement, the size reduction of an optical head can be achieved.

27. An optical head as defined in paragraph 22, wherein said polarizer is formed on one surface of one optical member and said light beam splitter means is formed on the other surface. With this arrangement, a polarizer for detecting a magneto-optical signal is attached to other optical parts in the form of a single piece.

28. An optical head as defined in paragraph 22, having said light beam splitter means and a package containing a light receiving device and a semiconductor laser acting as a light source, wherein said light beam splitter means is bonded to one surface of said polarizer via a transparent material, and said package is bonded to the other surface of said polarizer.

With this arrangement, a polarizer for detecting a magneto-optical signal is attached to other optical parts in the form of a single piece.

29. An optical head for use in an optical recording device for recording/reproducing information on/from an magneto-optical recording medium, wherein:
- a light source and a light receiving device are contained in one package;
- both of light from said light source and returning light from said magneto-optic recording medium pass through the same optical member;
- a plurality of inclined planes are formed in said optical member at three or more locations;
- said plurality of inclined planes are provided with a polarizing optical thin film;
- a first inclined plane is disposed in the optical path from said light source such that the polarization direction of an incident light beam may be P-polarization with respect to the inclined plane;
- the returning light from said magneto-optical recording medium is incident on a second and third inclined planes;
- said second inclined plane is arranged such that the plane containing the optical axis of the incident light and the normal line to said second inclined plane makes an angle of A° with respect to the polarization direction of the light beam from said light source; and
- said third inclined plane is arranged such that the plane containing the optical axis of the incident light and the normal line to said third inclined plane makes an angle of −A° with respect to the polarization direction of the light beam from said light source.

With this arrangement, it becomes possible to realize a small sized optical head in the form of a single piece that can detect a magneto-optical signal. Furthermore, in this arrangement, because the light beam emitted from the light source also passes through the polarizing optical thin film, it is possible to improve the quality of the light beam illuminated to an optical recording medium, which contributes to improvement of the quality of a magneto-optical signal.

30. An optical head as defined in paragraph 29, wherein the incident angles of light associated with said second inclined plane and said third inclined plane are equal to or larger than 20° and said angle A is about 45°. With this arrangement, it becomes possible to obtain an optical head that can provide the maximum amplitude of signal.

31. An optical element consisting of a member having a single piece through which converging or diverging forward and returning light beams pass that is configured such that the optical length of said forward light beam is different from that of said returning light beam. With this arrangement, optical parts associated with the forward optical path and those associated with the returning path become common. Furthermore, it becomes possible to easily and accurately control the optical lengths of the forward and returning optical paths.

32. An optical element as defined in paragraph 31, wherein said optical element is molded with a transparent resin or glass into a single piece, and a step is provided on the surface thereof.

33. An optical element as defined in paragraph 31, wherein said optical element comprises at least two discrete parts that are bonded to each other, and in a situation in which said discrete parts are bonded to each other, a step is formed on the surface thereof.

34. An optical element as defined in paragraph 31, wherein:
- at least two different values of refractive indices are partially provided;

a forward light beam and a returning light beam pass through different areas with different refractive indices; and the optical length of the forward light beam is different from that of the returning light beam.

35. An optical element as defined in paragraph 31, wherein:

a forward optical beam and a returning optical beam pass through a member formed in a single piece; and the refracting power associated with a region through which the forward optical beam passes is different from that associated with a region through which the returning optical beam passes.

36. An optical element as defined in paragraph 35, wherein a convex or concave curved surface is formed locally on the surface thereof.

37. An optical head comprising:

an optical element as defined in paragraph 31;

a light receiving device disposed behind said optical element such that said light receiving device is approximately opposed to said optical element; and a semiconductor laser acting as a light source disposed at the position slightly higher or slightly lower than the position of the light receiving surface of said light receiving device;

wherein both of a forward light beam emitted by said light source and a returning light beam travelling toward the light receiving device after reflected from an optical recording medium pass through said optical element.

With this arrangement, it becomes possible to optimize the optical lengths associated with both of the forward and returning optical beams. Furthermore, it is possible to illuminate the light receiving device with an accurate spot of light, which is effective to delete the initial offset in the focusing error signal.

38. An optical head as defined in paragraph 37, wherein at least a focusing error signal is generated by detecting a change in the shape of the spot of said returning light beam formed on said light receiving device.

39. An optical head as defined in paragraph 37, wherein:

said optical element is made of a transparent resin;

said optical element has a flange at its periphery; and said flange has a gate for use in injection molding.

With this arrangement, it becomes possible to reduce the residual strain in the optical element. Thus, it is possible to avoid birefringence that affects the quality of the detected signal.

40. An optical head as defined in paragraph 37, wherein:

said optical element is made of a transparent resin; and an alignment mark for positioning is formed or printed on the primary surface or the back surface of said optical element and on the surface of said light receiving device. With this arrangement, it becomes possible to easily position the optical element and the light receiving device.

41. An optical head as defined in paragraph 37, wherein a diffraction grating or a hologram is formed on the primary surface or the back surface of said optical element.

42. An optical head as defined in paragraph 41, wherein said hologram is a blazed hologram which is blazed into the form of triangular teeth with a pitch of diffraction grooves. With this arrangement, it becomes possible to combine an optical element with another member to realize integration of functions.

43. An optical head as defined in paragraph 37, comprising:

an optical element as defined in paragraph 31;

a light receiving device disposed behind said optical element such that said light receiving device is approximately opposed to said optical element;

a light source disposed at the position slightly higher or slightly lower than the position of the light receiving surface of said light receiving device; and a package for holding said light receiving device and said light source;

wherein said light receiving device and said light source are sealed with said optical element and said package.

With this arrangement, it becomes possible to house the light emitting device and the light receiving device in a common package to obtain a small sized optical head in the form of a single piece.

44. An optical head as defined in paragraph 43, wherein:

said optical element and said package are fixed to each other via an adhesive; and the hardness of said adhesive as cured is lower than the hardness of the materials of said optical element and said package. With this arrangement, it becomes possible to avoid slip and deformation due to the difference in thermal expansion coefficients. Thus, it is possible to realize an optical head which has high resistance to environmental temperature changes.

45. An optical head as defined in paragraph 22, 29, or 37, using an optical element, said optical element being divided into a mirror-finished region and an irregular reflection region with small irregularities, wherein a forward light beam and returning light beam pass through said mirror-finished region. With this arrangement, it becomes possible to reduce stray light or unwanted reflected light in the optical head. Thus, it is possible to improve the quality of a detected signal.

46. An optical head as defined in paragraph 22, 29, or 37, using an optical element, said optical element being divided into a region coated with an antireflection film and a non-coating region coated with no antireflection film, wherein:

the central portion of a divergence light beam emitted by a light emitting device passes through said region coated with an antireflection film;

a portion of said divergence light beam is reflected from said non-coating region; and there is provided a second light receiving device for receiving said reflected light to detect the emitted light power. With this arrangement, it becomes possible to monitor the light power emitted by a light emitting device. In addition, it is possible to improve the transmission efficiency of the emitted light and it is possible to obtain a sufficient amount of reflected light applied to the second light receiving device. Thus, power detection is possible with a high signal-to-noise ratio.

47. An optical head as defined in paragraph 46, having:

said second light receiving device for detecting the emitted light power; and a first light receiving device for receiving a returning light beam reflected from an optical recording medium;

wherein said first and second light receiving devices are formed on a substrate in a single piece. With this arrangement, it becomes possible to monitor the emitted light power of a light emitting device without addition of any special parts.

BRIEF DESCRIPTION OF THE DRAWINGS

FIGS. 1–53 relate to embodiments in accordance with the present invention, wherein:

FIGS. 12(a) and 12(b) show the polarizer in accordance with the third embodiment, wherein FIG. 12a is a cross-sectional view taken in the X-direction, and FIG. 12b is a cross-sectional view taken in the Y-direction;

FIGS. 13(a) and 13(b) also show the polarizer in accordance with embodiment 3, wherein FIG. 13a is a cross-sectional view taken in the X-direction, and FIG. 13b is a cross-sectional view taken in the Y-direction;

FIGS. 15(a) and 15(b) show the polarizer in accordance with the fourth embodiment, wherein FIG. 15a is a cross-sectional view taken in the X-direction, and FIG. 15b is a cross-sectional view taken in the Y-direction;

FIGS. 16(a) and 16(b) show the polarizer in accordance with the fourth embodiment, wherein FIG. 16a is a cross-sectional view taken in the X-direction, and FIG. 16b is a cross-sectional view taken in the Y-direction;

FIGS. 23(a) and 23(b) show the optical head in accordance with the eighth embodiment, wherein FIG. 23a is a cross-sectional view taken in the same direction as the polarization direction of a light beam emitted by a laser, and FIG. 23b is a cross-sectional view taken in the direction perpendicular to polarization direction of a light beam emitted by a laser;

FIG. 24 is a plan view of a light receiving device in accordance with a ninth embodiment of the present invention;

FIG. 53 is a side view of the optical head in accordance with a twenty-fourth embodiment of the present invention.

DETAILED DESCRIPTION OF PREFERRED EMBODIMENTS

Referring to accompanying FIGS. 1–53, the present invention will be described in more detail hereinbelow.

(Embodiment 1)

Figure 1B:
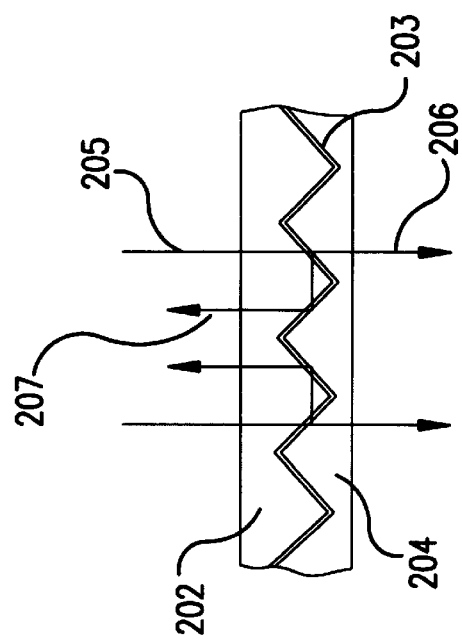
FIGS. 1(a) and 1(b) show a polarizer in accordance with a first embodiment of the present invention, wherein a plan view is shown in FIG. 1a and a cross-sectional view is shown in FIG. 1b.
Figure 1A:
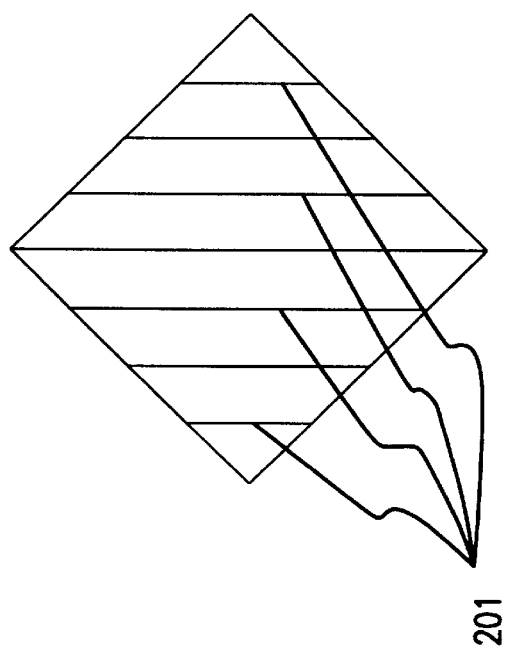

FIG. 1a is a plan view of a polarizer in accordance with a first embodiment of the present invention, and FIG. 1b is a cross-sectional view thereof. The polarizer has a plurality of edge lines 201 and a sawtooth-shaped section as shown in FIG. 1b. Preferably, the polarizer is formed by means of vacuum evaporation to deposit a polarizing optical thin film 203 on a transparent substrate 202 made of a plastic sheet with edge lines 201, and by further coating the film 203 with a transparent material 204, such as a transparent resin.

When a light beam 205 is incident on the primary surface, a P-polarization component of the light beam can pass through the polarizing optical thin film 203, thus becoming a transmitted light beam 206. On the other hand, an S-polarization component is reflected twice, thus becoming a reflected light beam 207.

The edge lines 201 are arranged at an angle of 45° to the sides of the polarizer so that the transmitted light beam 206 is polarized at 45° relative to the sides of the polarizer. The polarization direction may be an arbitrary value by arranging the edge lines in a desired direction.

The space between the edge lines may be a maximum value of less than twice the thickness of the transparent substrate 202.

A preferable material for the transparent substrate 202 is a resin exhibiting transparency for a wavelength of the light to be used. Examples of such resins include acrylic resin, polycarbonate, amorphous polyolefin, and polystyrene.

The transparent material 204 is a resin exhibiting transparency for a wavelength of the light to be used, such as an ultraviolet-cured resin, epoxy resin, and balsam. Due to the use of transparent material 204, the direction of the transmitted light beam 206 becomes the same as that of the incident light beam 205.

A mold for producing the polarizer may be made by means of machining when the space between the edge lines is rather wide, i.e., larger than several hundred microns. By contrast, photo-etching and blazing a reused when the space between the edge lines is rather narrow for example several ten microns to several microns.

The polarizer produced in such a manner as described above is thin and has high transparency. In addition, it shows a large extinction ratio (the ratio of the amount of transmitted light with P-polarization to that of transmitted light with S-polarization). More specifically, it is possible to obtain a transparency as high as 98%, and a large extinction ratio such as 500:1. As will be described later, the polarizer according to the first embodiment may be used as an analyzer in an optical head for detecting a magneto-optical signal. The polarizer may also be applied to a liquid crystal display, an optical shutter, or the like.

(Embodiment 2)

Figure 2:
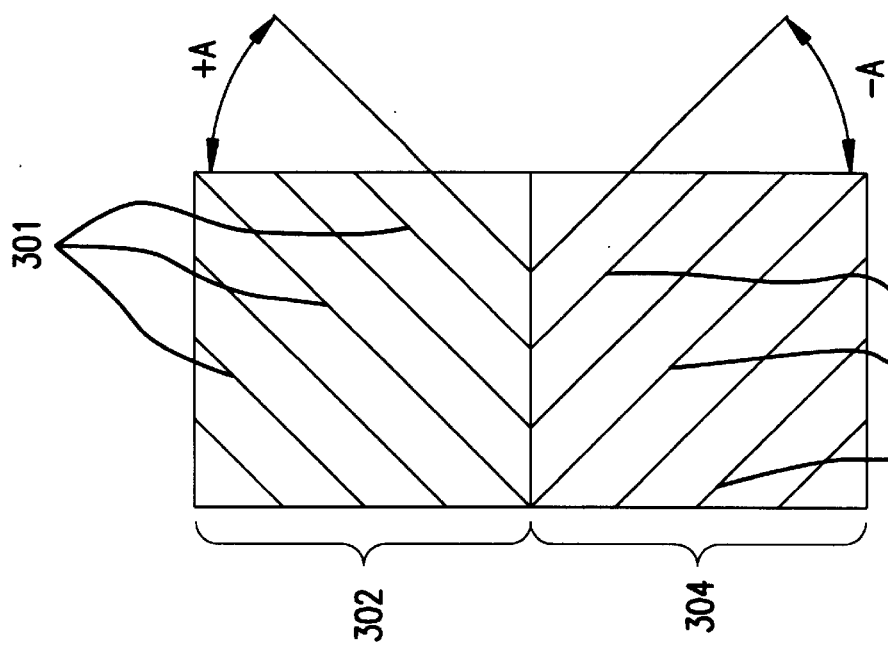
FIG. 2 is a plan view of a polarizer in accordance with a second embodiment of the present invention.

FIG. 2 is a plan view of a polarizer in accordance with a second embodiment of the present invention. This polarizer comprises a first substrate 302 having a plurality of edge lines 301 and a second substrate 304 having a plurality of edge lines 303 formed in a direction different from that of the edge lines 301 in the first substrate. The substrates 302 and 304 are injection-molded into a single piece from a resin such as a PMMA resin, in which a dielectric multi-layer film that acts as a polarizing optical thin film is deposited by evaporation on the edge lines of the saw-tooth shaped surfaces of the first and second substrates. The polarizer with this configuration may be used in an optical head of a magneto-optic recording device.

With respect to one side of the polarizer taken as a reference, the edge lines 301 are arranged at 45° and the edge lines 303 are arranged at −45°. Each substrate includes at least one edge line. In this case, the substrates have a V-shaped cross-section.

The first and second substrates need not necessarily be arranged adjacent to each other. A space may be provided between the substrates depending on the specific application desired. In this case, the substrates may be spaced and connected to each other using injection molded plastic connections.

(Embodiment 3)

Figure 11:
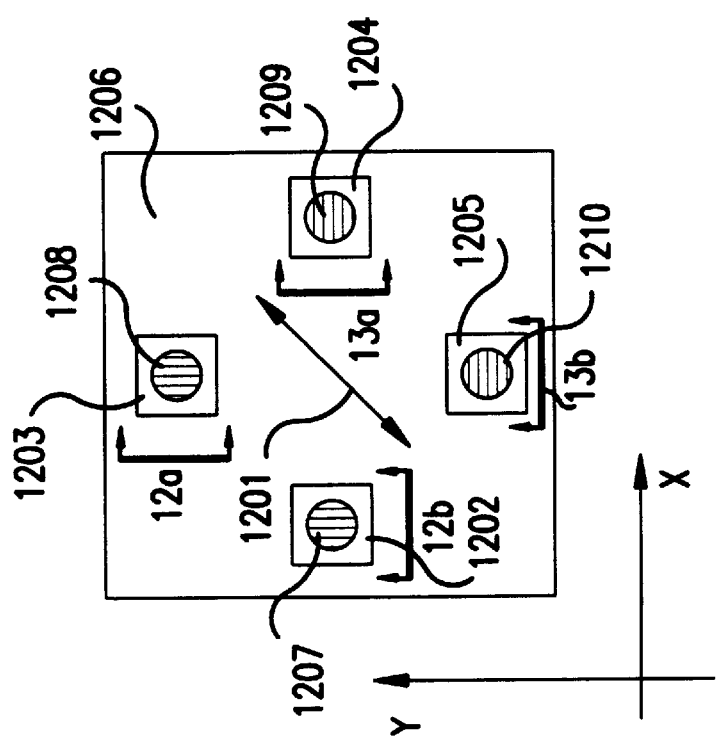
FIG. 11 is a plan view of a polarizer in accordance with a third embodiment of the present invention.

FIG. 11 is a plan view of a polarizer in accordance with a third embodiment of the present invention. For convenience of illustration, the respective vertical and horizontal directions are defined as Y- and X-directions. A substrate 1206 made of a transparent material has regions 1202, 1203, 1204, and 1205 with inclined planes. Light beams 1207, 1208, 1209, and 1210 are incident on these regions, respectively. With respect to the X-axis, as designated by an arrow 1201, the polarization direction of the light is set to 45°.

Figure 12A:
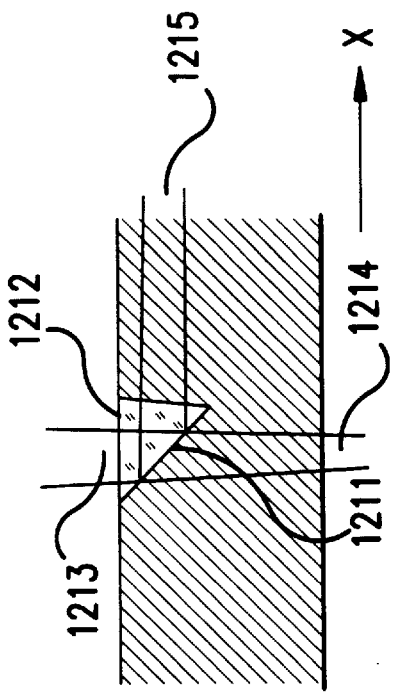
Figure 12B:
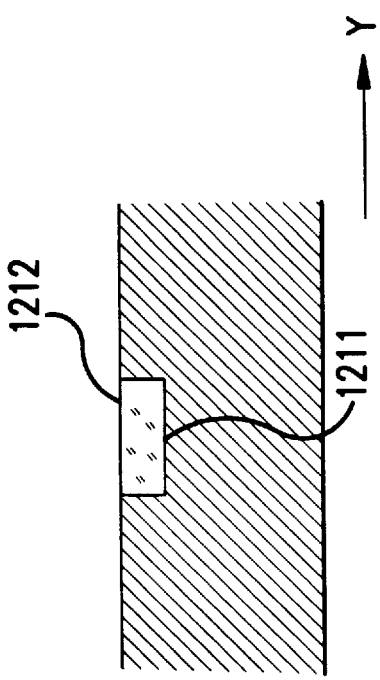
Figure 13A:
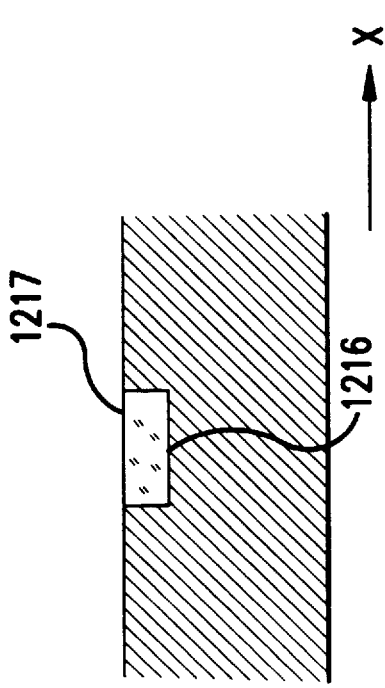
Figure 13B:
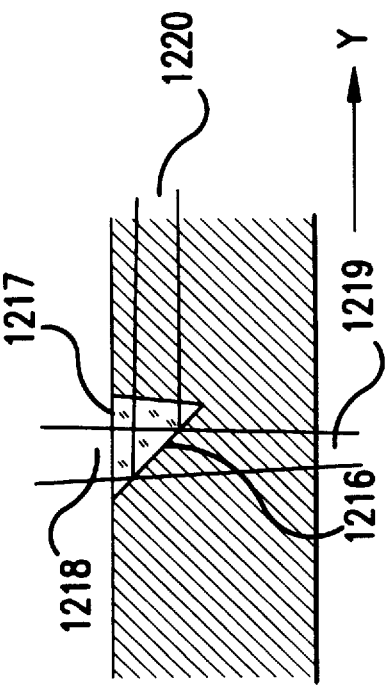

FIG. 12a is a cross-sectional view of the regions 1202 and 1203, as taken in the X-direction. FIG. 12b is a cross-sectional view of the regions 1202 and 1203, as taken in the Y-direction. As can be seen from these figures, regions 1202 and 1203 have respective inclined planes arranged in the same direction. Moreover, the angle of each inclined plane is 45° with respect to the substrate. A polarizing optical thin film is deposited by vacuum evaporation on the inclined plane 1211 and a transparent material 1212 is filled in the space between the inclined plane and the surface of the substrate. On the other hand, as shown in FIGS. 13a and 13b, which illustrate cross sections taken in the X-direction and Y-direction, respectively, of regions 1204 and 1205, regions 1204 and 1205 have respective inclined planes rotated by 90° from the inclined planes of regions 1202 and 1203. Regions 1204 and 1205 have respective inclined planes oriented in the same direction wherein the angle of these inclined planes is 45° with respect to the substrate. A polarizing optical thin film is deposited by evaporation on the inclined plane 1216 and the space from the inclined plane 1216 up to the surface of the substrate is filled with a transparent material 1217.

With this arrangement, the P-polarization component can pass through the inclined plane 1211 and the S-polarization component is reflected from the inclined plane 1211. As a result, when a light beam 1213 having polarization in the direction 1201 is incident on the regions 1202 and 1203, only its P-polarization component can selectively pass through the inclined plane 1211. In other words, only the X-direction component 1214 of the light polarized in the direction 1201 can pass through the inclined plane 1211.

Similarly, the inclined plane 1216 transmits the P-polarization component and reflects the S-polarization component. Therefore, inclined planes 1216 transmit only the P-polarization component of light beam 1218 with polarization in direction 1201 incident on regions 1204 and 1205. However, the directions of the inclined planes of regions 1204 and 1205 are rotated by 90° from the inclined planes of regions 1202 and 1203. Thus, only the Y-direction component 1219 of the light having polarization in the direction 1201 is transported. In this way, it becomes possible to perform light detection in the directions ±45° via regions 1202, 1203 and regions 1204, 1205, respectively.

The direction of light to be detected can be modified from ±45° into an arbitrary direction by setting the directions of the inclined planes to symmetrical directions such that the absolute values of the angles with respect to the polarization direction are the same. For example, when light detection is required in the direction of ±A°, it may be arranged such that with respect to the polarization direction, the angle between the normal line to the inclined plane and the plane containing the optical axis is +A° for one inclined plane, and −A° for the other inclined plane.

The angle between the normal line to the inclined plane and the optical axis of light may be set to an arbitrary value as long as the polarizing thin film formed on the inclined plane transmits the P-polarization component and reflects the S-polarization component. Preferably, however, the angle of incidence of the light incident on the inclined plane is larger than 20° with respect to the normal line of the inclined plane.

(Embodiment 4)

Figure 14:
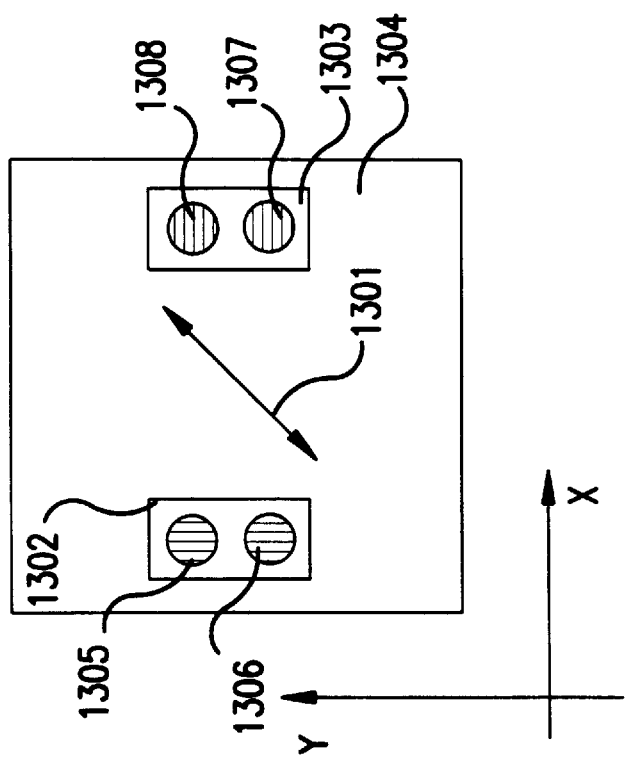
FIG. 14 shows a polarizer in accordance with a fourth embodiment of the present invention.

FIG. 14 is a plan view of a polarizer in accordance with a fourth embodiment of the present invention. For convenience of illustration, the vertical and horizontal directions are defined as Y- and X-directions, respectively. A substrate 1304 made of a transparent material has regions 1302 and 1303. Light beams 1305, 1306, and 1307, 1308 are incident on regions 1302 and 1303, respectively. The polarization direction of the light is set to 45° with respect to the X-axis as designated by an arrow 1301.

Figure 16A:
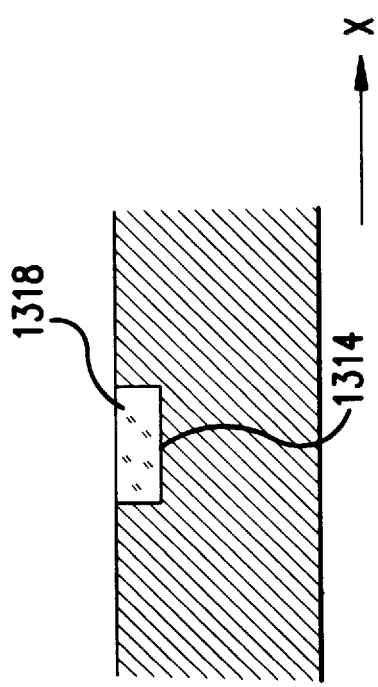
Figure 16B:
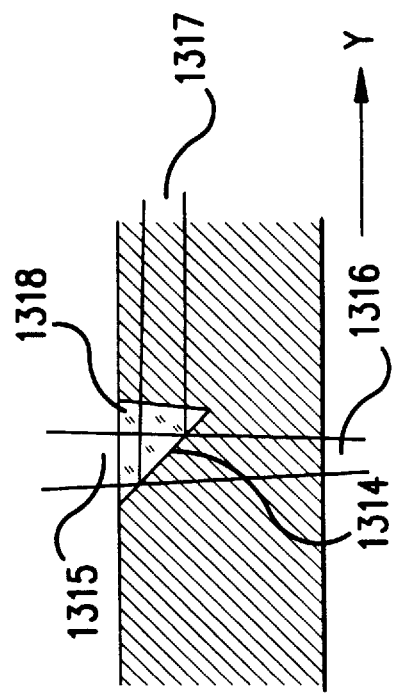
Figure 15A:
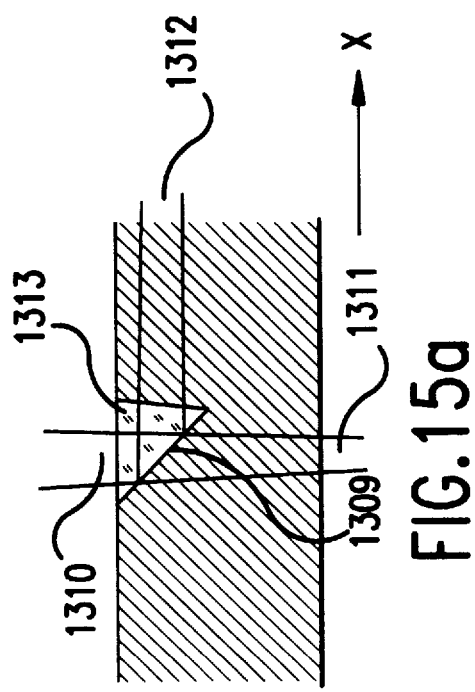
Figure 15B:
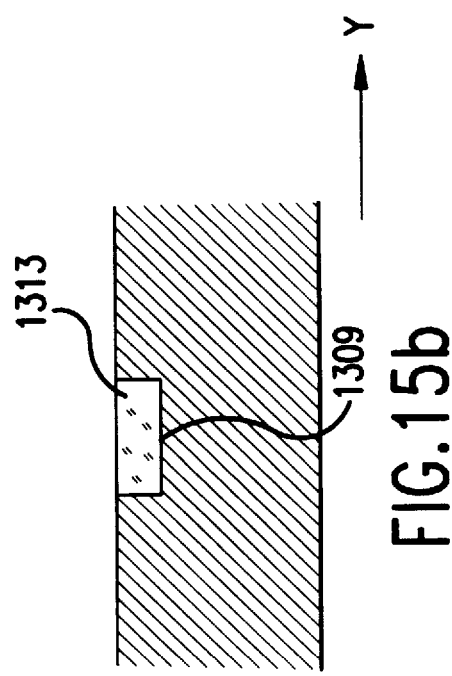

FIG. 15a is a cross-sectional view of region 1302, taken in the X-direction. FIG. 15b is a cross-sectional view of the region 1302, taken in the Y-direction. As can be seen from these figures, region 1302 as an inclined plane arranged in the X-direction, wherein the angle of the inclined plane is set to 45° with respect to the substrate. A polarizing thin film is deposited by evaporation on the inclined plane 1309 and the space from the inclined plane 1309 up to the surface of the substrate is filled with a transparent materials 1313. On the other hand, as shown in FIGS. 16a and 16b illustrating cross sections of the region 1303, taken in the X-direction and Y-direction, respectively, region 1303 has an inclined plane rotated by 90° from that of the region 1302, that is to say, it is arranged in the Y-direction. Thus, the region 1303 has an inclined plane in the Y-direction and the angle of the inclined plane is set to 45° with respect to the substrate. As in the case of the region 1302, a polarizing thin film is deposited by evaporation on the inclined plane 1314 and the space from the inclined plane 1314 up to the surface of the substrate is filled with a transparent material.

With this arrangement, the inclined plane 1309 transmits the P-polarization component and reflects the S-polarization component. As a result, when light beams 1305 and 1306 with polarization in the direction 1301 are incident on the region 1302, only their P-polarization components can selectively pass through the inclined plane 1309. In other words, only the X-direction component 1311 of the light polarized in the direction 1301 can pass through the inclined plane 1309. Similarly, the inclined plane 1314 transmits the P-polarization component and reflects the S-polarization component. Therefore, the inclined plane 1314 transmits selectively only the P-polarization component of the light beams 1307 and 1308 with polarization in the direction 1301 incident on the region 1303. However, since the direction of the inclined plane of this region 1303 is rotated by 90° from that of the region 1302, only the Y-direction component 1316 of the light polarized in the direction 1301 can pass. In this way, the region 1302 and the region 1303 can perform light detection in the directions 45°, respectively.

The direction of the light detection can be modified from ±45° into an arbitrary direction by setting the directions of the inclined planes to symmetrical directions such that the absolute values of the angles with respect to the polarization direction are the same. For example, when the light detection is required in the direction of ±A°, it may be arranged such that with respect to the polarization direction, the angle between the normal line to the inclined plane and the plane containing the optical axis is +A° for one inclined plane, and −A° for the other inclined plane.

The angle between the normal line to the inclined plane and the optical axis of light may be set to an arbitrary value as long as the polarizing thin film formed on the inclined plane transmits the P-polarization component and reflects the S-polarization component. Preferably, however, the angle of incidence of the light incident on the inclined plane is larger than 20° with respect to the normal line of the inclined plane.

(Embodiment 5)

Figure 3A:
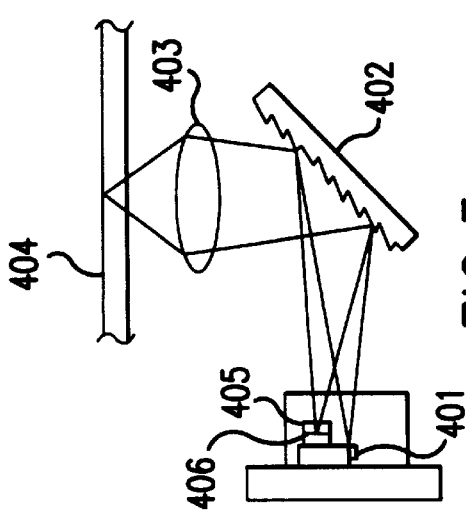
FIGS. 3(a) and 3(b) show an optical head in accordance with a fifth embodiment of the present invention, wherein a side view is shown in FIG. 3a and a plan view is shown in FIG. 3b.
Figure 3B:
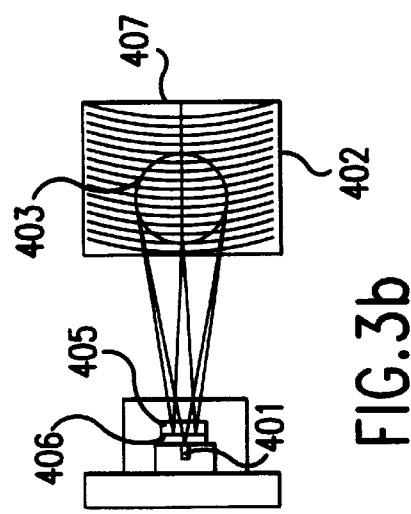

FIG. 3a is a side view of an optical head in accordance with a fifth embodiment of the present invention and FIG. 3b is a plan view thereof.

Light is emitted from a semiconductor laser 401, which acts as a light source, and this light is reflected from a holographic element 402 on which brazing is performed. The light reaches a magneto-optical recording medium 404 after passing through an objective lens 403. The light is reflected from the magneto-optical recording medium 404 and passes again through the objective lens 403. Then, the light is diffracted and split into two directions by the holographic element 402. As shown in FIG. 3b, the holographic element 402 has two regions separated from each other by a dividing line 407. Each of these regions produces a light beam, and astigmatism is added by the holographic element 402 to each of the light beams in such a manner that polarities of the added astigmatism are opposite to each other.

The split light beams are detected by a polarizer 405, which can be similar to the polarizer shown in embodiment 2. Then, photoelectric-conversion is performed on the light beams by a photosensor 406, which acts as a light receiving device.

Figure 4:
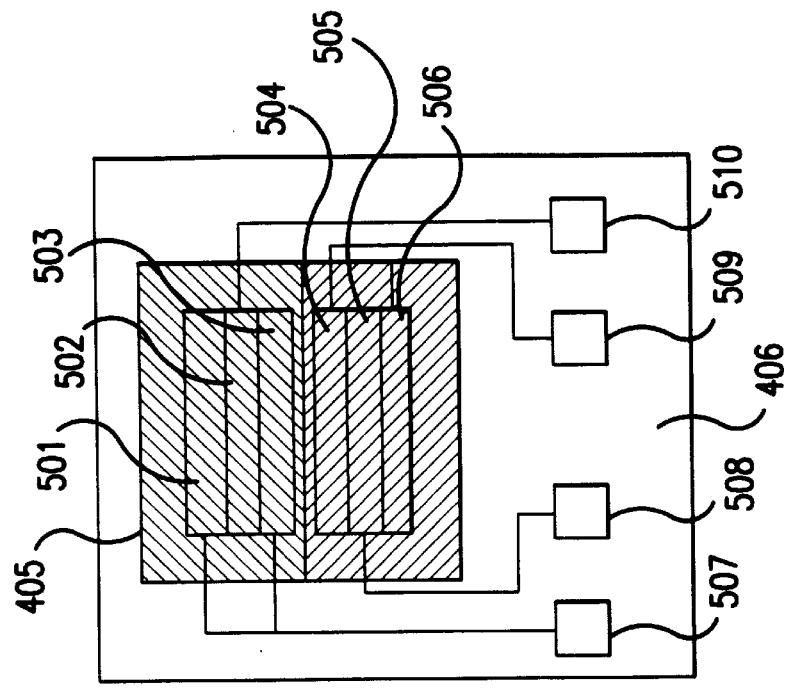
FIG. 4 is a plan view showing a light receiving device including its peripheral portions in accordance with the fifth embodiment of the present invention.

The structure of the photosensor 406 is shown in FIG. 4. Six rectangular light receiving regions 501, 502, 503, 504, 505, and 506, are provided. Regions 501 and 503 are interconnected to each other, and regions 504 and 506 also are interconnected to each other. Four terminals 507, 508, 509, and 510 also are provided. The polarizer 405 is bonded onto the photosensor 406 via a transparent resin.

Figure 5:
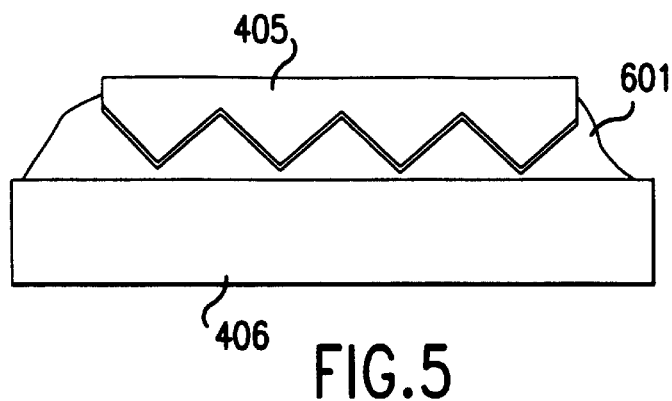
FIG. 5 is a cross-sectional view of a polarizer and the light receiving device in accordance with embodiment 5.

The cross section of the resultant unit is shown in FIG. 5. It will be seen that the unit is configured by bonding the polarizer 405 onto the photosensor 406 via the transparent resin 601.

Figure 6:
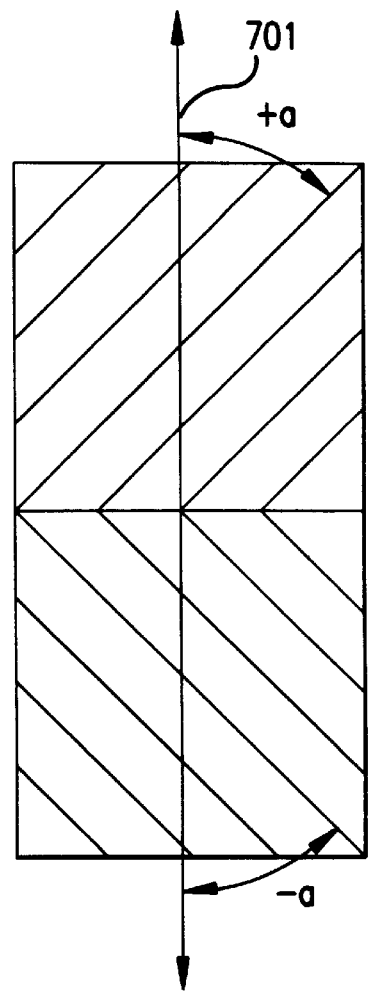
FIG. 6 is a plan view of the polarizer of embodiment 5.

FIG. 6 shows a relationship between the polarization direction 701 of the light source and directions of the edge lines in the first and second substrates. In this example, 45° is used as the value a. This angle provides a maximum modulation amplitude.

Figure 7:
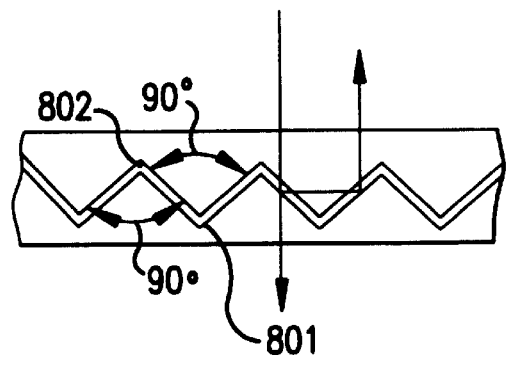
FIG. 7 is a cross-sectional view of the polarizer in accordance with embodiment 5, showing its sawtooth-like structure.

FIG. 7 shows vertical angles at the top portion 801 and at the bottom portion 802 of the sawtooth-shaped section. In this example, 90° is used as the vertical angle. This angle is preferable because it allows the unwanted S-polarization component to return back to the incident direction. Thus, little stray light is introduced.

(Embodiment 6)

Figure 17:
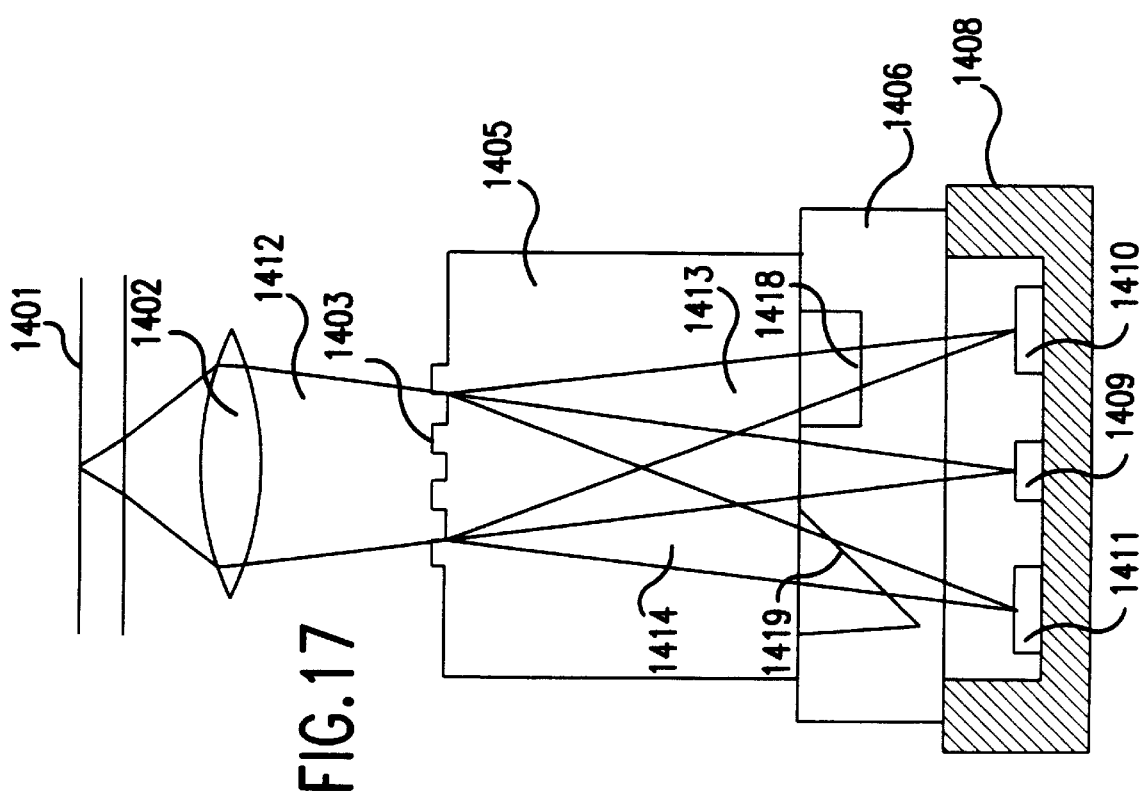
FIG. 17 is a side view of an optical head in accordance with a sixth embodiment of the present invention.

FIG. 17 is a side view of an optical head in accordance with a sixth embodiment of the present invention. A light beam is emitted from a semiconductor laser 1409 light source and is incident on a polarizer 1406, as shown, for example, in the previous embodiments. The light beam passes through a holographic element 1405 that is bonded to the polarizer. Then an objective lens focuses the light beam onto a magneto-optical recording 1402 medium 1401. When holographic element 1405 is bonded to polarizer 1406, the spaces between the holographic element and the inclined planes in regions 1418 and 1419 are filled with a transparent resin. With this arrangement, the accuracy of the surfaces through which the light beam passes is effectively determined by the accuracy of the surface of the holographic element alone.

The light beam focused on the magneto-optical recording medium obtains a magneto-optical signal when it is reflected from the magneto-optical recording medium and returns to and through the objective lens 1402. This creates a returning light beam that is incident on holographic surface 1403 and focused along the same path as the optical path 1412 of the emitted light beam. The light beam is diffracted by the holographic element, and diffraction of a first order results in mirrored light beams 1413 and 1414. The light beam 1413 is incident on region 1418 of the polarizer and the light beam 1414 is incident on region 1419 of the polarizer.

Figure 18:
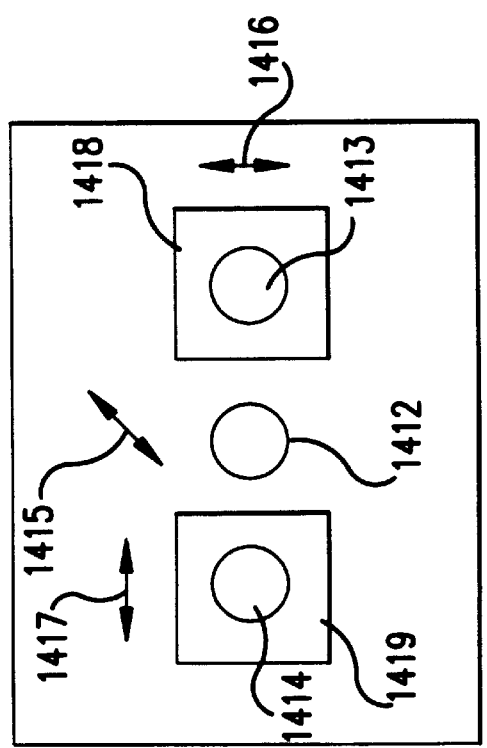
FIG. 18 is a plan view of the optical head in accordance with the sixth embodiment.

FIG. 18 is a plan view of the polarizer 1406. The inclined plane of region 1418 is arranged such that the plane containing the normal line of the inclined plane and the optical axis makes an angle of +45° with respect to the polarization direction 1415 of the light emitted from the semiconductor laser. On the other hand, the inclined plane of region 1419 is arranged such that the plane containing the normal line of the inclined plane and the optical axis makes an angle of −45° with respect to the polarization direction 1415 of the light emitted from the semiconductor laser. Furthermore, the same polarizing thin film that transmits a P-polarization component and reflects an S-polarization component is deposited by evaporation on the inclined planes 1418 and 1419. As a result, the transmission directions associated with the P-polarization and S-polarization beams are designated by reference numerals 1416 and 1417, respectively, for corresponding regions 1418 and 1419. Thus, the regions 1418 and 1419 can detect the components with polarization of ±45°, respectively, with respect to the polarization direction 1415 of the light emitted from the semiconductor laser. Light beam 1413 that passes through region 1418 is incident on the light receiving device 1410. On the other hand, light beam 1414 that passes through region 1419 is incident on the light receiving device 1411.

The semiconductor laser 1409 and light receiving devices 1410, 1411 are installed on a common housing 1408. The devices are housed with housing 1408 and the optical element wherein the optical element consists of polarizer 1406 and holographic element 1405 bonded to each other. This arrangement also provides environmental and humidity protection for semiconductor laser 1409 and light receiving devices 1410 and 1411. Both light receiving devices 1410 and 1411 are formed on a common silicon chip. Edge-emitting and surface-emitting semiconductor lasers may be used as laser 1409 to obtain an optical head.

(Embodiment 7)

Figure 19:
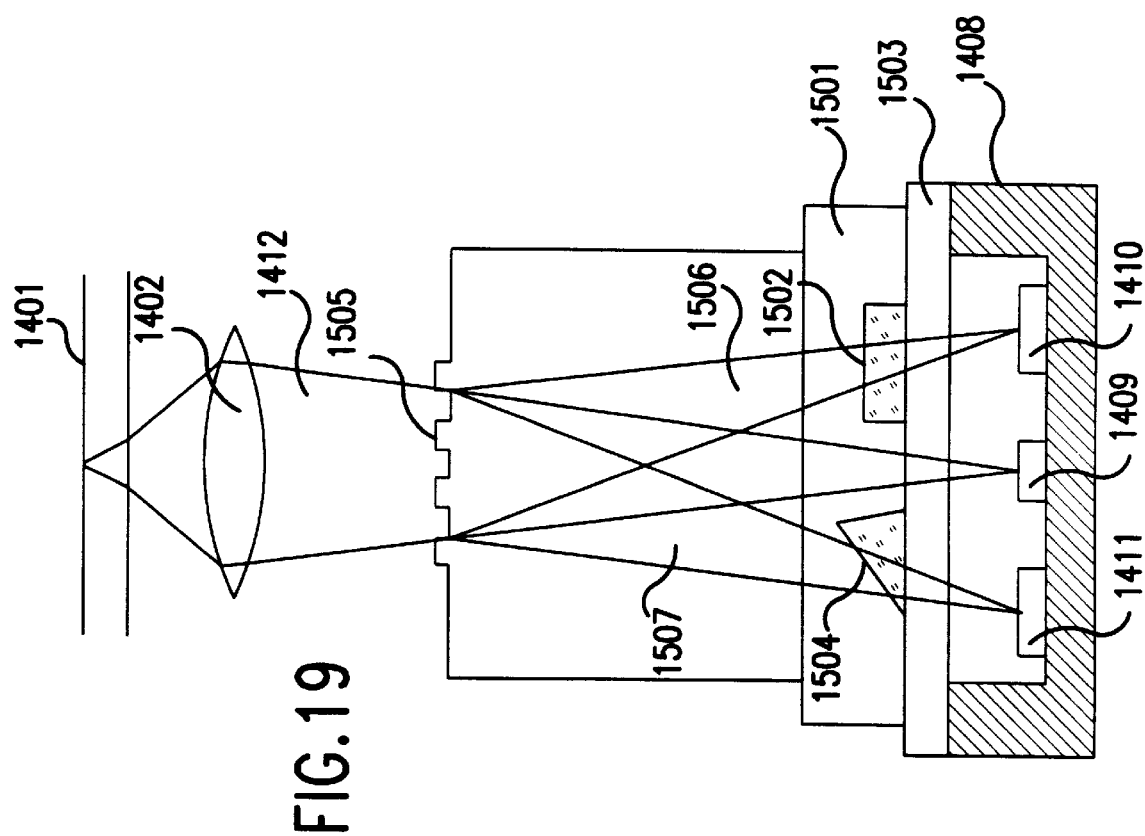
FIG. 19 is a side view of an optical head in accordance with a seventh embodiment of the present invention.

FIG. 19 is a side view of an optical head in accordance with a seventh embodiment of the present invention. A light beam emitted from a semiconductor laser 1409 light source passes through a cover glass 1503 that seals a housing 1408. The light beam further passes through a polarizer 1501 that has detector regions 1502 and 1504 on the side facing the semiconductor laser and a holographic surface 1505 on the side facing a magneto-optical recording medium. Then, the light beam is focused onto the magneto-optical recording medium 1401 by an objective lens 1402. When the cover glass is bonded to the polarizer 1501, the spaces between the cover glass and the inclined planes in the regions 1502 and 1504 are filled with a transparent adhesive.

When the light beam focused on the magneto-optical recording medium is reflected, the light beam obtains a magneto-optical signal. Then, the light beam returns to and through the objective lens 1402. The returning light beam is focused along the same path as the emitted light beam path 1412 and is incident on the holographic surface (hologram) 1505 of a holographic element. The light beam is diffracted by the hologram, and diffraction of a first order results in mirror image light beams 1506 and 1507. The light beam 1506 is incident on region 1502 of the polarizer and light beam 1507 is incident on the region 1504 of the polarizer.

Figure 20:
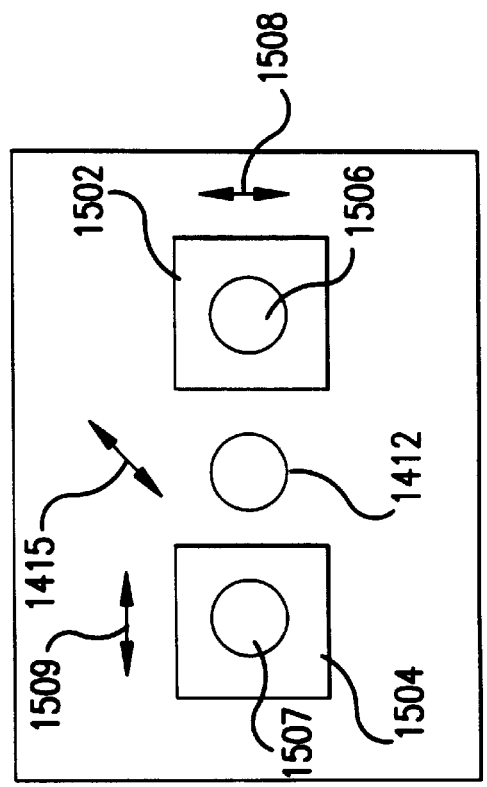
FIG. 20 is a plan view of a polarizer of the optical head in accordance with the seventh embodiment.

FIG. 20 is a plan view of the composite optical polarizing device 1501. The inclined plane of the region 1502 is arranged such that a plane containing a normal line of the inclined plane and the optical axis makes an angle of +45° with respect to the polarization direction 1415 of the light emitted from the semiconductor laser. On the other hand, the inclined plane of the region 1504 is arranged such that a plane containing a normal line of the inclined plane and the optical axis makes an angle of −45° with respect to the polarization direction 1415 of the light emitted from the semiconductor laser. Furthermore, the same polarizing thin film that transmits a P-polarization component and reflects an S-polarization component is deposited by evaporation on the inclined planes 1502 and 1504. As a result of the orientating of the inclined planes 1502 and 1504, the transmission directions associated with the P-polarization and S-polarization are respectively designated by directional arrows 1508 and 1509. Thus, regions 1502 and 1504 can detect the components of ±45° polarization, respectively, with respect to the polarization direction 1415 of the light emitted from the semiconductor laser. Light beam 1506 passing through region 1502 is incident on light receiving device 1410. On the other hand, the light beam 1507 passing through region 1504 is incident on light receiving device 1411. As in embodiment 6, the semiconductor laser 1409 and light receiving devices 1410 and 1411 are installed in a common housing 1408. The devices are protected from harmful environmental conditions such as humidity because they are sealed within housing 1408 and an optical element 1501, wherein the optical element comprises a composite optical element 1501 and is bonded to the cover glass 1503.

(Embodiment 8)

Figure 21:
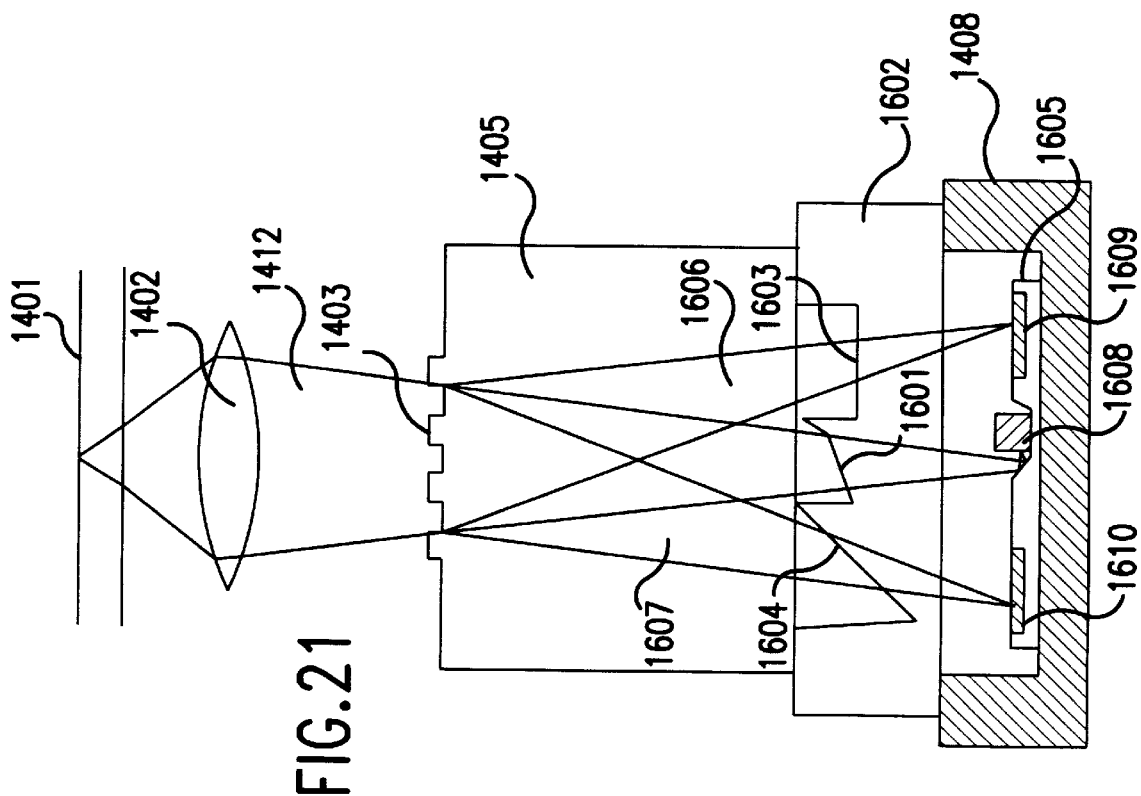
FIG. 21 is a side view of an optical head in accordance with an eighth embodiment of the present invention.

FIG. 21 is a side view of an optical head in accordance with an eighth embodiment of the present invention. A semiconductor laser 1608 is mounted on a silicon substrate 1605. Photodiodes 1609 and 1610 are formed on the silicon substrate 1605. A light beam emitted from the semiconductor laser 1608 is incident on a substrate 1602 that includes a polarizer. The light 1412 emitted from the laser passes through a region 1601. As shown in FIGS. 23a and 23b, which illustrate cross-sections of the region 1601 taken in respective directions parallel to and perpendicular to the polarization direction, the plane containing the normal line to the inclined plane 1601 and the optical axis coincides with the polarization direction. Thus, light beam 1412 is incident on inclined plane 1601 as a light beam with P-polarization. Inclined plane 1601 is coated with an evaporated polarizing thin film so that it transmits the P-polarization component and reflects the S-polarization component. Emitted light beam 1412 is polarized in the direction 1415. Therefore, light beam 1412 can pass through the region 1601 with almost no loss. When holographic element 1405 is bonded to the polarizer 1602, the spaces between the holographic element and the inclined planes in the regions 1601, 1603, and 1604 are filled with a transparent adhesive.

After passing through the holographic element 1405, light beam 1412 is focused onto the magneto-optical recording medium 1401 by an objective lens 1402. When the light beam focused on the magneto-optical recording medium is reflected, the reflected light beam obtains a magneto-optical signal. Then, the light beam returns to the objective lens 1402. After passing through the objective lens 1402, the returning light beam is focused along the same path as the emitted light beam path 1412 and incident on hologram 1403. The reflected light beam is diffracted by the hologram, and diffraction of a first order results in respective mirror image light beams 1606 and 1607. The light beam 1606 is incident on the region 1603 of the polarizer and the light beam 1607 is incident on the region 1604 of the polarizer.

Figure 22:
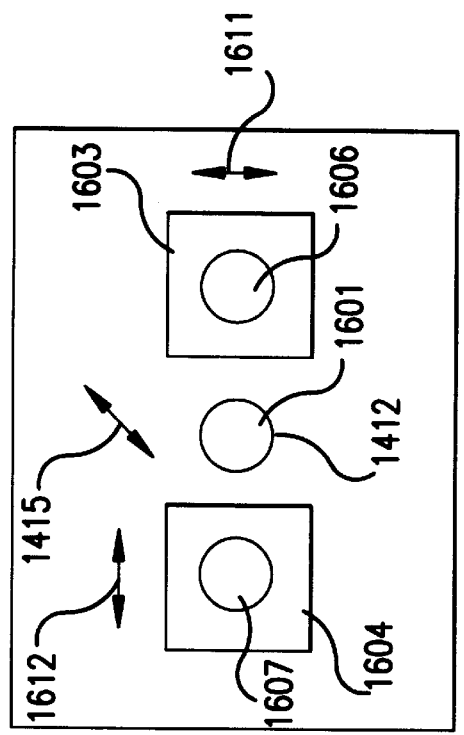
FIG. 22 is a plan view of a polarizer of the optical head in accordance with the eighth embodiment.

FIG. 22 is a plan view of the polarizer 1602. Inclined plane of region 1603 is arranged such that the plane containing the normal line of the inclined plane and the optical axis makes an angle of −45° with respect to the polarization direction 1415 of the light emitted from the semiconductor laser. On the other hand, inclined plane of region 1604 is arranged such that the plane containing the normal line of the inclined plane and the optical axis makes an angle of +45° with respect to the polarization direction 1415 of the light emitted from the semiconductor laser. Furthermore, the same kind of polarizing thin film that transmits the P-polarization component and reflects the S-polarization component is deposited by evaporation on the inclined planes 1601, 1603, and 1604. Due to the same type of polarizing thin films being deposited on the inclined planes 1601, 1603, and 1604, regions 1603 and 1604 exhibit the transmission directions associated with the P-polarization designated by arrows 1611 and 1612, respectively. Thus, regions 1603 and 1604 can detect polarization components of ±45°, respectively, with respect to the polarization direction 1415 of the light emitted from the semiconductor laser. Besides, the region 1601 can transmit almost 100% of light emitted from the semiconductor laser. If this arrangement is adopted, it is unnecessary to mask the area on which the light beam from the semiconductor is to be emitted during the evaporation process of the polarizing thin film. Thus, a great cost reduction can be achieved.

The light beam 1606 passing through the region 1603 is incident on the light receiving device 1609. On the other hand, the light beam 1607 passing through the region 1604 is incident on the light receiving device 1610. The semiconductor laser 1608 and light receiving devices 1609 and 1610 are installed in a common housing 1408. These devices are protected from harmful environmental conditions such as humidity since they are enclosed within housing 1408 by polarizer 1602. The light receiving devices 1609 and 1610 are formed on the same silicon wafer 1605 on which the semiconductor laser 1608 is mounted. The light beam emitted from the semiconductor laser 1608 may exit the laser in a direction perpendicular to the surface of the silicon wafer after being reflected from an inclined plane formed in the silicon wafer. If a surface-emitting type semiconductor laser is used, the light beam emitted from the semiconductor laser immediately exits the silicon wafer in the direction perpendicular to the silicon wafer without using a reflection element.

The angle between the incident light and the normal line to the inclined plane that is covered with an evaporated polarizing thin film may be larger than 45° to obtain a polarizer exhibiting a higher extinction ratio. Conversely, the angle between the incident light and the normal line to the inclined plane that is covered with an evaporated polarizing thin film may be less than 45° to obtain a thinner polarizer that provide for a space conserving thinner optical head.

(Embodiment 9)

FIG. 24 is a plan view of a light receiving device in an optical head in accordance with a ninth embodiment of the present invention. The optical system in this optical head is configured with the optical system shown in embodiment 8. A semiconductor laser 1608 is mounted on a silicon substrate 1605 on which photodiode pairs 1702, 1703 and 1705, 1706 are formed on respective peripheral regions 1704 and 1707. Reference numerals 1708 and 1709 denote spots on the sensor illuminated with the light beam detected in the direction of +45° with respect to the polarization direction of the semiconductor laser, wherein the detection of light is performed by a polarizer shown in embodiment 5. Reference numerals 1710 and 1711 denote spots on the sensor illuminated with the light beam detected in the direction of +45° with respect to the polarization direction of the semiconductor laser.

Figure 25:
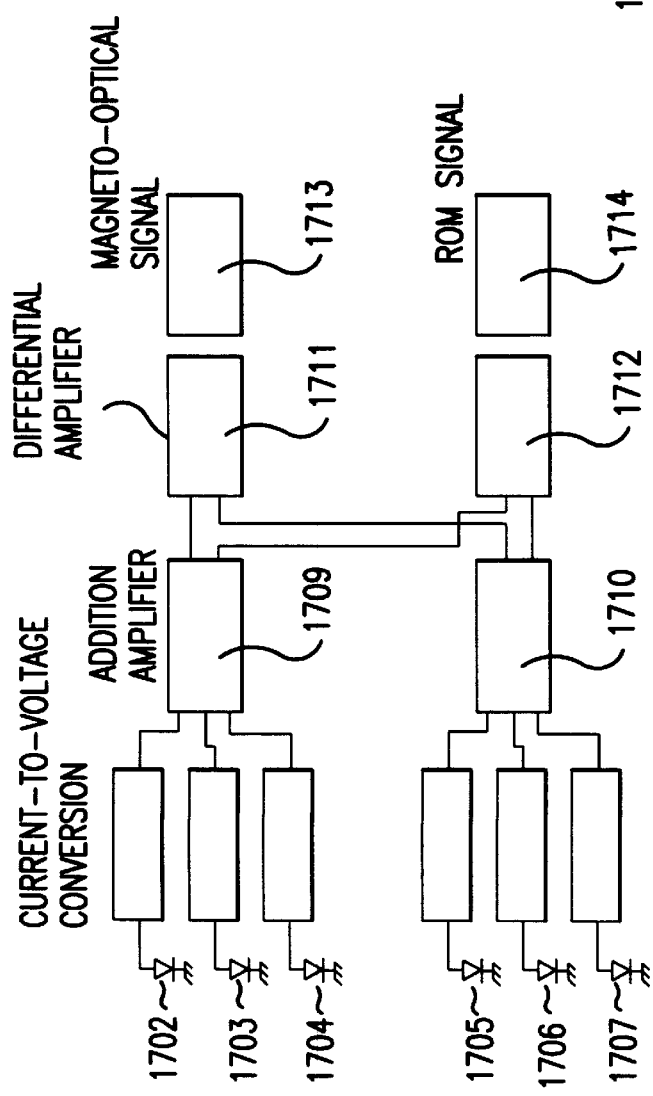
FIG. 25 is a block diagram showing a signal detecting means for detecting a magneto-optical signal in the ninth embodiment.

FIG. 25 is a block diagram showing a magneto-optical detection circuit in accordance with embodiment 9. Current signals from photodiodes 1702, 1703, 1704, 1705, 1706, and 1707 are converted to voltage signals. The resultant outputs of current-to-voltage conversion associated with the photodiodes 1702, 1703, and 1704 are added by adder circuit 1709. On the other hand, the resultant outputs of current-to-voltage conversion associated with the photodiodes 1705, 1706, and 1707 are added by adder circuit 1710. A differential amplifier 1711 detects the difference between the output of adder circuit 1709 and the output of adder circuit 1710 to obtain a magneto-optical signal 1713. An adder circuit 1712 adds the output of adder circuit 1709 and the output of adder circuit 1710 to obtain a ROM signal 1714 such as a pre-pit signal.

(Embodiment 10)

Figure 8:
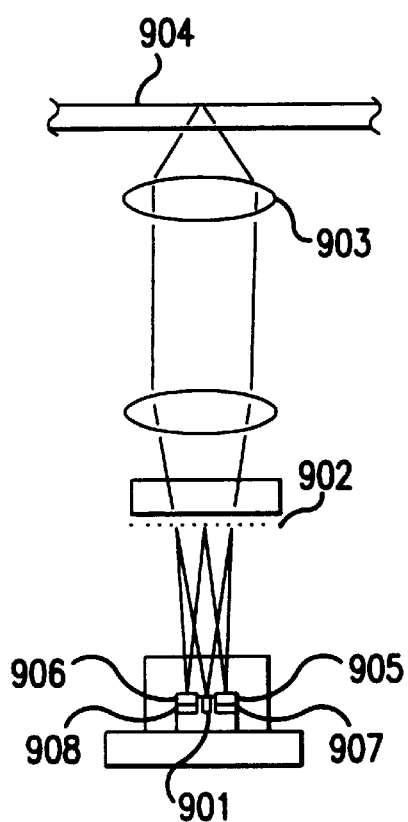
FIG. 8 is a schematic diagram showing an optical head in accordance with a tenth embodiment of the invention.

FIG. 8 shows an optical head in accordance with a tenth embodiment of the present invention.

A light beam is emitted from a semiconductor laser 901 and passes through a holographic element 902. Then, the light beam reaches a magneto-optical recording medium 904 after passing through an objective lens 903. The light beam is reflected from magneto-optical recording medium 904 and passes again through objective lens 903. Then the light beam is diffracted into two directions by the holographic element 902.

The split light beams pass through polarizers 905 and 906 as shown, for example, in embodiment 1, and are converted from optical signals to electric signals by photodiodes 907 and 908.

In this embodiment, preferable directions of the edge lines are +45° and −45° with respect to the polarization direction of the light source.

In this embodiment, the holographic element 902 is separate from and not bonded to the polarizer 906.

(Embodiment 11)

Figure 9:
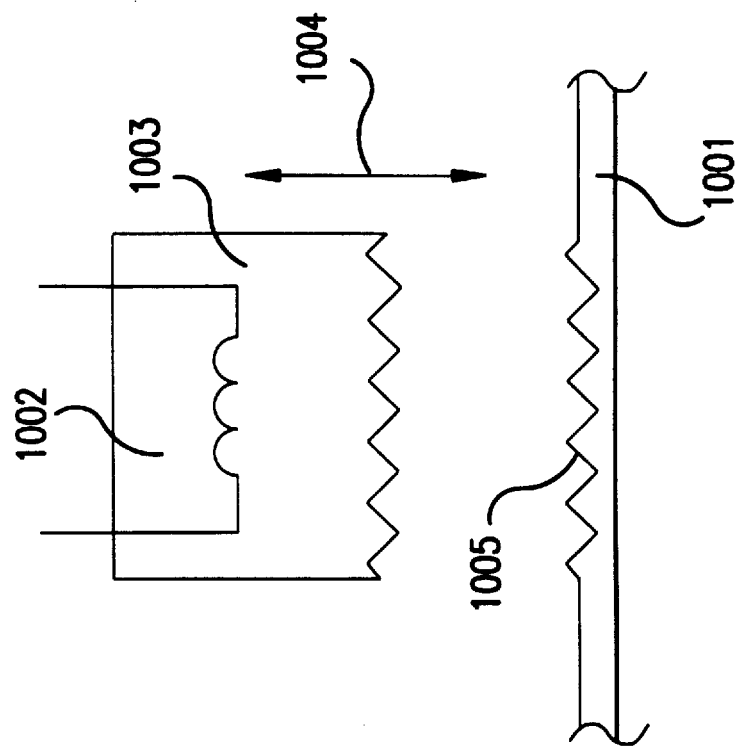
FIG. 9 is a schematic diagram showing a method for producing a polarizer in accordance with an eleventh embodiment of the invention.

FIG. 9 is a schematic diagram illustrating a method for producing an optical device in accordance with an eleventh embodiment of the present invention. A sawtooth mold 1003 is heated at a high temperature with a heater 1002 and is moved in the direction denoted by the arrow 1004 to press a sheet 1001 of a transparent substrate made of PMMA. This creates a sawtooth structure 1005 on the sheet 1001. After the pressing, a thin dielectric film is deposited on the sawtooth structure 1005 by evaporation.

A glass block may also be used as a transparent substrate. In this case, it is preferable to heat the mold to a higher temperature than in the case where a substrate is used.

The mold may be made as follows. A pattern is formed on the mold by machining with a grinder or by photo-etching. Then, inclined planes are formed by blazing. In the production of the mold, it is preferable to use machining when the space between the edge lines is larger than 100 μm. Photo-etching is preferable when the space is less than 100 μm.

(Embodiment 12)

Figure 10:
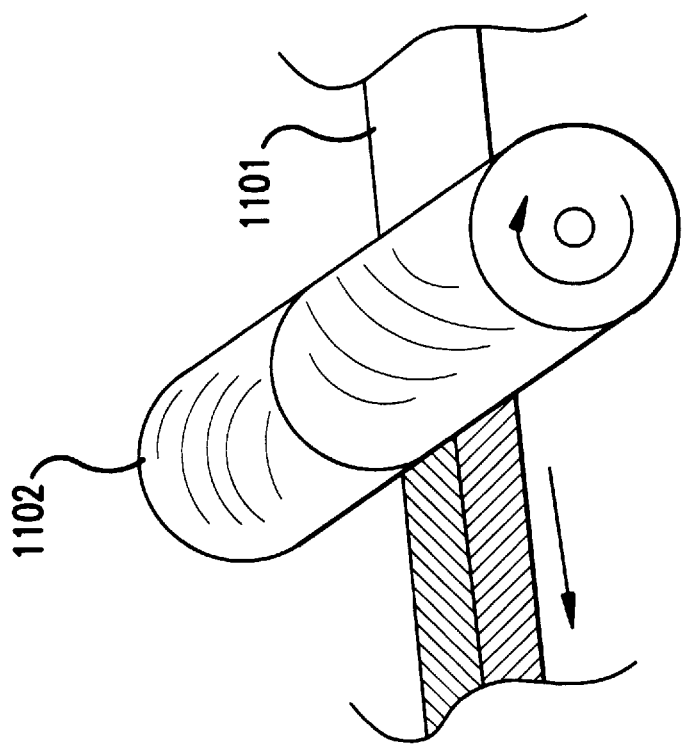
FIG. 10 is a schematic diagram showing a method for producing a polarizer in accordance with a twelth embodiment of the invention.

FIG. 10 is a schematic diagram illustrating another method for producing an optical device in accordance with a twelfth embodiment of the present invention. A roller 1102 having a sawtooth-shaped surface is pressed onto a transparent substrate of a plastic film 1101. Roller 1102 is rotated on plastic film 1101 to transfer the sawtooth structure at the roller to the film 1101. It is possible to produce two edge lines extending in different directions in one process. The roller may be heated as required. Then, a multi-layer dielectric thin film acting as a polarizing optical thin film is formed by evaporation on the plastic film 1101. Then, plastic film 1101 1is cut into the shape of a polarizer. The roller may be made by directly machining a metal cylinder to form a saw-toothed structure on its surface. Alternatively, the roller may be obtained by forming a saw-toothed structure on the surface of a flat plate and wrapping the flat plate around a cylinder.

(Embodiment 13)

Figure 26:
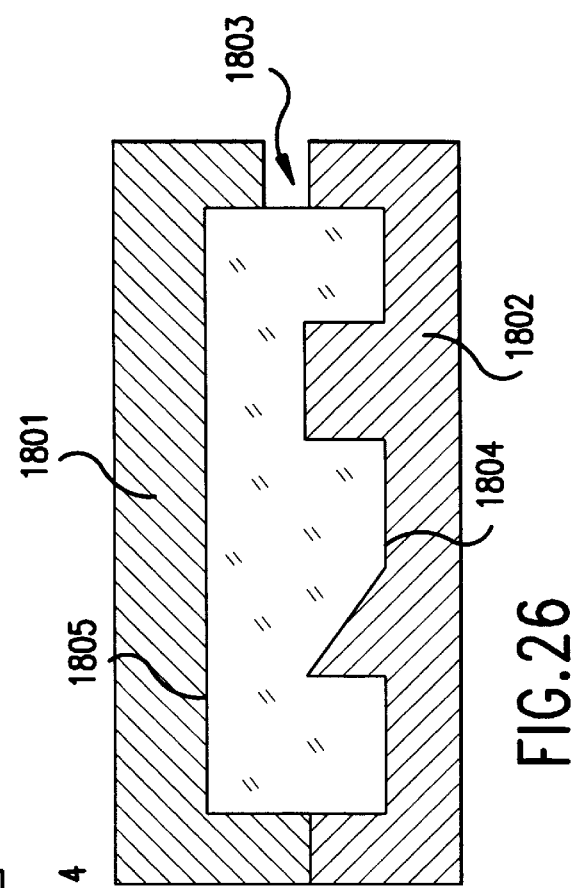
FIG. 26 is a schematic diagram showing a method for producing a polarizer in accordance with a thirteenth embodiment of the present invention.

FIG. 26 is a schematic diagram illustrating a method for producing an optical device by plastic injection molding in accordance with a thirteenth embodiment of the present invention. First, metal molds 1801 and 1802 are prepared that define the shape of a polarizer having inclined planes. Then, a melted resin is pressure injected into the molds through a gate 1803. After the resin cools and hardens, molds 1801 and 1802 are removed. Then, the gate portion is cut off, resulting in the structure of a polarizer in accordance with the present invention. Afterwards, a multi-layer dielectric thin film acting as a polarizing optical thin film is deposited by evaporation on the surface 1804 that includes the inclined planes. Furthermore, the spaces adjacent to the inclined planes are filled with a transparent resin having a refractive index approximately the same as that of the injected resin. In this way, a complete polarizer in accordance with the present invention is obtained. Alternatively, glass may also by used as a material to be injected into the molds to obtain a similar structure.

(Embodiment 14)

Figure 27:
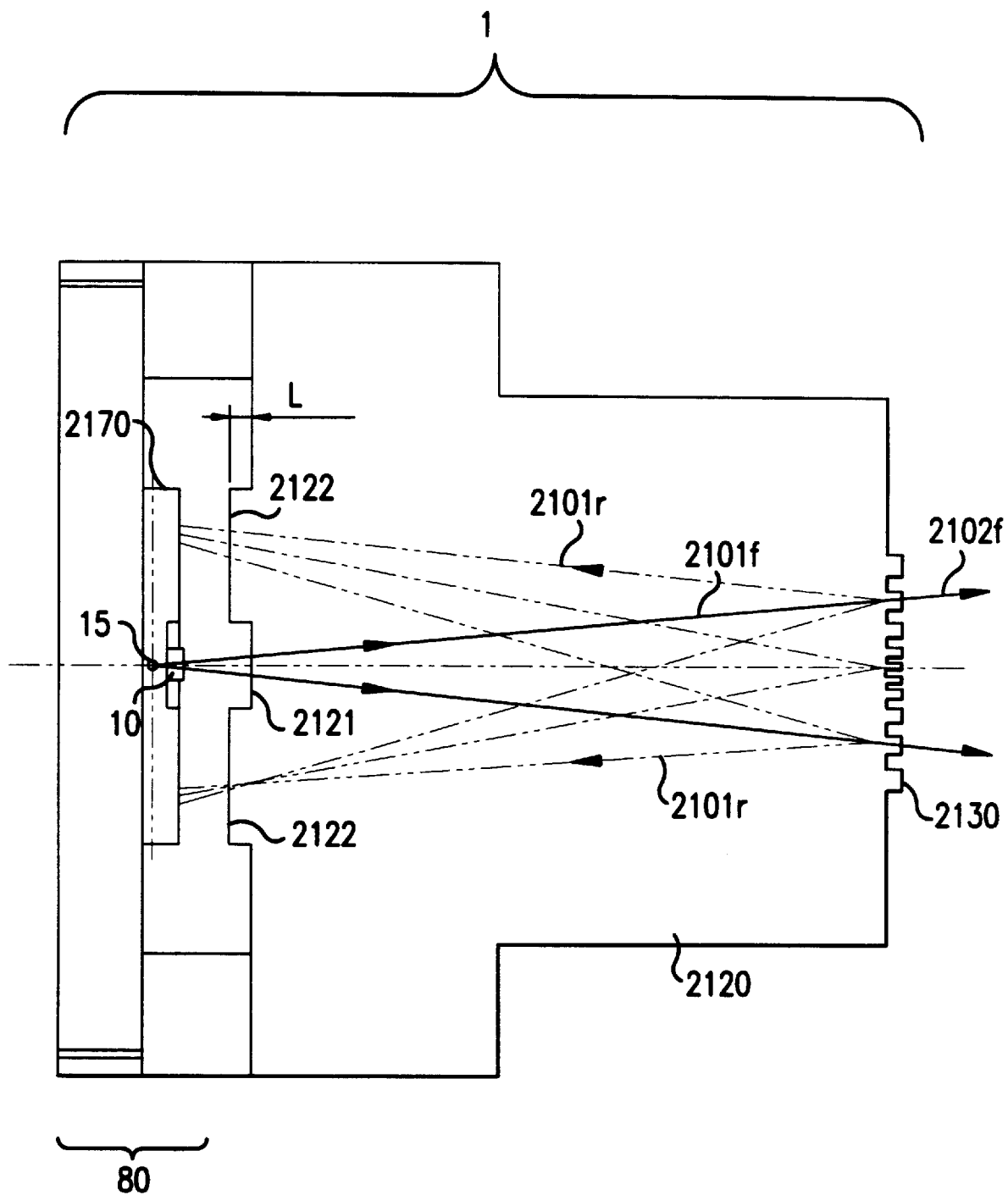
FIG. 27 is a sectional side view of an optical head including an optical element in accordance with a fourteenth embodiment of the present invention.
Figure 28:
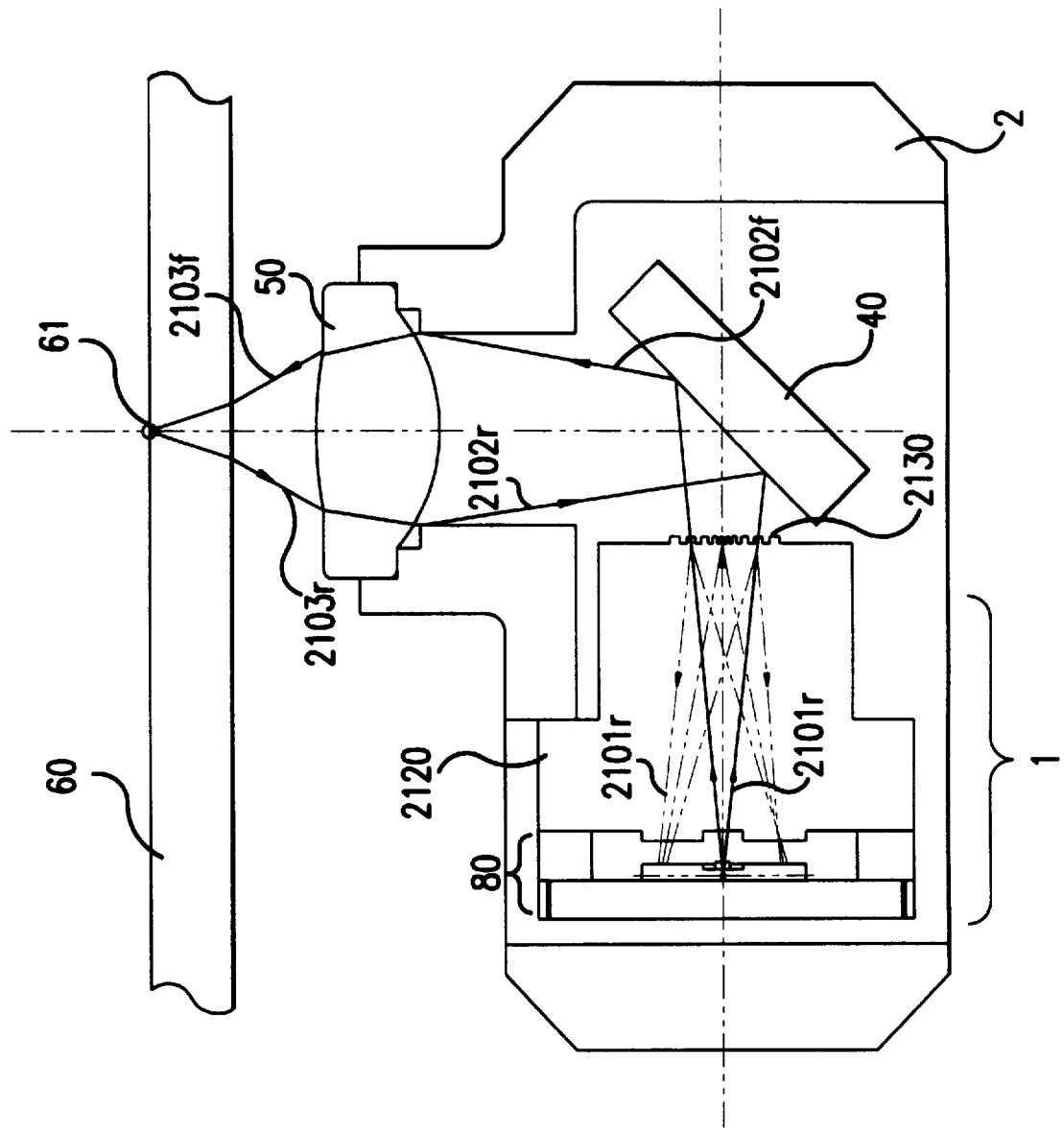
FIG. 28 is a sectional side view of an optical pick-up including the optical head in accordance with the fourteenth embodiment.

FIG. 27 is a side view of an optical head in accordance with a fourteenth embodiment of the present invention, and FIG. 28 is a side view of a pick-up configured with the optical head. In FIG. 27, a light emitting device 10 consists of a semiconductor laser light source of the optical head. Reference numeral 2120 denotes an optical element that will be referred to as a cover plate. Reference numerals 2130 and 2170 denote a hologram (or holographic surface) comprising a curved diffraction grating, and a light receiving device consisting of a multi-divided photodiode, respectively. Reference numeral 80 denotes a housing for containing and holding light emitting device 10 and light receiving device 2170. The housing 80 comprises a case having an aperture on one side being covered and sealed with the optical element 2120. All elements are combined into one body to form an optical head 1. Thus, in optical head 1, a light source and an optical system for detection are formed into the shape of a cubic body as small as about 5×5×5 mm$^3$ and different functions are also combined as will be described later in more detail.

In FIG. 28, reference numeral 2 denotes a case of the optical pick-up within which the optical head 1 described above is contained. In addition, a mirror 40, and an objective lens 50 are contained in the case 2 so that all elements are driven in an integral fashion (in operation of servo-focusing and servo-tracking and the like). The objective lens 50 is the only lens included in the pick-up, thus achieving an optical system with a compact configuration. More specifically, the distance between the object and the image (total track) of the objective lens 50 is as small as about 15 mm. As a result, size and weight reductions of case 2 are achieved. With this embodiment, it is possible to obtain a light weight optical pick-up that weighs about 2 g. Reference numeral 60 denotes an optical recording medium or optical disk that has grooved tracks (not shown) with a small pitch on its recording surface.

In FIG. 27, the optical element or cover plate 2120 has a step L formed on the surface near the light emitting device 10, thus dividing the surface area into a flat area 2121 and a stepped area 2122. Optical element 2120 may be easily made by injection-molding of an optical resin such as PMMA (poly methyl methacrylate), PC (polycarbonate), or APO (amorphous polyolefin). Alternatively, the optical element may be made by pressing low-melting glass at a high temperature.

Figure 29:
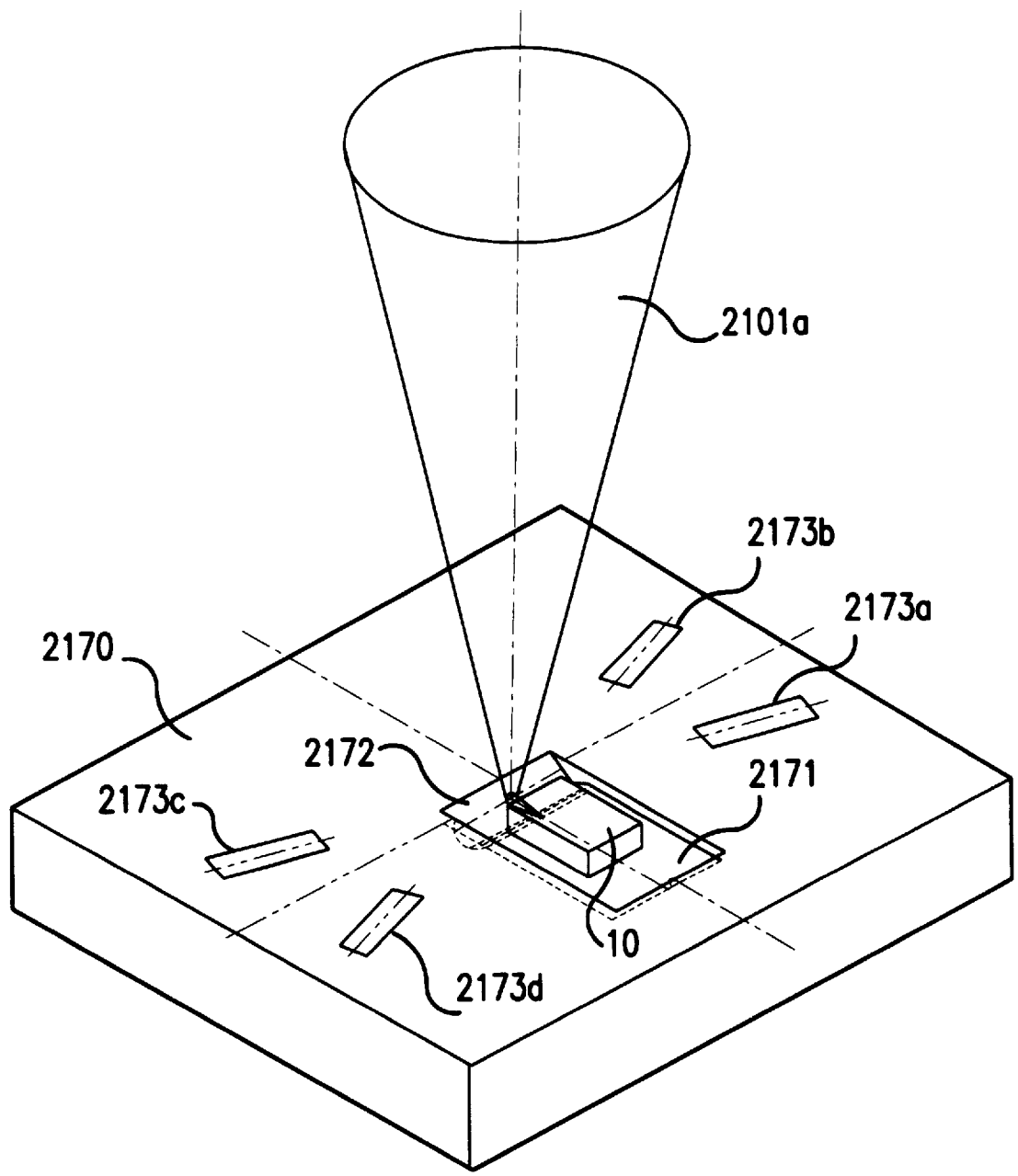
FIG. 29 is a perspective view of a light emitting device and a light receiving device of the optical head in accordance with the fourteenth embodiment.
Figure 30:
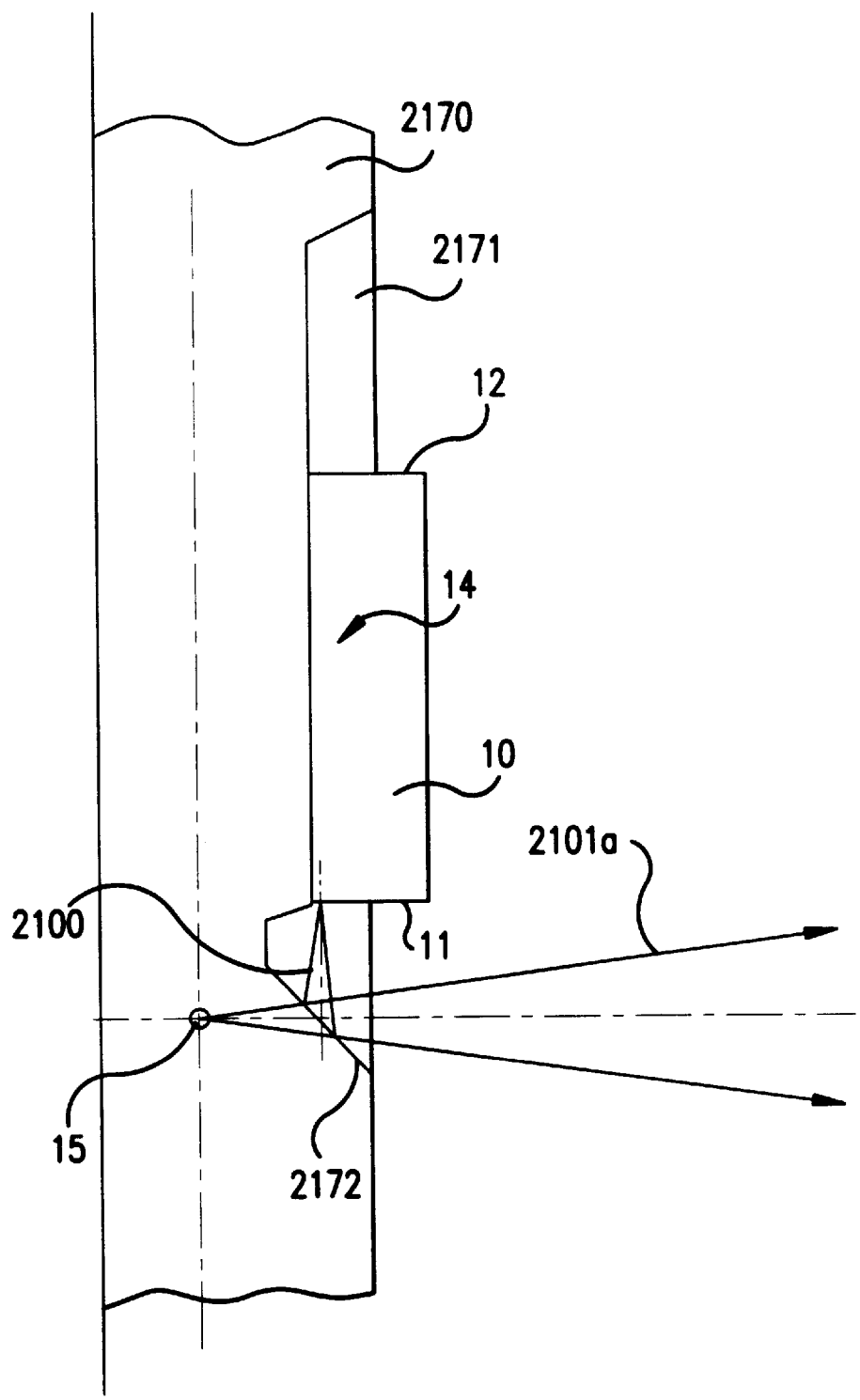
FIG. 30 is a cross-sectional view of the light emitting device and the light receiving device of the optical head in accordance with the fourteenth embodiment.

In practical processing, it is impossible to mount the light emitting device 10 in a perfect fashion such that the surface of the light emitting device 10 exists exactly in the same plane as the light receiving plane, that is, the surface of the light receiving device 2170. This is due to the fact that in semiconductor fabrication processing of the light receiving device 2170, a semiconductor wafer is cut into a small piece, which leads to difficulty in making a through-hole at a central portion of the chip. One solution is to mount the light emitting device 10 on the light receiving device 2170. However, in this case, because surface 11 of the light emitting device 10 via which the light is emitted (see FIG. 30) and opposite surface 12 act as boundary faces for internal reflection in laser operation, these surfaces are not allowed to be in contact with the light receiving device 2170 or the like. Thus, it is critical that light emitting device 10 is fixed to the bottom surface 14 as shown in FIG. 30. In this embodiment, to minimize the number of parts, a recess 2171 and an inclined plane 2172 are provided substantially near the central portion of light receiving device 2170. Light emitting device 10 is mounted in recess 2171 in a horizontal position so that light beam 2100 emitted from light emitting face 11 is reflected from inclined plane 2172, thus providing a divergent light beam 2101a emerging in the direction perpendicular to the surface of the light receiving device 2170, as shown in FIGS. 29 and 30. Inclined plane 2172 is inclined approximately at 45°. Recess 2171 and inclined plane 2172 may be easily formed in the light receiving device 2170 made of a silicon substrate by anisotropic etching. A thin gold film may be deposited by evaporation on the inclined plane 2172 to obtain a reflecting plane exhibiting a high reflection factor.

Here, when light emitting device 10, that is, a laser chip, is mounted in such a manner as described above, the virtual light emitting point, which is the mirror image of the real light emitting point of the light emitting device 10 about the inclined plane 2172 formed in the light receiving device 2170, lies at a position apart downward (to the left in FIG. 30) from the light receiving surface of the light receiving device 2170. At present, the technology of the surface-emitting semiconductor laser has not yet been well established. Thus, it is not possible to produce a light emitting device and a light receiving device on the same chip in a full monolithic fashion by using successive fabrication processes. Considering the above fact, the best currently available mounting technique is to mount a laser chip light emitting device 10 that has been fabricated separately on a light receiving device 2170 such that the inclined plane 2172 reflects light to yield a light beam 2101$f$ in the direction perpendicular to the plane of the light receiving device. In this case, virtual light emitting point 15 exists at a downward location from the light receiving device 2170 by, for example, 0.08 mm.

If there is an increase in the number of parts, a stem (a rectangular metal block, not shown), for example, may be attached to the surface of the light receiving device 2170 and the light emitting device 10 may be mounted on the side of the stem such that the light emitting device 10 may be parallel to the side of the stem (that is to say, perpendicular to the light receiving device 2170). In this case, the light emitting point (not shown) of light emitting device 10 lies at an upward position from the light receiving device. In any case, the light emitting point slightly deviates either downwardly or upwardly from the light receiving surface of the light receiving device 2170.

Referring back to FIGS. 27 and 28, optical behaviors in the optical head in accordance with this embodiment will be described hereinbelow. The forward light beam 2101$f$ that is a divergent light beam emitted from the light emitting device 10 is incident at a location close to the central portion that is the flat area 2121 of the light element 2120. Then the light beam passes through the flat area and emerges from the hologram 2130 formed on the surface of the optical element 2120. The light 2102$f$ of zero order, i.e., the light not diffracted by the hologram 2130 is incident on the mirror 40 and the objective lens 50. The objective lens 50 focuses the light beam 2103$f$ to form an image of a spot 61 on the recording surface of the optical recording medium 60. The light beam 2103$r$ reflected from the optical recording medium 60 travels along a reverse path. Light beam 2103$r$, after being retracted by lens 50, becomes light beam 2102$r$ and is incident on the hologram 2130. The returning light beams 2101$r$, that is, diffracted light beams of the +/− first order, pass through the inside of the optical element 2120 and come out at stepped areas 2122. Then, light beams 2101$r$ are incident on the light receiving surface, that is, the surface of the light receiving device 2170.

Figure 31:
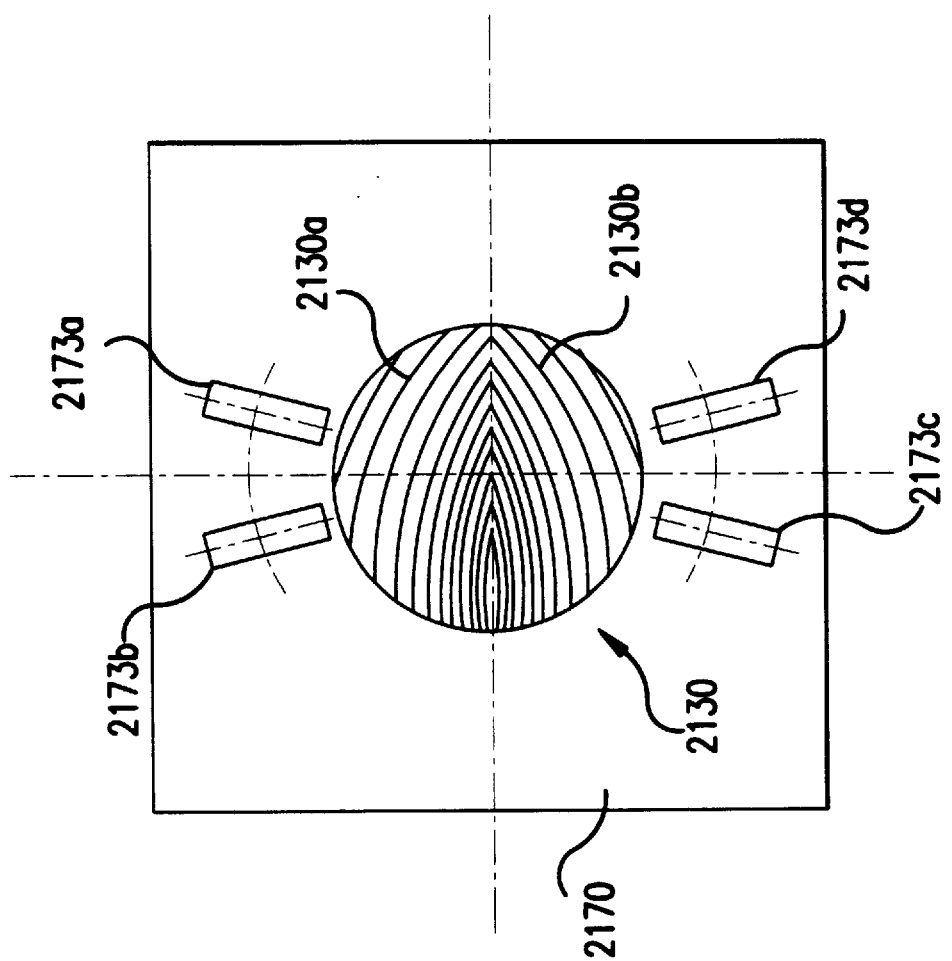
FIG. 31 is a plan view of a hologram of the optical head in accordance with the fourteenth embodiment.
Figure 32:
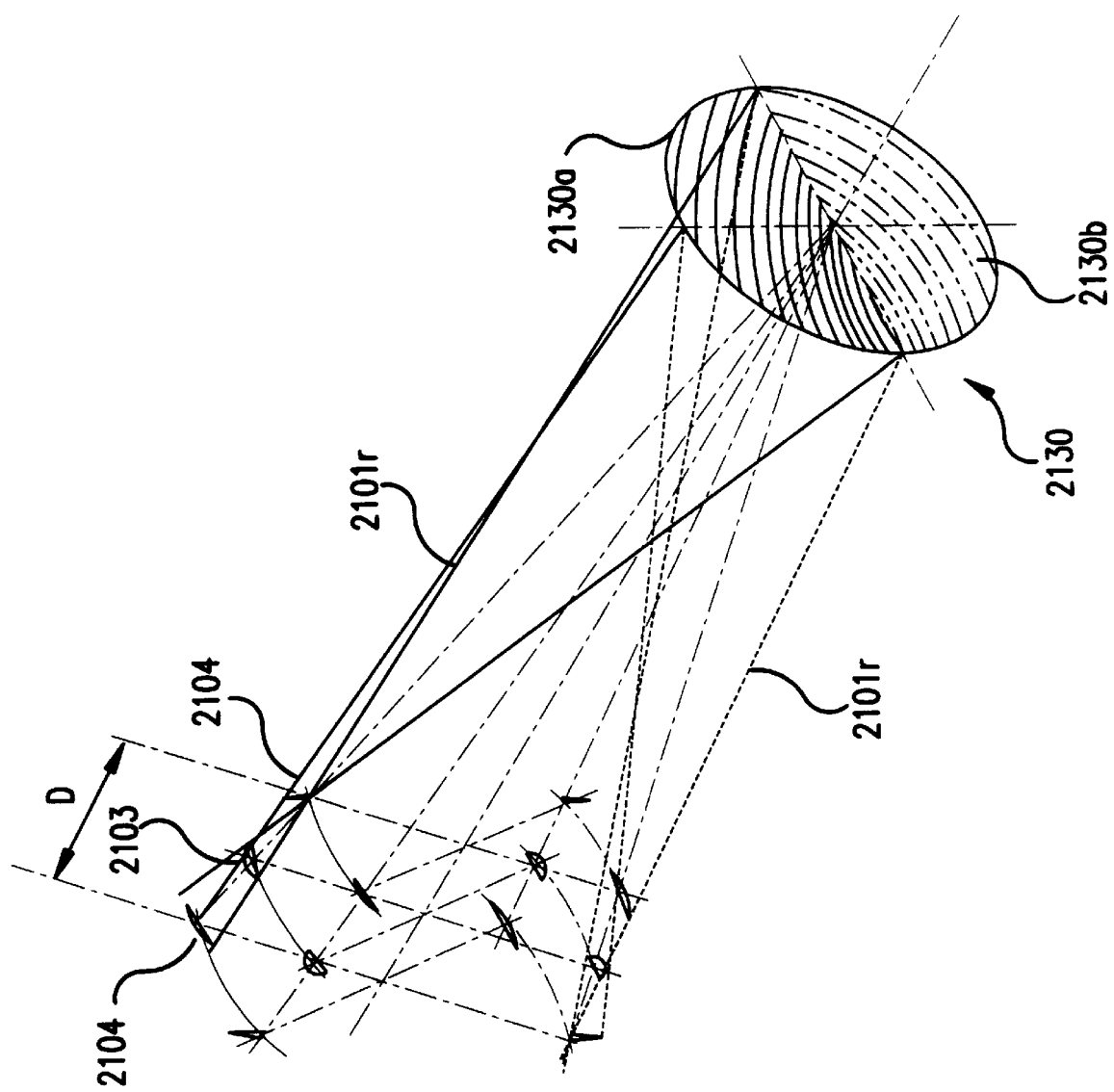
FIG. 32 is a perspective view showing the function of the hologram of the optical head in accordance with the fourteenth embodiment.
Figure 33:
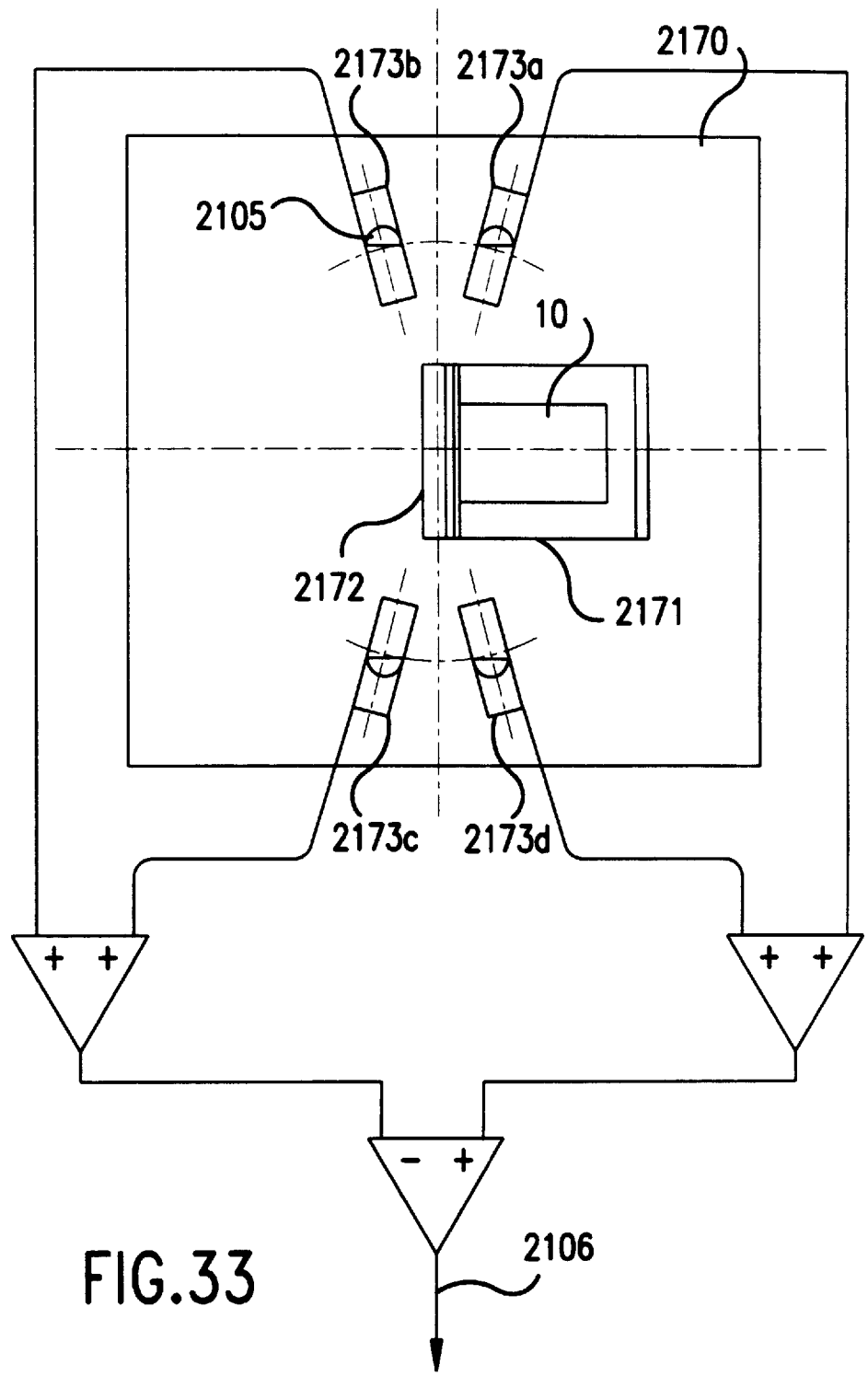
FIG. 33 is a plan view of the light emitting device and the light receiving device of the optical head in accordance with the fourteenth embodiment.

As shown in FIGS. 31 and 32, the hologram 2130 is divided into two regions corresponding to the radial direction of the optical recording medium 60, that is, the direction perpendicular to the grooved tracks or the direction of push-pull modulation. Two kinds of holographic patterns 2130$a$ and 2130$b$ each yield two diffracted light beams of the +/− first order. Accordingly, the light beam is split into four diffracted returning light beams 2101$r$. In addition, the hologram pattern is designed so that a large amount of astigmatism occurs. As shown in FIG. 33, the light receiving device 2170 has light receiving patterns 2173 consisting of four separate strip areas formed by semiconductor fabrication processes. Light beams 2101$r$ are focused to form receiving light spots 2105 on respective light receiving patterns 2173. Because of the astigmatism described above, the shapes of receiving spots 2105 vary depending on the focusing errors. Correspondingly, variations occur in the amounts of light beams that are contained within the receiving patterns 2173.

In this embodiment, variations in the amounts of the light are converted from optical signals to electric signals to obtain a focusing error signal (i.e., the astigmatism method), and a tracking error signal is obtained by performing optical-to-electric signal conversion with respect to the difference between the amount of a light beam passing through the pattern 2130$a$ and the amount of light passing through the pattern 2130$b$, wherein each pattern 2130$a$ and 2130$b$ is a half pattern of the hologram 2130 (what is called a push-pull method).

Figures 34A, 34B, 34C:
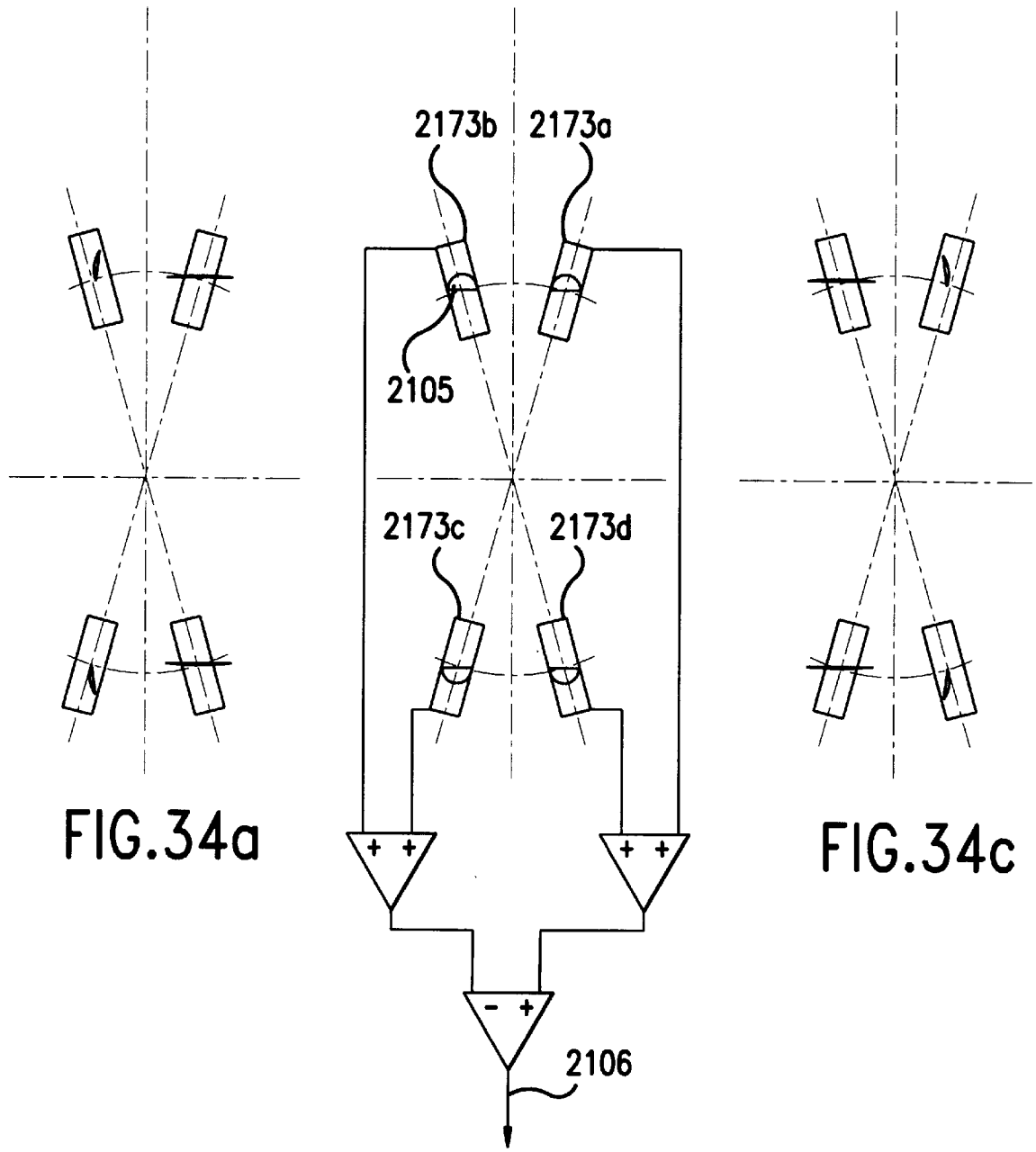
FIGS. 34a, 34b and 34c are schematic diagrams of the present invention showing the change of the receiving light spot.
Figure 35:
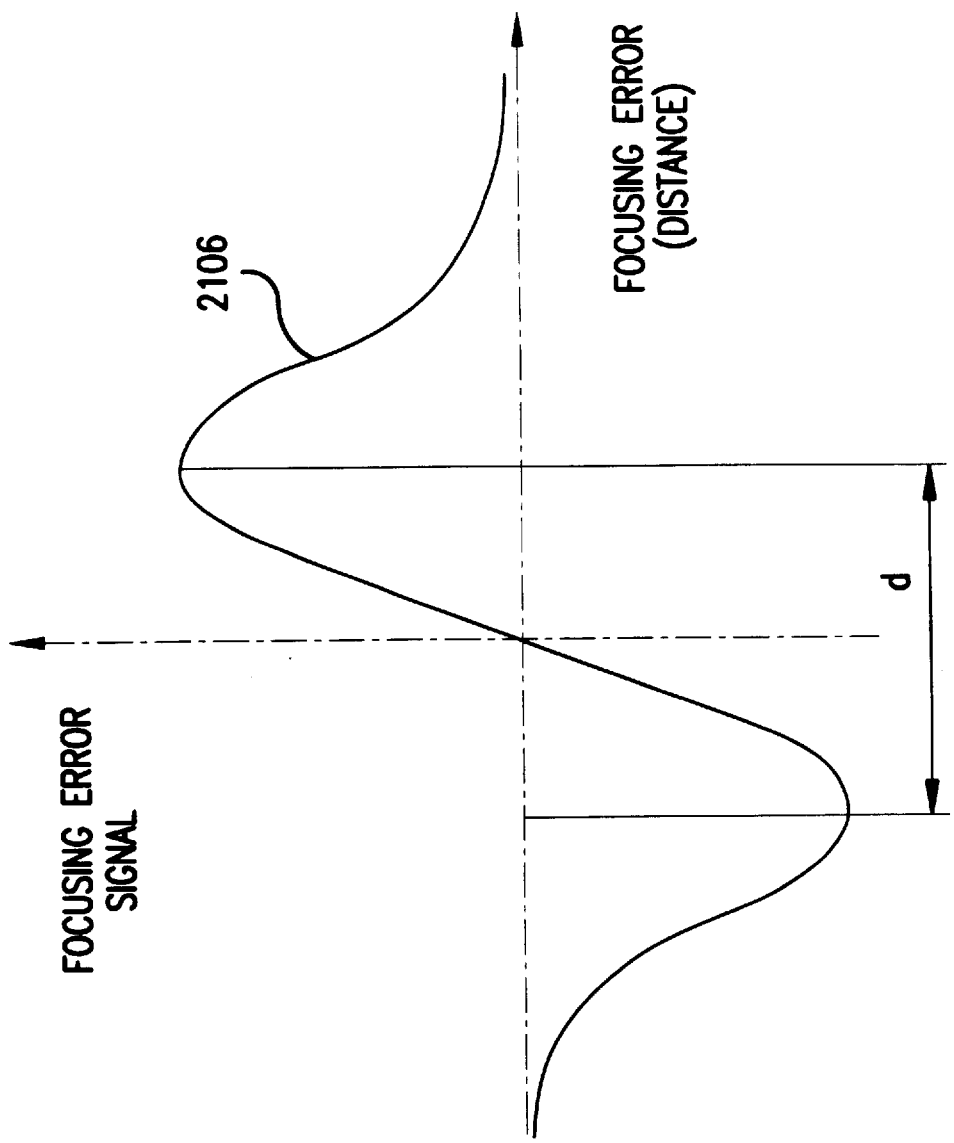
FIG. 35 is a graph showing a focusing error signal of the optical head in accordance with the fourteenth embodiment.

Referring to FIG. 32, in the normal state in which the focusing error is zero, adjustment should be done such that the returning light beam 2101$r$ that illuminates light receiving device 2170 may fall at the center of the astigmatic difference D (distance between focal lines). In other words, returning light beam 2101$r$ should fall within the circle of least confusion 2103. If adjustment is done in such a manner, the astigmatic difference D is located equally about the position of the circle of least confusion 2103 as shown in FIG. 32. As a result, when the focusing error is in the normal state, the returning light beam 2101$r$ forms receiving spots 2105 having the shape of the circle of least confusion as shown in FIG. 32 or 34$b$, and thus the same amount of light is sensed by each of channels 2173$a$–2173$d$. In this situation, the focusing error signal given by $$(2173a-2173c)+(2173d-2173b) = (2173a+2173d)-(2173b+2173c)$$

will be zero. If the distance between the optical recording medium 60 and the objective lens 50 changes and thus if the focusing error increases, the focusing of the returning light beams 2101$r$ changes on the principle of geometrical optics, thus resulting in shifts of the focal lines 2104 toward the optical axis. Then, as shown in FIG. 34$a$ and FIG. 34$c$, the shapes of the receiving light spots 2105 change to an ellipse and thus the sensed amounts of light associated with the receiving light patterns 2173 change. As a result, change occurs in the level of the focusing error signal 2106. When describing astigmatic difference and magnification (lateral (i.e., the orthogonal direction of the optical axis,) magnification: image side/object side) of the objective lens 50 by D and R, respectively, the focusing error represented by a distance d is given by $$d = D * (R * R)/2$$

for the region where the focusing error varies monotonically. Thus, the focusing error signal 2106 changes as shown by the curve in FIG. 35. In this embodiment, taking into account ease in processing of the objective lens 50 and a desirable distance between the object and the image, a preferable magnification of the objective lens 50 is about ¼. In this case, the above equation becomes $$d = D/32$$

The focusing error signal 2106 discussed above and the tracking error signal described earlier are used as error signals for servo-focusing and servo-tracking, respectively, to focus spot 61 accurately on the optical recording medium 60. To perform accurate control in servo-focusing, it is critical that the focusing error signal 2106 should be zero in the normal state, or in other words, there should be no initial offset in the focusing error signal 2106. However, because the servo-system itself is not an essential part of the present invention, more detailed description will not be given hereinbelow.

As described earlier in this embodiment, the optical system forms a finite system, (that is, it is a fixed, small number of elements) and thus, as shown in FIGS. 27 and 28, a relationship exists between the optical conjugance virtual light emitting point 15 and the focal point (the location of the spot 61) of the objective lens 50. In addition, a relationship exists between the optical conjugance of the focal point of objective lens 50 and the focal point of returning light beam 2101r, that is, the circle of least confusion 2103. As a result, a relationship of optical conjugance exists between virtual light emitting point 15 and the circle of least confusion 2103. Here, if it is possible to locate both virtual light emitting point 15 and the circle of least confusion 2103 in the same plane in the direction of the optical axis, it is assured that no offset occurs in the focusing error signal 2106 because the light receiving spot on the light receiving device 2170 becomes the same shape as the circle of least confusion 2103.

Figure 36:
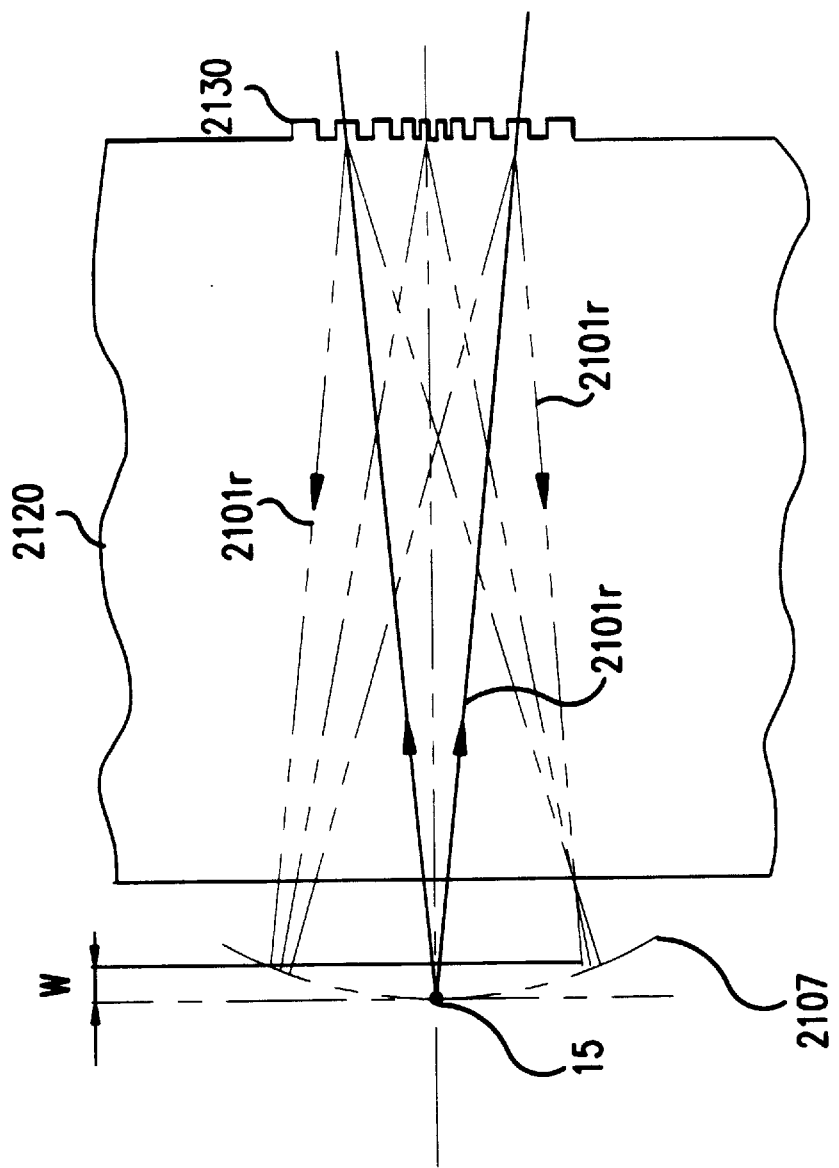
FIG. 36 is a schematic diagram which shows bending of the image surface of the optical head in accordance with the fourteenth embodiment.

However, as described above referring to FIG. 30, virtual light emitting point 15 lies beneath the light receiving plane of light receiving device 2170 by about 0.08 mm. Furthermore, as shown in FIG. 36, due to aberrations in geometrical optics associated with objective lens 50 and hologram 2130, bending in the forward direction (toward the optical element 2120) occurs in the image surface 2107 (that can be considered to be a plane containing the circle of least confusion 2103) formed with light of the +/– first order yielded by the hologram 2130. As a result, it is possible to perform automatic compensation of the deviation of the virtual light emitting point 15 to a certain degree. However, under practical limited conditions, it is difficult to design the optical system such that the amount of bending of the image surface (denoted by W in FIG. 36) corresponds to the deviation of the virtual light emitting point 15. While there exists a deviation of 0.08 mm, the amount of bending W of the image surface is, for example, as large as 0.13 mm, which leads to overcompensation. In this case, there exists residual deviation of 0.05 mm that can give an offset in focusing error signal 2106 as large as about 1.6 $\mu$m.

Therefore, if nothing further is done, there occurs initial offset in the focusing error signal 2106. To solve this problem, the present embodiment provides a step on the surface of the optical element 2120 (also called a cover plate) as described earlier to adjust the optical length. This is a very simple method to solve the above problem, which is one of the characteristic assets of the present invention. The step L (FIG. 27) between the surface 2121 and the surface 2122 is given by $L = n\Delta s/(n-1) = 1.5 * 0.05/(1.5-1)$ where $\Delta s$ is an optical length to be compensated (0.13 mm–0.08 mm=0.05 mm) and n (=1.5) is the refractive index of optical element 2120. Therefore, if L is made to be 0.15 mm, then the position error is corrected in the direction of the optical axis between virtual light emitting point 15 and light receiving device 2170. Thus, the initial offset in the focusing error signal 2106 is cancelled.

The present embodiment has a great advantage that no process is required for adjustment of the initial offset in the focusing error signal. The step described above is formed by directly transferring a step in the mold. Therefore, the accuracy of dimension L is determined by the accuracy of the mold that has an accuracy of better than the required dimensional tolerance of +/–10 $\mu$m. The equivalent value of the deviation of the image surface associated with the returning light beam 2101r relative to the virtual light emitting point 15 corresponding to the above dimensional tolerance is given by $\Delta s = L * (n-1)/n = 10 \mu m * (1.5-1)/1.5$ Thus, we can obtain $\Delta s = 3.3$ $\mu$m. This value of $\Delta s$ can be further converted to the corresponding focusing error, that is, the initial offset, as follows: 3.3/32=0.1 $\mu$m. This means that the generally required tolerance in the offset (less than about 1 $\mu$m) can be easily attained. Thus, it is possible to delete the adjustment process with no problem.

In the example described above, the surface 2121 is made higher than the surface 2122 by step L, which means that the optical length of the returning path is longer compared to the optical path in the forward direction. However, in the case where there exists only a small amount of bending in the image surface associated with the returning light beam 2101r (for example, in the case where diffraction angle of the hologram is small), the optical length of the returning path of the light beam 2101r should be made less than that of forward path as opposed to the above case. This can be achieved by forming the step such that the surface 2122 is recessed with respect to the surface 2121.

In the above example, the detection of the focusing error signal 2106 is done by what is called an astigmatism method. However, application of the present invention is not limited to this method. For example, in a method using the focusing error detection such as a spot size method, similar problems can occur. Therefore, the problems that have been discussed above are inherent for optical heads that are configured with one package 80 containing both of a light emitting device 10 and light receiving device 2170. Therefore, the present invention and the present embodiment can be applied to a variety of optical heads of this type. The optical element 2120 may also be produced by bonding separate optical parts into one body such that there exists a step L on its surface instead of using molding process. However, in this case, dimensional accuracy is slightly degraded.

In the above example, the main purpose of the optical element 2120 is to achieve a different optical length between the forward path of the light beam 2101f and the returning path of the light beam 2101r. However, the basic idea of the present embodiment is that in an optical element through which a plurality of light beams pass, each optical length is established independently of each other. Therefore, the fields to which the present invention are applicable can be expanded to any apparatus other than optical heads including an optical system in which there exist a plurality of convergence or divergence light beams passing near each other.

(Embodiment 15)

Figure 37:
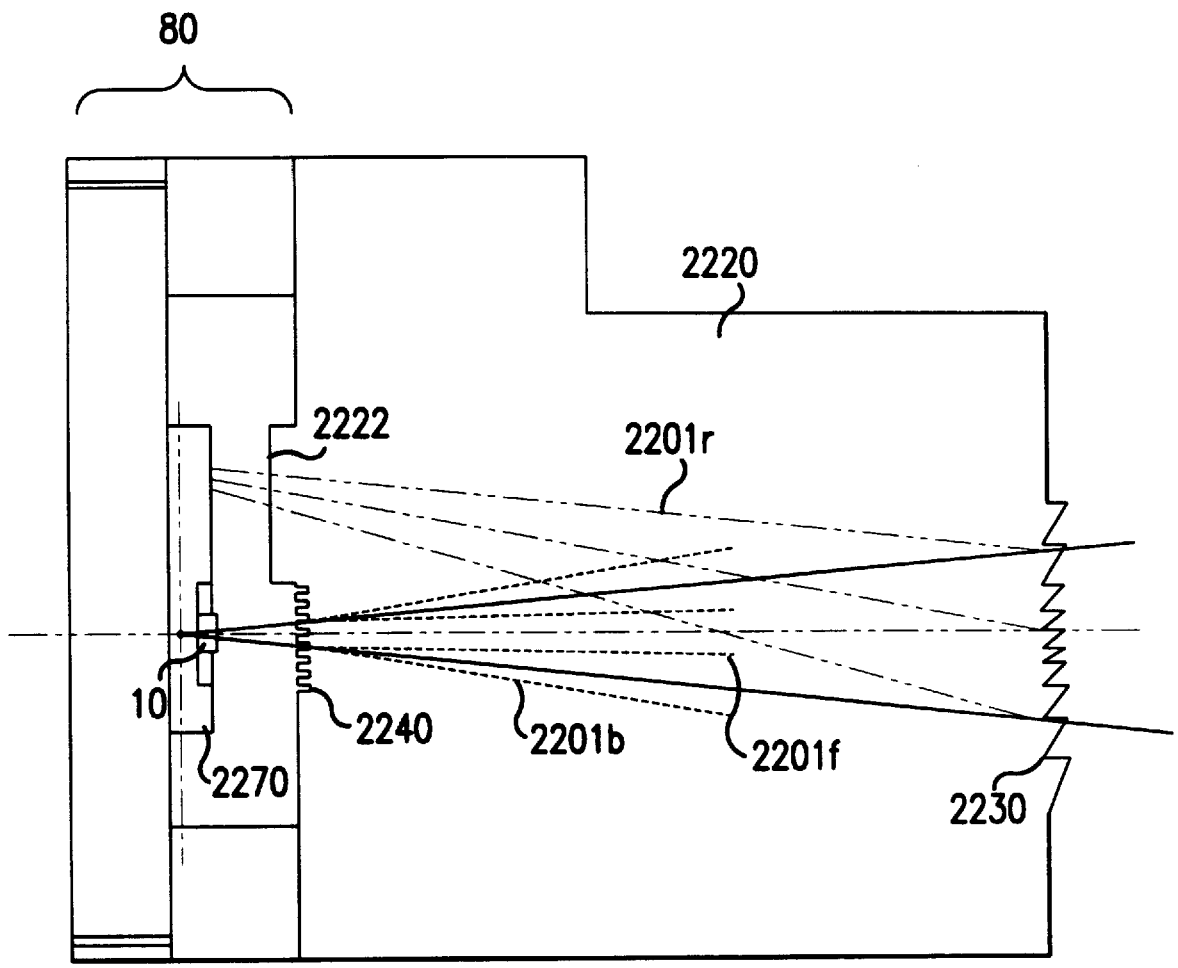
FIG. 37 is a side view of an optical head in accordance with a fifteenth embodiment of the present invention.

FIG. 37 is a side view of an optical head in accordance with a fifteenth embodiment of the present invention. The optical system for use in this embodiment is basically similar to that in the previous embodiment except that a hologram 2230 formed on one surface of an optical element 2220 is a blazed hologram whose section taken in the direction across the diffraction grooves has a shape of small sawtooth-like triangles, except that a diffraction grating 2240 consisting of simple straight line grooves is formed on the other surface of the optical element 2220.

Because the hologram 2230 is blazed, diffracted light of the first order, that is a returning optical beam 2201r is produced on only one side of the forward light beam, as is well known. Therefore, it is impossible to obtain a focusing error signal by means of differential detection using astigmatism as in FIGS. 27–30. Instead, a known double knife-edge method (or Foucault method) may be used to obtain a focusing error signal. The tracking error signal may be obtained by means of a known 3-beam method using light of the +/− first order generated by the grating 2240.

In this embodiment, as described above, the number of diffracted light beams generated by the hologram 2230 is half that in the case of FIG. 27. As a result, the light receiving patterns (not shown) on light receiving device 2270 are arranged on only one side of the forward light beam. Thus, it is possible to further reduce the size of light receiving device 2270 and housing 80. In addition, because grating 2240 can be formed on optical element 2220 in an integral form, advanced functional integration can be achieved. Therefore, it is possible to provide an extremely small sized optical head with simple functions, for example, an optical head only for reproduction of a CD (compact disk). Referring to FIG. 37, the stepped area 2222 is formed on the optical element 2220 to adjust the optical length of the returning light beam 2201f (diffraction light of the first order) so that the initial offset in the focusing error signal can be cancelled.

(Embodiment 16)

In embodiment 14 described earlier, the optical element 2120 having the step L is used to correct the deviation in the optical axis between the virtual light emitting point 15 and the circle of least confusion 2103 of the returning light beam 1201r. However, the correction of the optical path is also possible by an alternative method.

Figure 38:
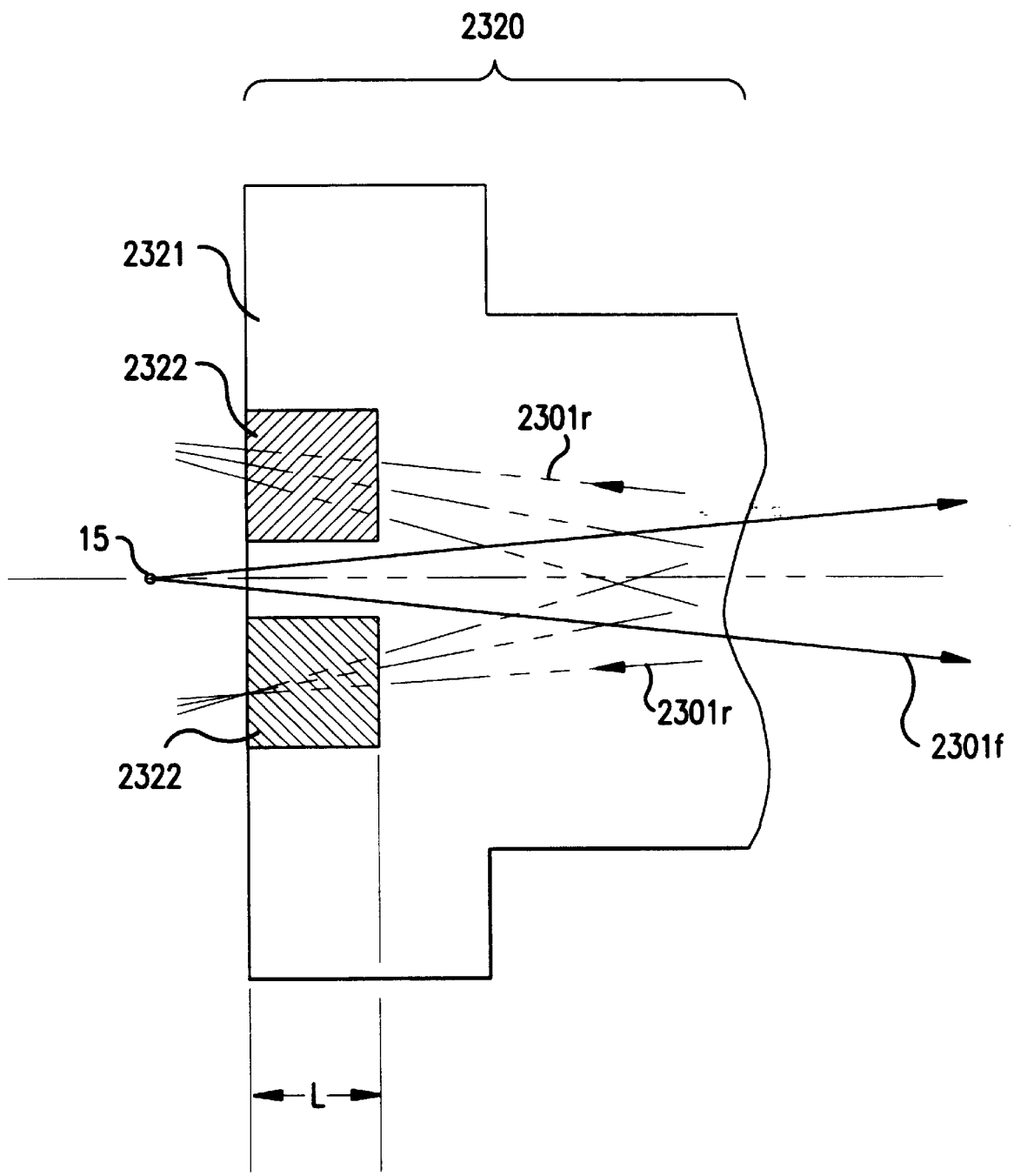
FIG. 38 is a side view of an optical element in accordance with a sixteenth embodiment of the present invention.

In a sixteenth embodiment shown in FIG. 38 an optical element 2320 is characterized in that modification of the optical path is achieved by partially varying the refractive index. That is, an optical element 2320 partially contains a material B (2322) that is different from a material A (2321) of the potion around the material B. This configuration can be achieved, for example, by so-called two-color molding using two-step injection molding. For example, first, the material B (2322) is injection-molded by using a small mold. Then, a part of mold is exchanged and the material A (2321) is injection-molded around the material B. Preferable materials are PMMA (refractive index of about 1.5) for the material A and PC (refractive index of about 1.6) for the material B. In this case, unlike embodiments 14 and 15, abrupt change in the refractive index such as that between a resin and air is not used. As a result, a rather wide range of difference in refractive index is required along the optical axis. The length L of the portion having different refractive index can be written as $$L = nB * \Delta s / (nB - nA) = 1.6 * 0.05 / (1.6 - 1.5)$$

where nA is the refractive index of the material A, nB is the refractive index of the material B, and Δs is the optical length to be compensated. In this case, the correction of the optical path can be achieved by letting L=0.75 mm. The refractive index is inherent for the material and can be controlled very accurately. This leads to an advantage that the optical path can be adjusted more accurately compared to embodiments 14 or 15.

Instead of the configuration in which the material B (2322) is molded such that the end face of the material B (2322) forms the same surface as that of the material A as shown in FIG. 38, material B may be fully contained within material A. Furthermore, instead of the two-color molding described above, optical element 2320 may be produced by means of fitting of a separate part having a different refractive index. However, this method is slightly disadvantageous with respect to dimensional accuracy. If allowed to use materials other than resins, it is also possible to partially change the refractive index by means of ion doping or the like as in the case of a graded-index lenses (so-called GRIN lenses).

(Embodiment 17)

Figure 39:
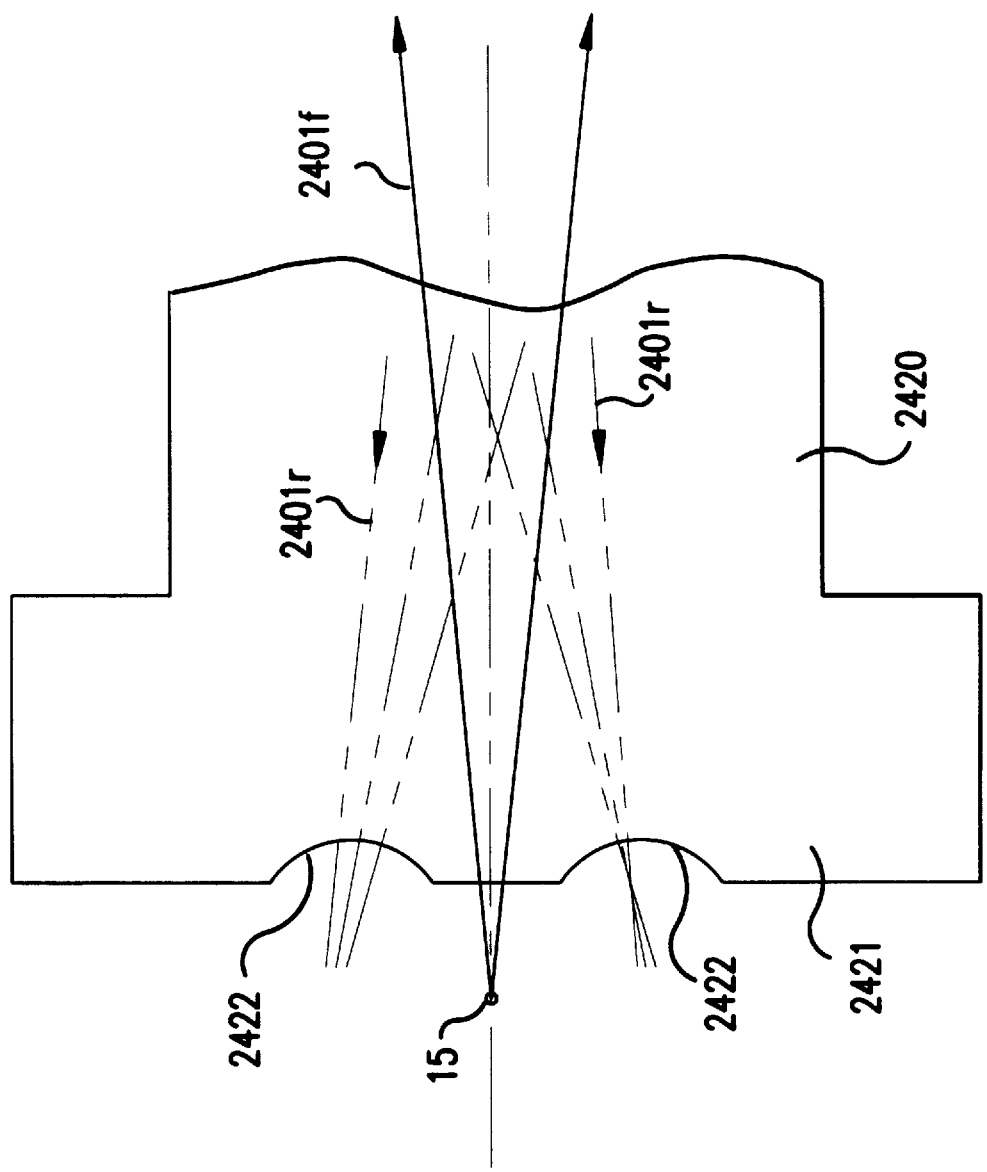
FIG. 39 is a side view of an optical element in accordance with a seventeenth embodiment of the present invention.

A seventeenth embodiment provides another method for compensating the optical length. Referring to FIG. 39, lens surfaces 2422 are partially formed on the surface 2421 of an optical element 2420. In this case, instead of utilizing difference in diffractive index as in the embodiment 16, refraction due to the lens is used to change the focal distance, that is to say, to shift the focal point. Concave-lens surfaces may be formed to extend the optical length of a light beam, and convex-lens surfaces may be formed so as to shorten the optical length. When this embodiment is applied to an optical head as in embodiment 14, it is preferable to adopt an aspheric surface for the lens surfaces 2422 to avoid unwanted aberration in the light beams.

(Embodiment 18)

Figure 40:
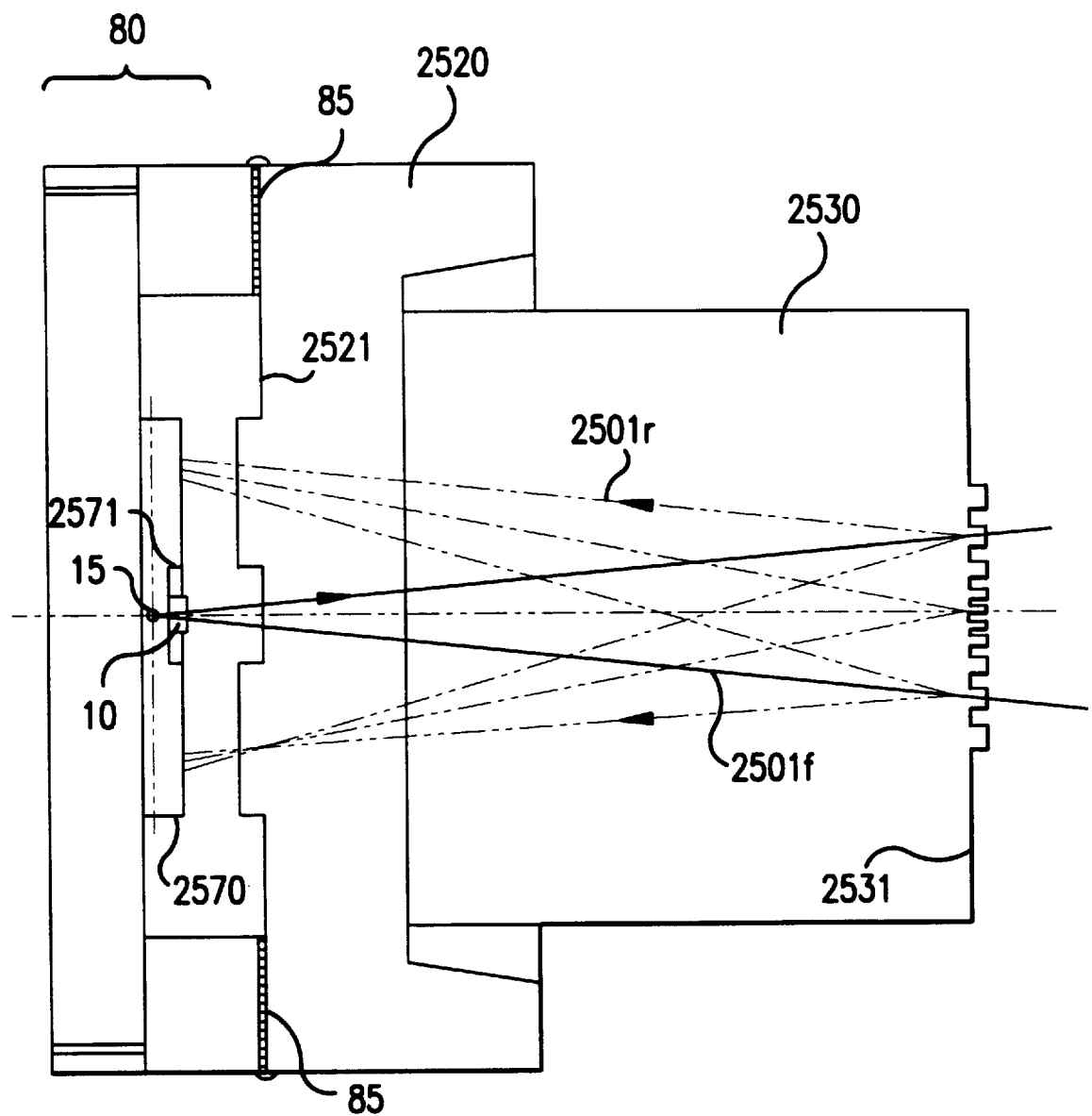
FIG. 40 is a side view of an optical head in accordance with an eighteenth embodiment of the present invention.
Figure 41:
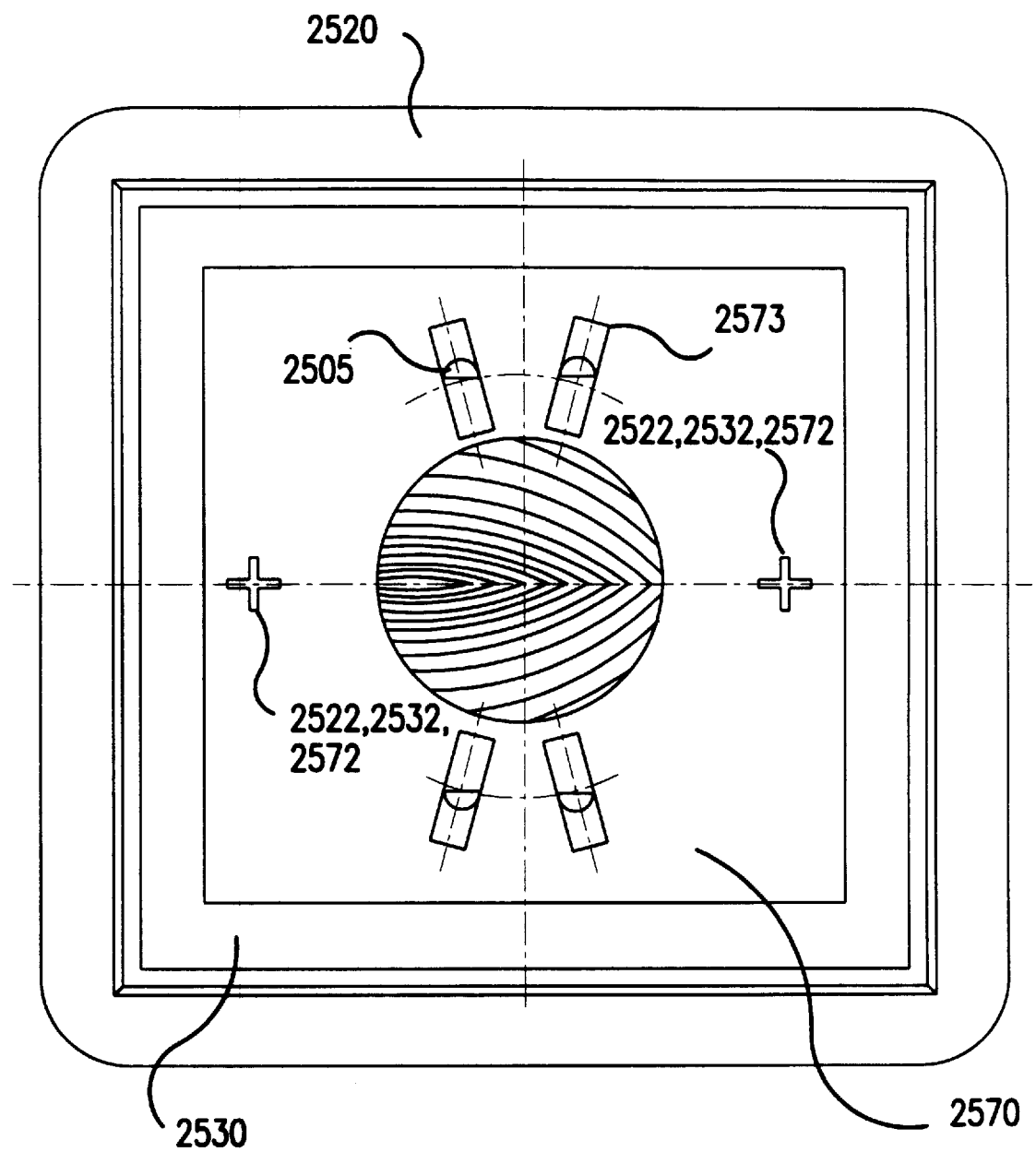
FIG. 41 is a plan view of the optical head in accordance with the eighteenth embodiment.

FIGS. 40 and 41 show another type of optical head having a cover plate or an optical element 2520 in accordance with an eighteenth embodiment of the present invention. This embodiment is based on the same principle of the optical system as that of embodiment 14, described earlier, except that optical element 2520 has a different shape and a holographic element 2530 is provided separately from the optical element 2520.

A plurality of alignment marks 2522, 2532, 2572, respectively, are provided on the back surface 2521 of the optical element 2520, the surface 2531 of the holographic element 2520, and the surface of a light receiving device 2570. The alignment marks are located at corresponding positions on respective surfaces (FIG. 41). The alignment marks are formed in the shape of a cross having a width of about 10 μm by means of etching or engraving with a mold, and are used to facilitate positioning in an assembly process. In this type of optical head, each receiving light spot 2505, corresponding to each channel, of the light receiving pattern 2573 of the light receiving device 2570, should have horizontal position accuracy better than about 10% with respect to the diameter of the receiving light spot 2505 (that is the circle of least confusion). For example, when the diameter of the receiving light spot 2505 is about 150 μm, positioning should be done with accuracy of +/−15 μm. The alignment marks (2522, 2532, 2572) can be formed with tolerance in position of about +/−5 μm with respect to each part if etching with a photo mask is used. Therefore, by watching these alignment marks in the direction of the optical axis, one can align the alignment marks so that the receiving light spots 2505 are positioned with an accuracy of about +/−10 μm relative to the light receiving pattern 2573.

Now, a method for assembling an optical head in accordance with this embodiment will be described hereinbelow. Referring to FIG. 40, light receiving device 2570 and a laser chip acting as a light emitting device 10 mounted in the recess 2571 on the light receiving device 2570 are fixed to the inside of the housing 80. Fixing of these devices is usually performed by means of bonding with a silver-filled adhesive. The outer shape of the section of housing 80, taken in the horizontal direction, is the same as that of the optical element 2520. The aperture face of the housing 80 is substantially flat. A small amount of adhesive 85 is coated on the aperture face of the package 80. Then, the optical element 2520 is placed on the aperture face of the housing 80 and the above-mentioned alignment marks 2522 are positioned accurately with respect to the corresponding alignment marks 2572 using an X-Y-θ table. Then adhesive 85 is cured.

In this embodiment, a preferable adhesive 85 is an acrylic-based UV (ultraviolet)-hardening resin, which leads to good workability. Preferably, the adhesive should have a post-cured hardness that is much softer than optical element 2570 and housing 80. In general, an epoxy resin or ceramic is preferably used for the housing 80 which requires molding for metal interconnections. On the other hand, the optical element 2520 is made of an optical resin such as PMMA as described in connection with embodiment 15. However, these materials are different from each other in coefficient of thermal expansion by one order or more. If the materials are tight bonded to each other, stress is induced in the optical element 2520 due to variations in temperature, and optical characteristics, such as transmission wave front aberration and birefringence, are degraded. Therefore, it is necessary to use a very soft material as the adhesive 85 for bonding these members to each other to absorb the difference in coefficient of thermal expansion. Experimental findings reveal that if an after cured adhesive has hardness of about 60 in Shore A-scale hardness, virtually no optical stress is induced in the optical element 2520. This very low range hardness is common to after cured adhesives, and is lower by at least one order compared to that of the material (PMMA or PC) of the optical element 2520.

Figure 42:
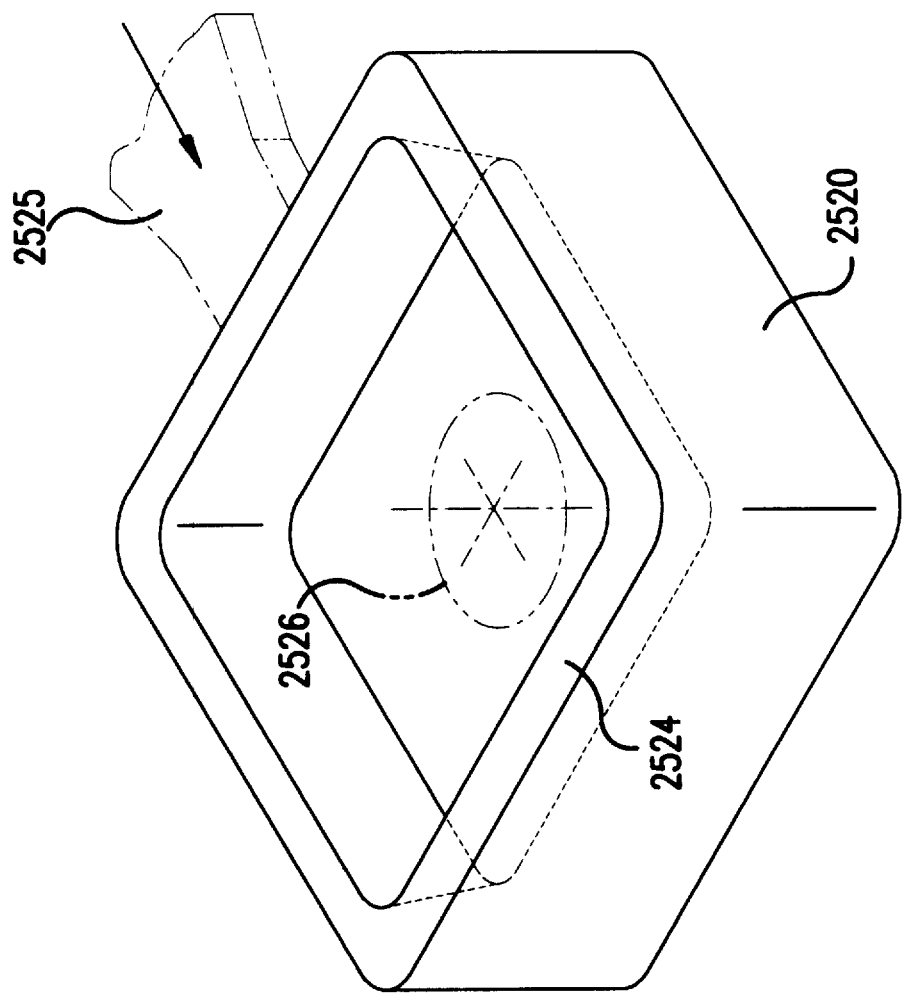
FIG. 42 is a perspective view of an optical element in the optical head in accordance with the eighteenth embodiment.

FIG. 42 shows the appearance of optical element 2520 as separated. Optical element 2520 has a square-shaped bottom face of 5 mm×5 mm, and has a flange 2524 at its periphery. Preferably, the optical element 2520 may be made by injection molding with a mold of a side gate type wherein the mold has a gate 2525 formed on the outer side of the flange 2524, and the gate 2525 is used as an inlet through which a resin is injected in an injection-molding process.

The purpose of the flange 2524 is to increase the rigidity of the optical element as a whole and to make the pressure of the resin uniform when the resin is injected through the gate 2525. The effective area in the optical element 2520, wherein the effective area has to satisfy the requirement with respect to the optical characteristics, is a central portion within a diameter of about 2 mm. If optical stress is induced in this central portion 2526, the optical characteristics such as transmission wave front aberration and birefringence are degraded, and thus significant degradation occurs in reliability of the optical head in recording and reproducing of information. In this embodiment, because the flange 2524 is provided at its periphery, the rigidity is extremely resistant to external force and thermal deformation, and thus the stress that would otherwise be induced in the central portion 2526 is extremely reduced. In addition, in the injection molding process, the flange 2524 causes fluid pressure of the resin to be minimal and uniform. Thus, it becomes possible to eliminate residual stress in the central portion 2526 after injection-molding. This leads to improved optical characteristics.

(Embodiment 19)

Figure 43:
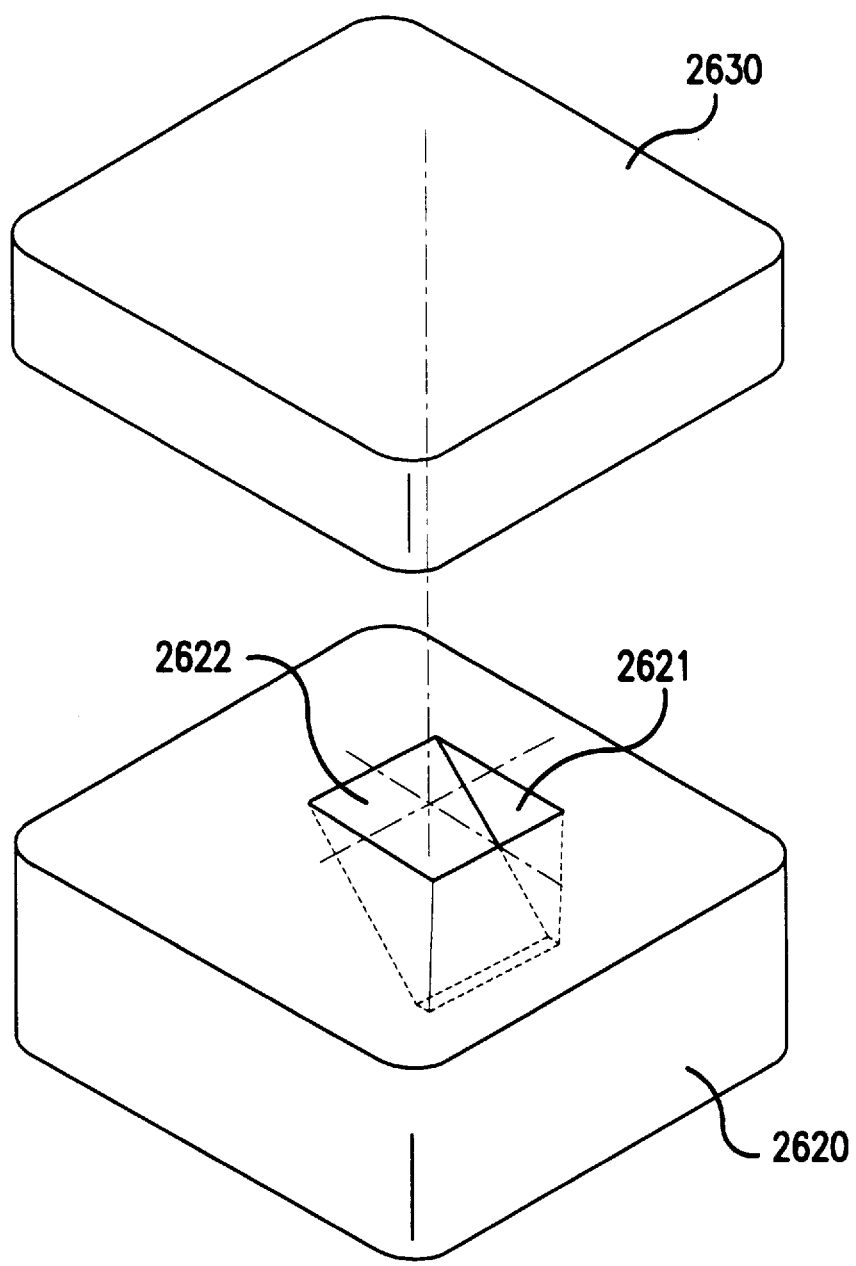
FIG. 43 is a perspective view of a polarizer in accordance with a nineteenth embodiment of the present invention.
Figure 44:
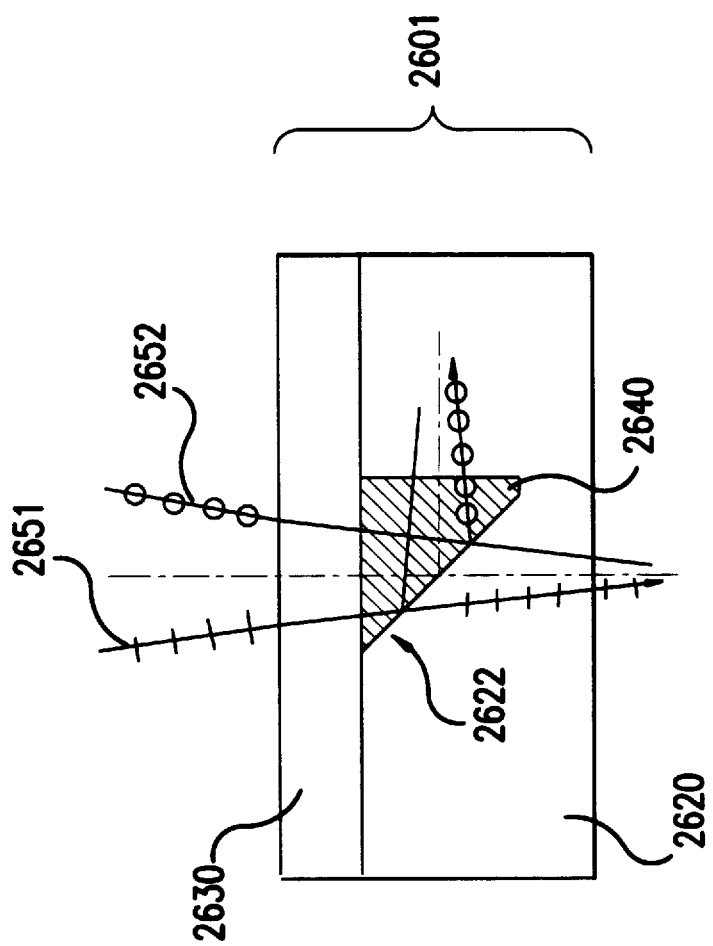
FIG. 44 is a cross-sectional view of the polarizer in accordance with the nineteenth embodiment.
Figure 45:
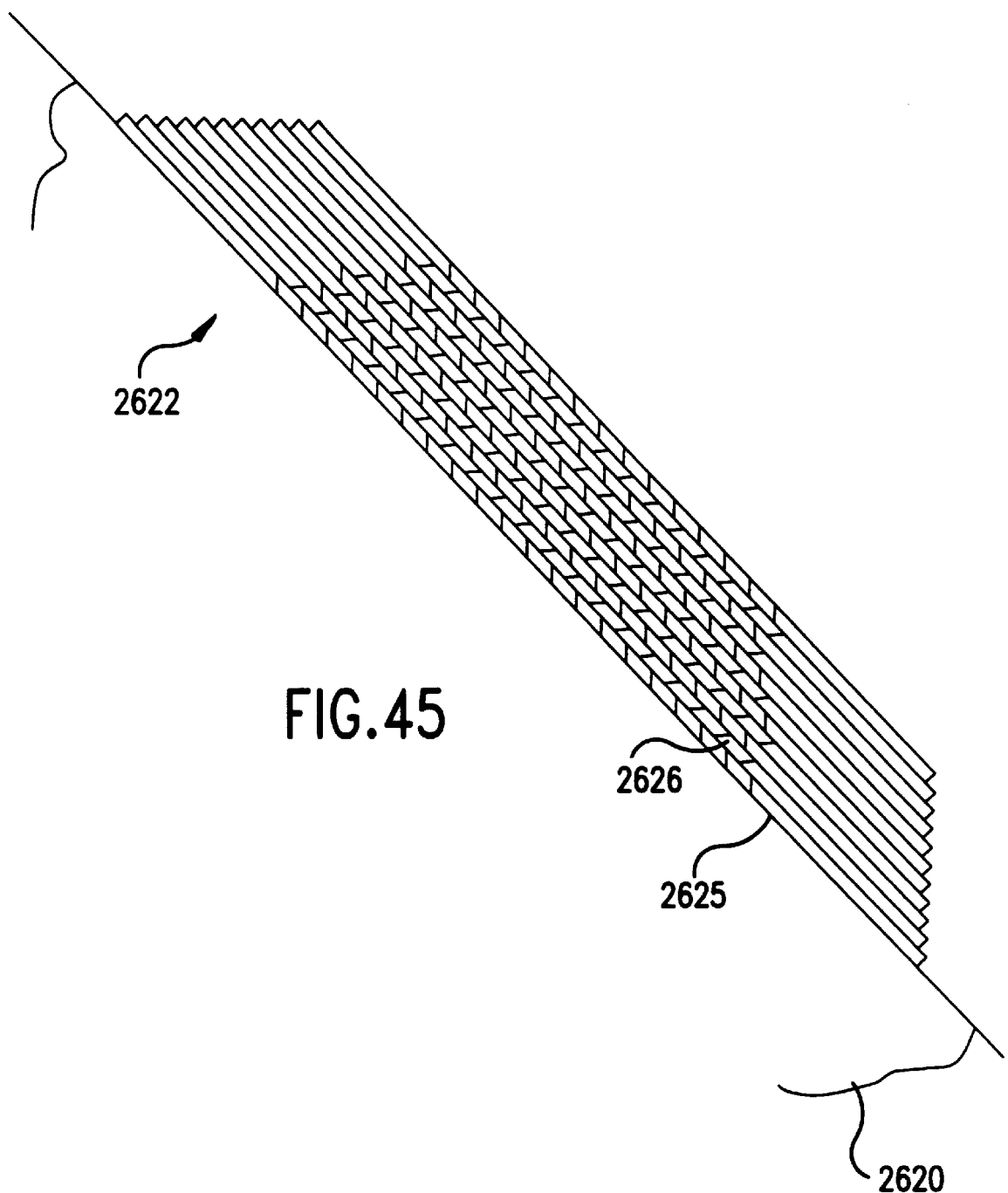
FIG. 45 is a cross-sectional view showing a multi-layer thin film of the polarizer in accordance with the nineteenth embodiment.

FIG. 19 shows a polarizer in accordance with a nineteenth embodiment of the present invention. This polarizer is intended to be used in an optical head of a magneto-optical disk device in which reproduction of a magneto-optical signal is required. The primary object of this embodiment is to provide a simplified method of producing a polarizer for detecting magneto-optical signals. Referring to FIGS. 43, 44, and 45, this embodiment will be described hereinbelow.

Referring to FIG. 43, a first optical element 2620 has a recess 2621 at a central region and has an inclined plane 2622 at an angle about 45°. First optical element 2620 is made of an optical resin such as PMMA (poly methyl methacrylate) by injection molding into an integral form. This method allows production of a large number of optical elements at a low cost. A second optical element 2630 is a flat plate with parallel surfaces. Because this second optical element 2630 includes neither a curved surface nor an inclined surface, it can be made by means of normal cutting of optical glass. Thus, it is also possible to provide a large number of second optical elements at a low cost.

FIG. 44 shows how first and second optical elements 2620 and 2630 are combined to form a polarizer 2601. The recess 2621 of first optical element 2620 is filled with a resin 2640 and then first optical element 2620 is covered with the second optical element 2630. The chemical composition of the resin 2640 is preferably adjusted so that, after cured, it may have a refractive index of about 1.5, which is similar to that of the first and second optical elements. In a situation where the first and second optical elements are combined into a single piece, the resin 2640 filled in the recess 2621 acts as a triangular prism. A preferable resin 2640 for use in this embodiment is a UV (ultraviolet)-hardening resin that is cured by UV irradiation after the optical elements are combined. However, the present invention is not limited to the use of UV resin. Alternatively, a thermosetting resin or the like may also be used.

As shown in FIG. 45, a multi-layer dielectric thin film is coated (by means of evaporation) either on inclined plane 2622 or on the whole area of first optical element 2620, wherein the multi-layer dielectric thin film consists of dielectric layers A 2625 and dielectric layers B 2626 that are deposited alternately on one another. This evaporation method is commonly known as multi-coating. In view of the fact that the resin, for example, PMMA used as a substrate material, that is, first optical element 2620, has a very low thermal deformation temperature, such as 110° C., which is extremely lower than the deformation temperature of glass, it is preferable that the substrate temperature is kept less than 100° C. during the evaporation process. Because, the resin has a large thermal expansion coefficient, it is necessary to carefully select evaporation materials to avoid cracking due to the strain introduced by the stress between the evaporated material and the substrate. An example of preferable materials is as follows:

Dielectric A: $MgF_2$ (magnesium fluoride), Refractive index =1.4

Dielectric B: ZnS (zinc sulfide), Refractive index=2.2

These dielectrics are alternately deposited with thickness of 0.3–0.4 λ (λ is a wavelength of light to be used, which is about 780 nm) for each layer so that the sum of the differences in transmission ratio at each interface with respect to P-polarization or S-polarization components results in desired polarization transmission characteristics as a whole.

With this arrangement, the portion filled with the resin 2640 as shown in FIG. 44 and the first optical element 2620 act as a so-called polarizing beam splitter via the multi-layer thin film (2625, 2626). Experimental results reveal that the optimized total number of deposited thin layers including dielectrics A and B is in the range of 10 to 20 layers. Under this condition, it is possible to obtain 500:1 as an extinction ratio, that is, the ratio of the transmission ratio associated with S-polarization to the transmission ratio associated with P-polarization.

The combination of deposited materials shown above is just one example which shows neither cracking nor variations in characteristics with variation in temperature. Thus, it is possible to obtain a polarizer 2601 with these materials that can be used in practical applications. However, to ensure that a large enough extinction ratio may be obtained, it is necessary that after assembling, there occurs no birefringence due to the residual stress in the resin 2640. Therefore, in this embodiment, annealing is carried out at the end of the production process to remove residual stress in the resin 2640. An example of preferable annealing condition is for 1 hour at 70° C.

It should be noted that the above-mentioned extinction ratio varies depending on the incident angle θ (around 45°) of the light incident on the polarizer 2601 with the above configuration. That is, if the incident angle θ varies, then the effective thicknesses of dielectrics A and B vary. Thus, variations occur in the reflection and transmission characteristics for light. When it is assumed that the control is accomplished to obtain the optimum thickness, optics simulation and experiments show that the incident angle measured in the polarizer 2601 should be within +/−9° to obtain the minimum extinction ratio (about 50:1 or larger) required to detect magneto-optical signals. This tolerable maximum incident angle corresponds to a conversion light beam (or divergent light beam) with NA=0.15 where NA is a numerical aperture in the medium.

In addition to the simple production method, the polarizer 2601 in accordance with this embodiment has a further great advantage that the requirement for the dimensional accuracy of optical element 2620, in particular, the requirement for the flatness of inclined plane 2622 is extremely relaxed compared to that in the case of a polarizing beam splitter made by conventional cutting of glass. This is because even if the flatness of inclined plane 2622 is not good, the resin 2640 fills the irregularity. For example, when a difference exists between the refractive index of resin 2640 and optical element 2620 by about 0.03, if the irregularity of the surface of inclined plane 2622 is less than about 20 $\mu$m, no problems occur in optical characteristics. This means that the tolerance requirement is relaxed by a factor of about 20 compared to a polarizing beam splitter of a conventional type using a prism. Furthermore, parts can be produced by injection molding and the outer dimensions can also be made very small. This means that it is possible to realize a very small optical system for detection when the polarizer is applied to an optical head for detecting magneto-optical signals.

In the example described above, recessed inclined plane 2622 is molded with resin 2640. Alternatively, if a good sealant is available, liquid such as silicone oil may be used as a filling material to obtain similar functions. In this case, it is easy to avoid the problem of birefringence that should be carefully avoided where resin 2640 is used.

(Embodiment 20)

Figure 46:
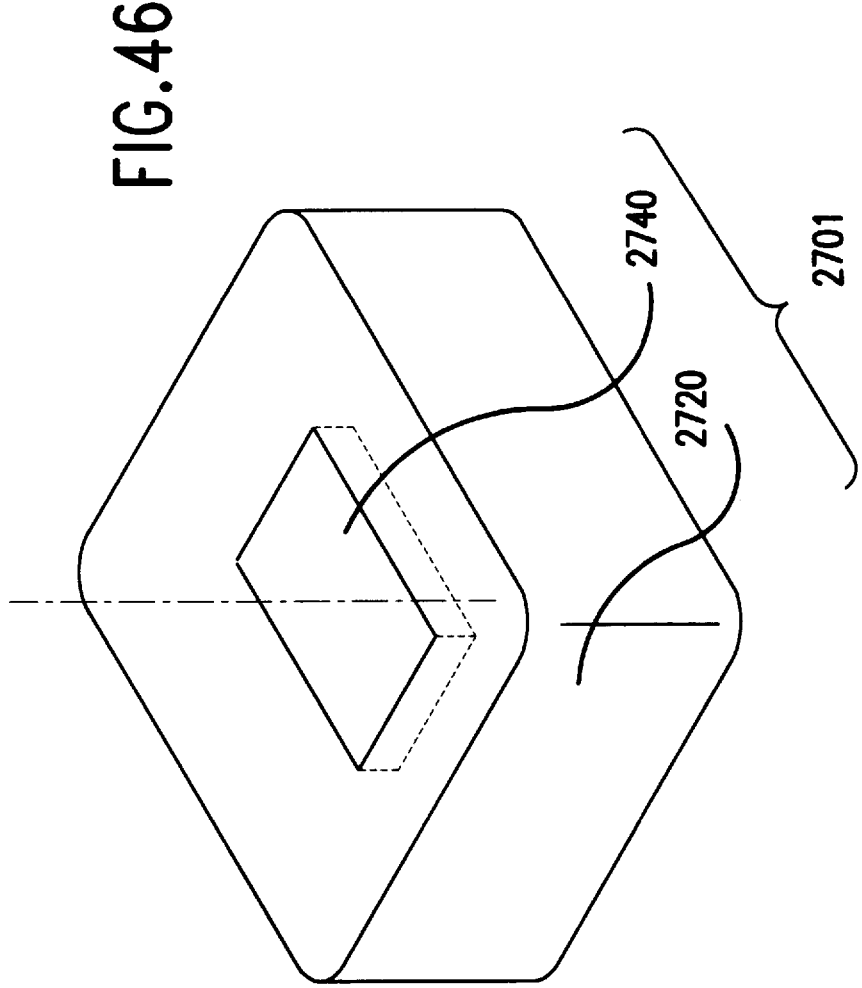
FIG. 46 is a perspective view of a polarizer in accordance with a twentieth embodiment of the present invention.

FIG. 46 shows another type of polarizer in accordance with a twentieth embodiment of the present invention. In this embodiment, the polarizing beam splitter in embodiment 19 is replaced with a polarizing film or polarizing plate.

Referring to FIG. 46, an optical element 2720 made by molding with an optical resin is shown wherein a polarizing plate 2740 is fitted in a recessed portion and fixed there. Preferably, polarizing plate is made by incorporating small silver particles into a glass plate and heating and extending it. This type of polarizing plate has good performance in extinction ratio. Alternatively, a polarizing film can be made by extending a film containing iodine. However, in general, polarizing films of this type are poor in heat-resisting properties. Films of this type are extended at a high temperature and later they shrink due to residual stress that leads to degradation in polarization performance.

The advantage of this embodiment is that a polarizing plate or polarizing film is backed with an optical element 2720 that is much stronger than the polarizing plate or polarizing film. Thus, shrinkage does not readily occur even in a high temperature environment. Thus, it becomes possible to obtain a polarizer 2701 exhibiting good performance in environmental resistance. However, if a slight shear exists in an adhesive layer for combining optical element 2720 with polarizing plate or polarizing film 2740, it is possible that the polarizing plate or polarizing film 2740 will shrink slightly, which may lead to aging. To avoid this, in this embodiment, annealing is carried out after the assembly process to relax the residual stress in order to avoid aging. A preferable annealing condition is, for example, for 1 hour at 70°.

(Embodiment 21)

A twenty-first embodiment is an application of a polarizer shown in embodiment 19 to an optical head for detecting magneto-optical signals that will be described hereinbelow referring to FIGS. 47, 48, and 49.

Figure 47:
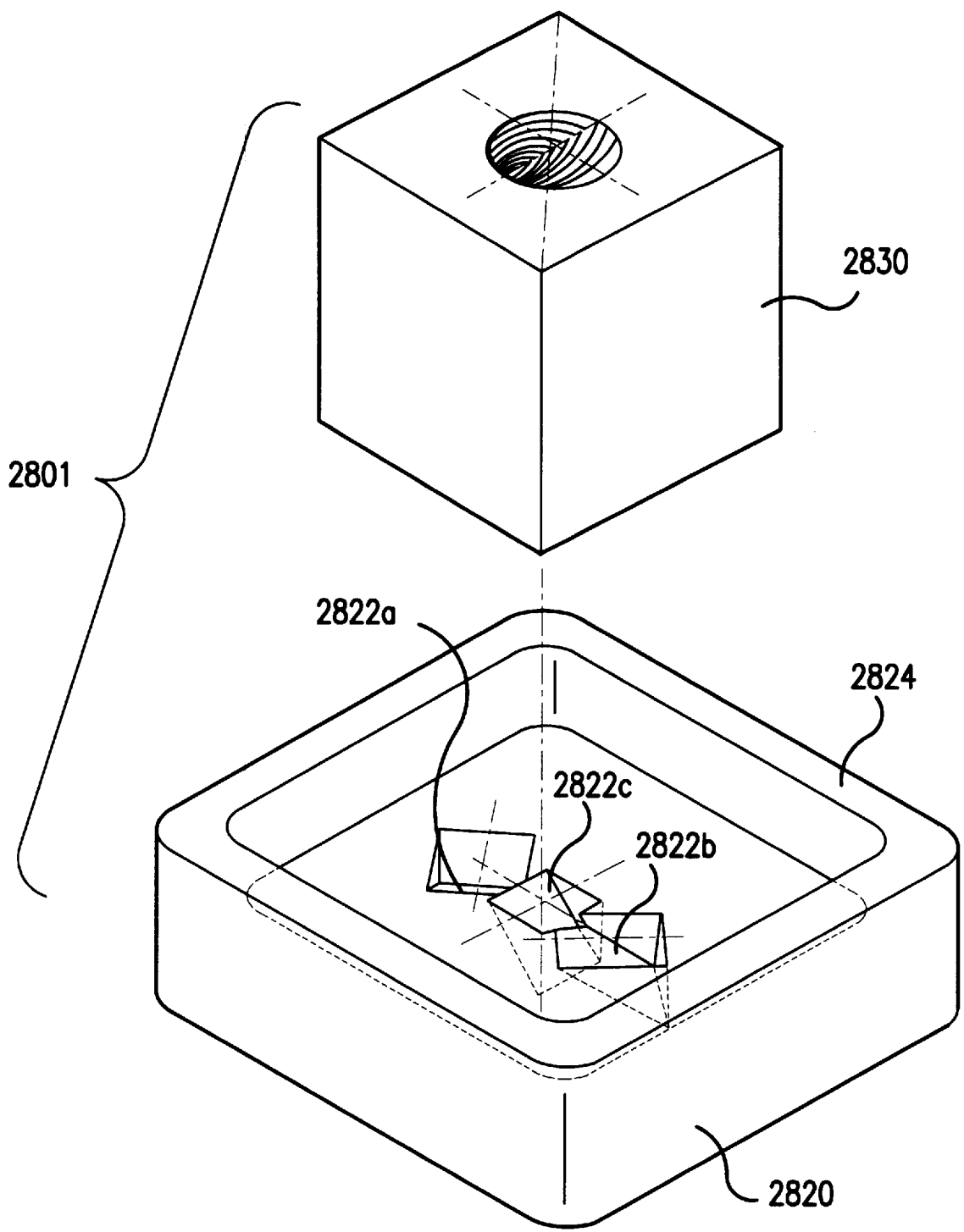
FIG. 47 is a perspective view of a polarizer of an optical head in accordance with a twenty-first embodiment of the present invention.
Figure 48:
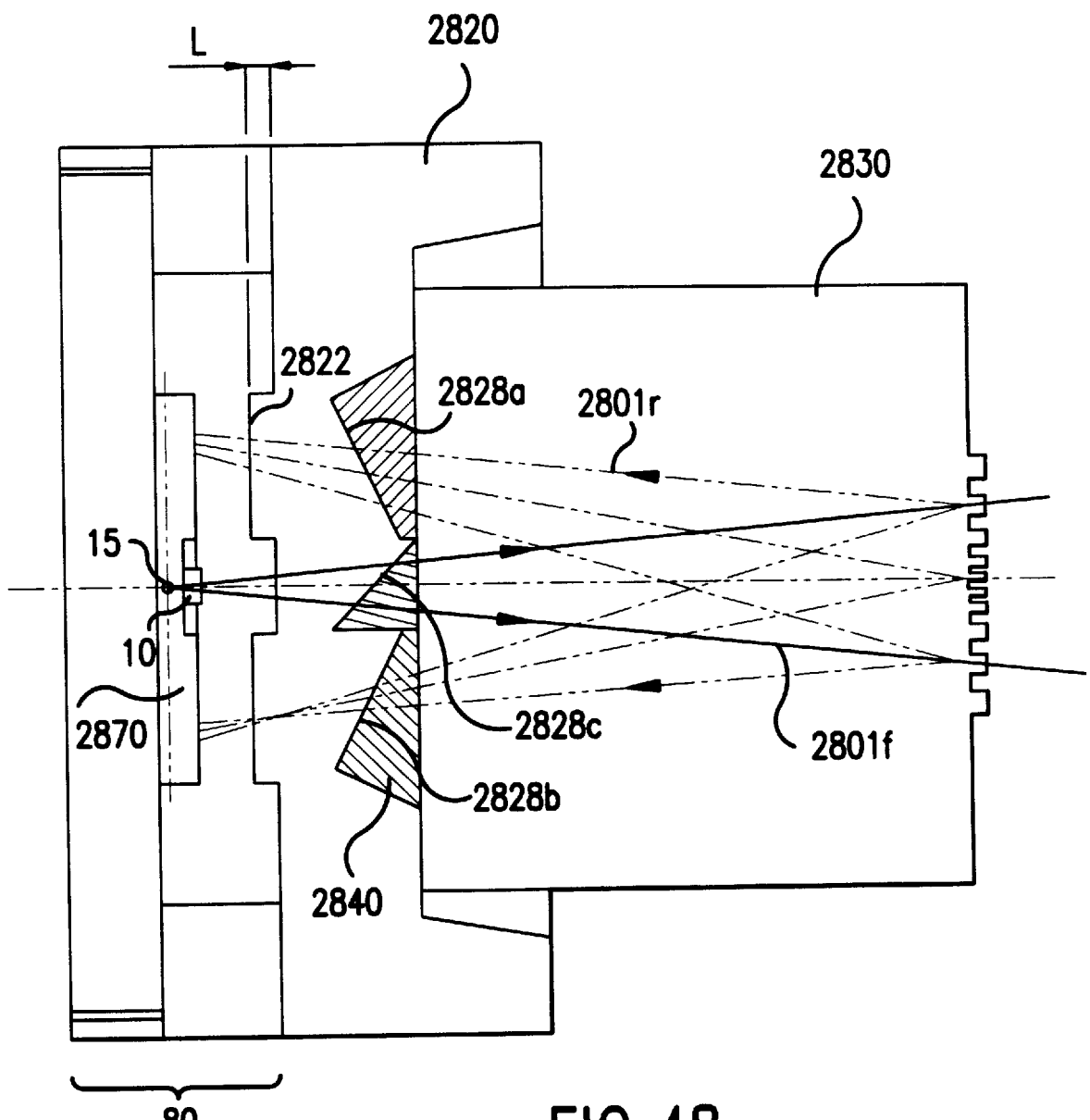
FIG. 48 is a side view of the optical head in accordance with the twenty-first embodiment.

In FIG. 47, there is shown an optical element 2820 similar to the optical element 2620 described in embodiment 19, except that there are provided three recessed inclined planes 2822*a*, 2822*b*, and 2822*c* that are formed in different directions from each other. Furthermore, instead of the second optical element 2630 in embodiment 19, a holographic element 2830 is used to construct a polarizer 2801. Thus, in this embodiment, the holographic element serves the combined functions of a holographic element and a second optical element. All three recessed inclined planes 2822*a*–2822*c* are filled with a resin having a refractive index of about 1.5, which is equal to that of the optical element 2820. FIG. 48 shows an optical head as assembled. The optical element 2820 is characterized in that it has a first function to act as a polarizing splitter, and a second function to adjust the optical lengths of returning light beams as compared to embodiment 14 where the optical element only acts to adjust the lengths of returning light beams (FIG. 27).

Figure 49:
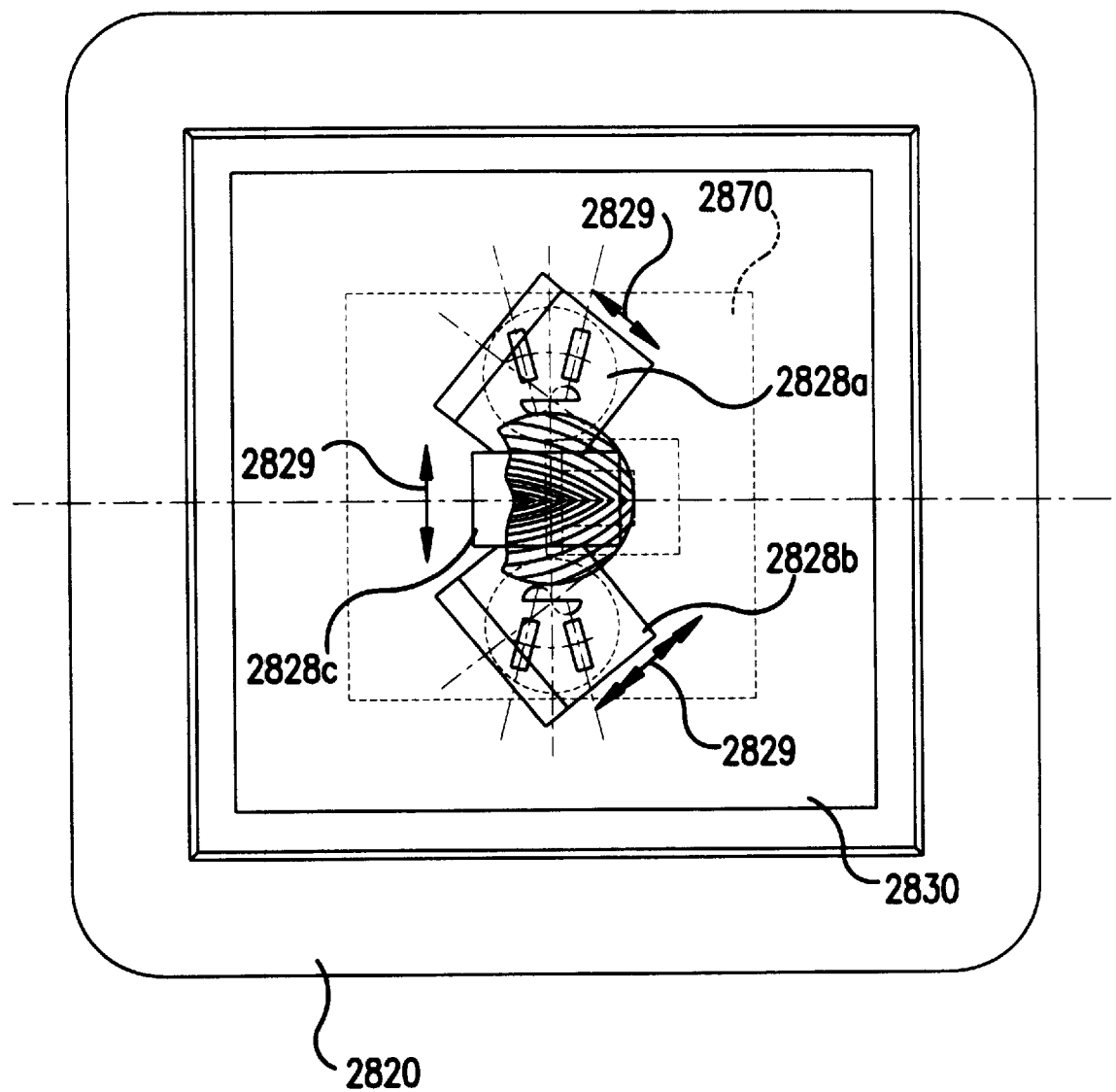
FIG. 49 is a plan view of the optical head in accordance with the twenty-first embodiment.

FIG. 49 is a plan view of the optical head seen in the direction of the optical axis, in which each part some parts are shown in phantom for clarity. In FIG. 49, the arrows 2829 indicate the direction of the inclined plane, that is, the polarization direction of the transmitting light. The inclined plane 2828*c* at the central portion has a direction along a junction interface of a light emitting device 10, or, in other words, along a plane of polarization. On the other hand, the inclined planes 2828*a* and 2828*b* on each side are formed in the directions rotated by about 45° from the direction of the inclined plane 2828*c*.

In this embodiment, it is assumed that a magneto-optical disk is used as an optical recording medium (not shown). Therefore, the optical head is arranged such that it detects the Kerr rotation angle as a modulating component, the Kerr rotation being induced on the returning light beam 2801*r* when the light beam is reflected from the optical medium. The light beam incident on an optical recording medium is planar polarized light. In the case of this embodiment, a light beam with P-polarization with respect to the inclined plane 2828*c* is used. Therefore, a forward light beam (2801*f* in FIG. 48) can pass through the inclined plane 2828*c* with almost no loss. In the returning path (there exist four returning light beams in total), pairs of the returning light beams 2801*r* try to pass through the inclined planes 2828*a* and 2828*b*. However, because the inclined planes 2828*a* and 2828*b* are oriented in the directions rotated by about +/−45°, respectively, as described above, it is possible to detect the Kerr rotation angle, that is, the magneto-optical modulation signal component included in the returning light beam 2801r, by performing differential detection on the light beams with +/−45° polarization components, wherein these polarization directions are perpendicular to each other.

Of three recessed inclined planes formed on the optical element 2820, the inclined plane 2828c in the central portion may be deleted without problems in functions. However, from the viewpoint of production method of parts, the central inclined plane is preferably included and a multi-layer dielectric thin film, such as that in embodiment 20, is coated on it. This is because if the inclined plane 2828c is not inclined at all, i.e., an absolutely flat plane, and if a dielectric thin film is coated on it, then the incident angle of forward light beam 2081f becomes zero. Thus plane 2828c reflects a significantly large amount of forward light beam 2801f without transmitting it. To avoid this problem, it is necessary to delete the dielectric thin film on the central portion. However, this requires an accurate and critical masking process. In this sense, the inclined plane 2828c exists as a dummy. However, in addition to its role as a dummy, by making the inclined plane 2828c act as a polarizing splitter or a filter, it is possible to increase extinction ratio associated with the light emitting device 10 and thus the quality of magneto-optical signal can be improved to a certain degree.

(Embodiment 22)

A twenty-second embodiment is an application of a polarizer shown in embodiment 20 to an optical head for detecting magneto-optical signals, which will be described hereinbelow referring to FIGS. 50 and 51.

In this embodiment, the recessed inclined planes 2828a and 2828b for polarization splitting described in embodiment 21 are replaced with polarizing plate 2940a and 2940b. Therefore, the polarization directions of transmitted light associated with polarizing plates 2940a and 2940b shown in FIG. 51 correspond to the directions of inclined planes 2828a and 2828b.

Figure 50:
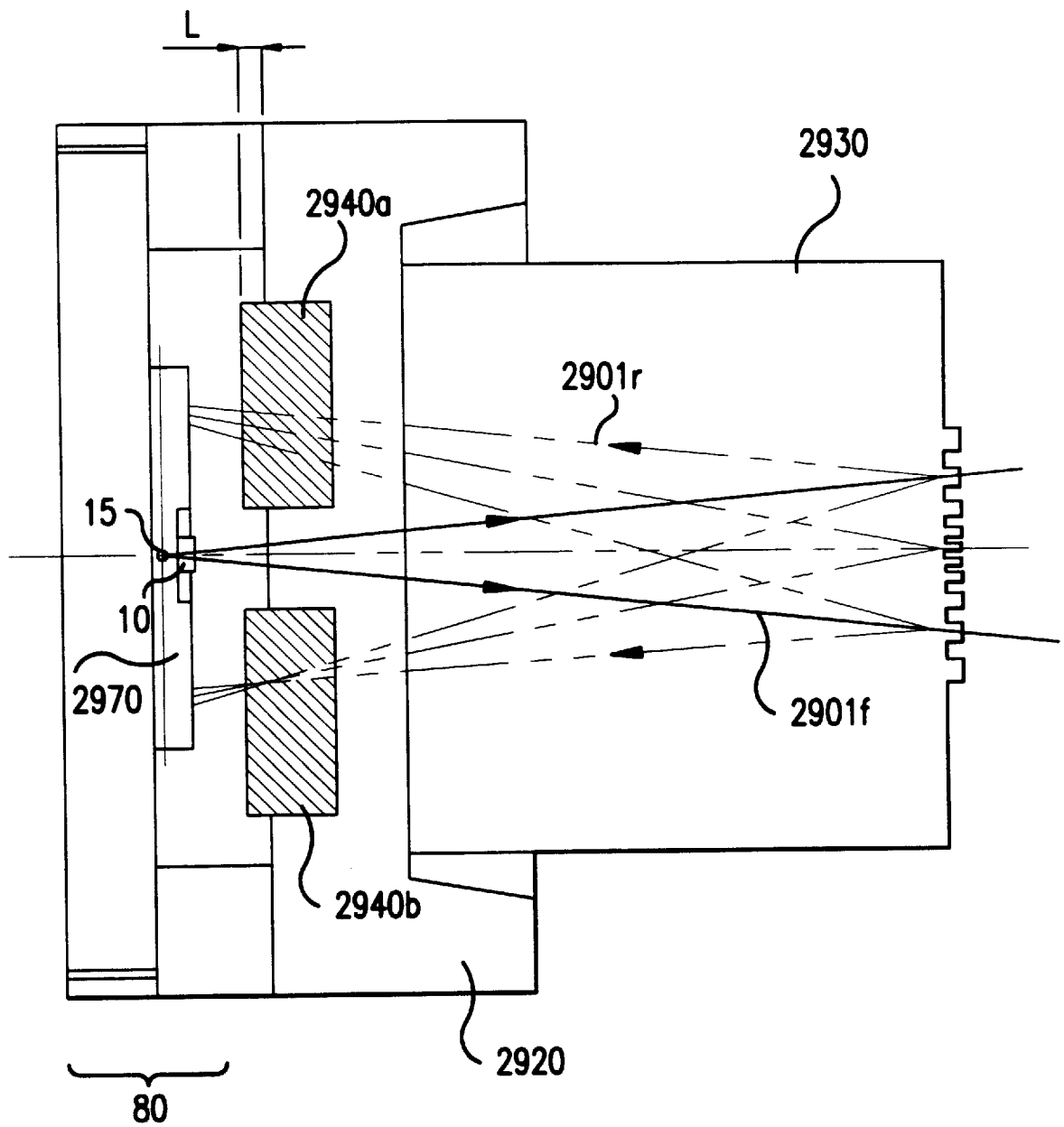
FIG. 50 is a side view of an optical head in accordance with a twenty-second embodiment of the present invention.
Figure 51:
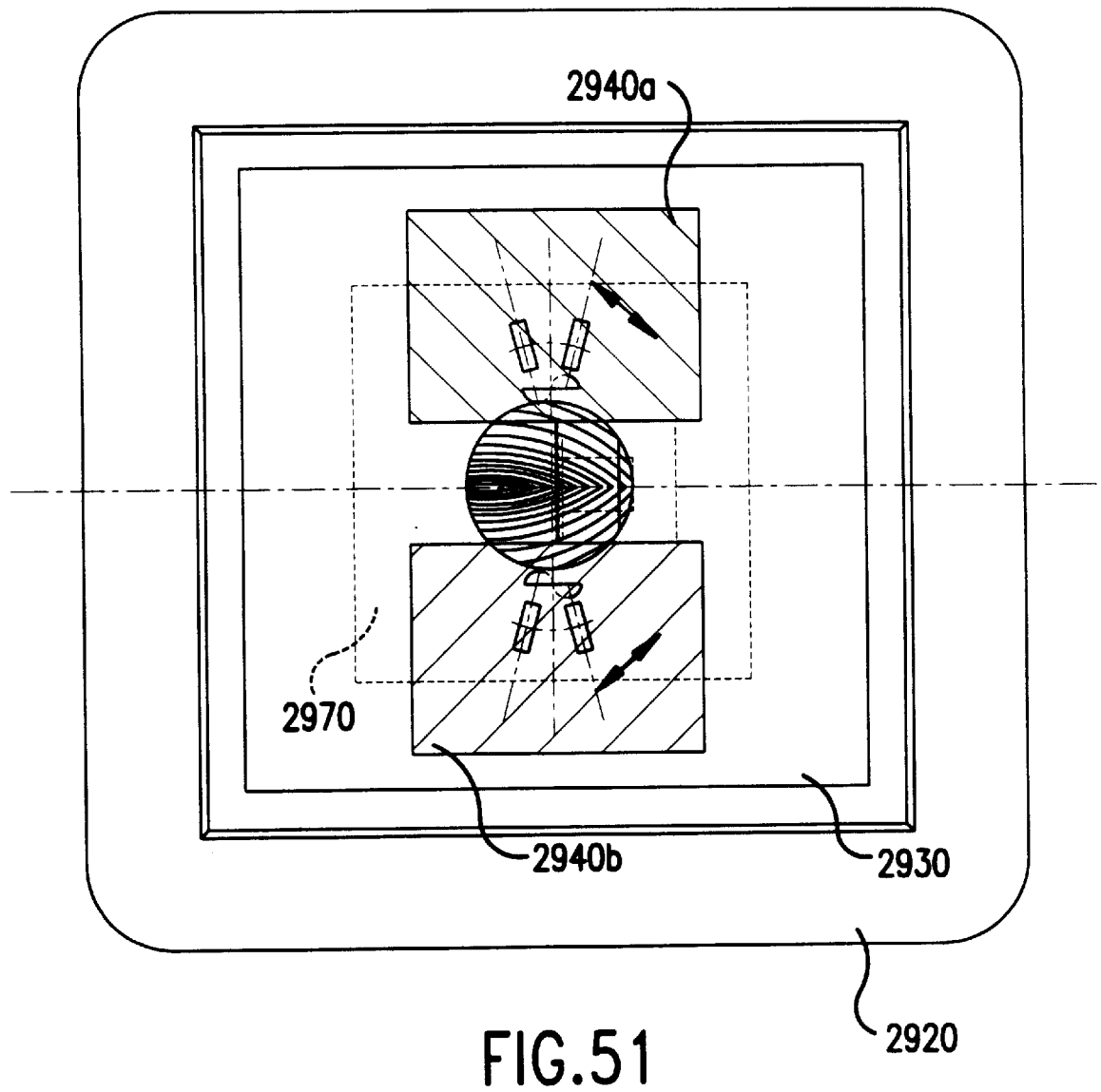
FIG. 51 is a plan view of the optical head in accordance with the twenty-second embodiment.

In this embodiment, as shown in FIG. 50, polarizing plates 2940a and 2940b are fitted in an optical element 2920 and fixed there such that the polarizing plates extend by step L beyond the surface of the optical element 2920. This configuration acts in the same manner as in the case of the step L described in embodiment 14. Thus, the optical length of the returning optical path is compensated so as to cancel the initial offset in the focus error signal.

(Embodiment 23)

Figure 52:
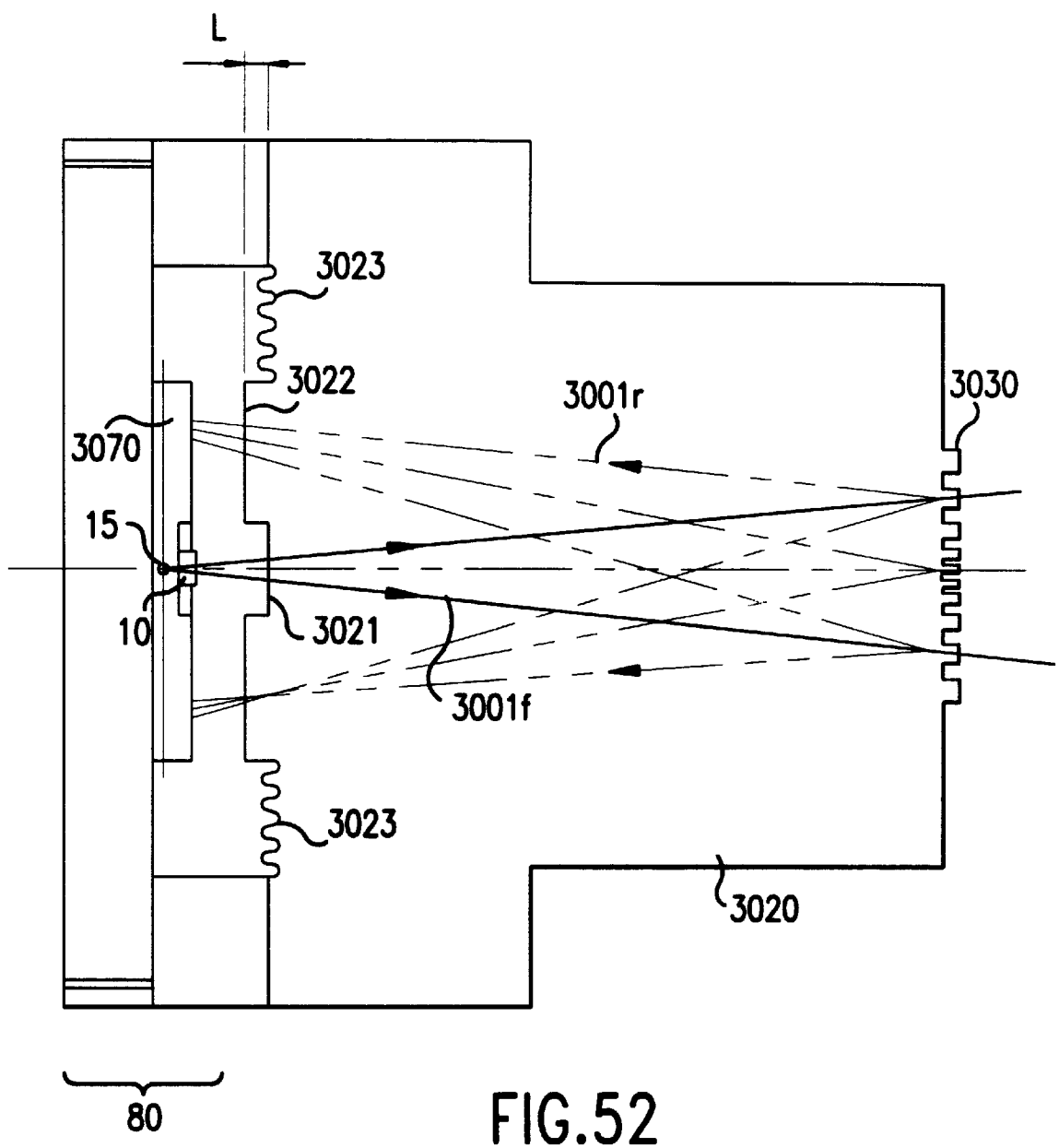
FIG. 52 is a side view of an optical head in accordance with a twenty-third embodiment of the present invention.

A twenty-third embodiment relates to the addition of functions other than those previously described to the optical element 2020, as shown in FIG. 52.

On the side 10 of an optical element 3020, in addition to stepped portions 3022 and a flat portion 3021 with a mirror surface, there is also provided an irregular-reflection surface 3023 with small irregularities, all components being formed in a single piece. The irregular-reflection surface 3023 is a roughened surface with small irregularities in which the bottom-to-peak height and the pith are in the range of about one hundred λ to a few ten times λ (λ is the wavelength of light to be used). When molding is performed, these irregularities are formed by transferring the irregularities in the corresponding portion of the inner surface of a mold, wherein the irregularities of the mold are formed by means of partial granulation or sand-blasting. On the other hand, the flat portion 3021 and stepped portions 3022 should provide high efficiency transmission for the forward and returning light beams 3001f and 3001r in the optical system. To achieve this purpose, flat portion 3021 and stepped portions 3022 have mirror surfaces and more preferably they may be coated with a antireflection film to improve the transmittance.

In optical heads of this type, because a light emitting device 10 and a light receiving device 3070 are arranged in proximity to each other, although the central portion of the divergence light beam emitted by the light emitting device 10 is incident on the entrance pupil of an objective lens (not shown) and utilized, a possibility exists that the other portion of the light beam is reflected from the inside of the optical head and falls on the light receiving device 3070. This is called stray light and it is added to a detected signal, which causes DC noise and further results in degradation of the signal quality. Therefore, it is desirable to avoid stray light as much as possible. To achieve this, the present embodiment provides the irregular-reflection surface 3023 described above to absorb unwanted stray light generated in the optical head. In addition to absorption of the stray light, this irregular-reflection surface 3023 also scatters the stray light not absorbed in various directions so that each light receiving pattern (like 2173 of embodiment 15) on the light receiving device 3070 may receive the same amount of stray light and thus noise does not appear in the various detected signals of the output of differential detection.

If black paint or the like is coated (so-called black coating) on the irregular-reflection surface 3023 to enhance the ability of absorption of the stray light, a more effective result can be obtained as a whole to achieve the purpose of the present embodiment.

(Embodiment 24)

In embodiment 23 described above, the stray light is avoided. In contrast to that, in embodiment 24, peripheral portions of the light beam emitted by the light emitting device that is not used in previous embodiments are effectively used.

Figure 53:
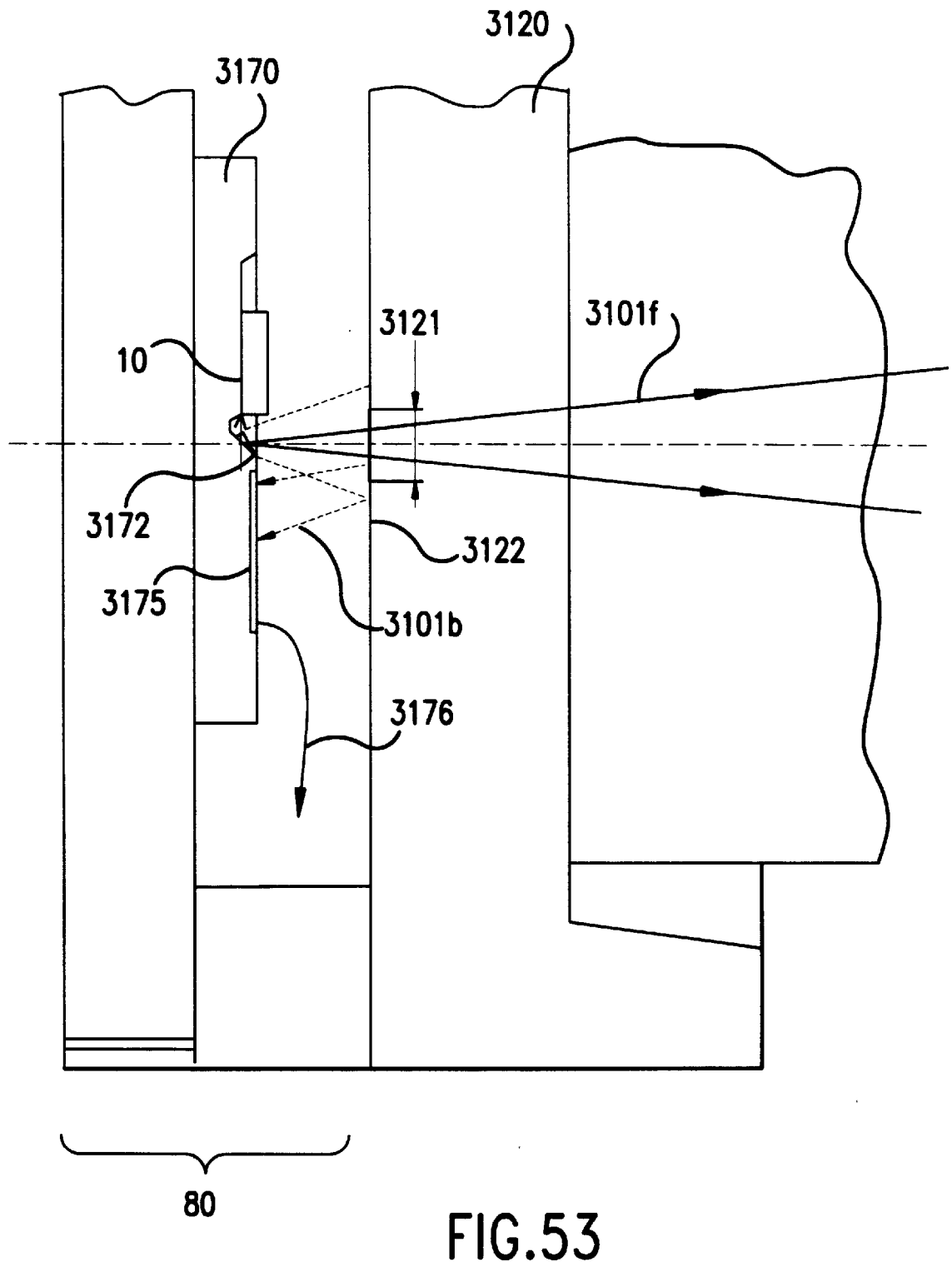

Referring to FIG. 53, the divergence light beam emitted by the light emitting device 10 is reflected from a 45° inclined plane 3172 formed by etching processing in the light receiving device 3170. The central portion of the light beam is incident as a forward light beam 3101f on an optical element 3120. In this embodiment, coating of the antireflection film is applied only in the region 3121 through which the forward light beam 3101f passes. If the antireflection film is formed by means of multi-evaporation (multi-coating), it is possible to obtain a surface with very low reflectance such as 0.5% or less. On the other hand, the non-coating area 3122 with no antireflection film has a reflectance of about 5% based on Fresnel's formula.

A second light receiving element 3175 with a rather large area is integrally formed on the upper surface of the light receiving device 3170 at a location slightly apart from the light emitting device 10. As shown in FIG. 53, the peripheral light beam 3101b reflected from the non-coating area 3122 is received by the second light receiving element 3175. The amount of the peripheral light beam 3101b is proportional to the amount of the forward light beam 3101f, that is, the central portion of the light beam, and to the power of the emitted light emitted by the light emitting device 10. Therefore, by checking the signal (power monitor signal 3176) obtained by performing optical-to-electric signal conversion on the signal received by the second light receiving element 3175, it is possible to monitor the power of the emitted light, that is, it is possible to monitor the power of the light emerging through the objective lens. If the power monitor signal 3176 is fed back to the driving current control circuit (not shown) for the light emitting device 10, an APC (automatic power control) loop can be formed and it becomes possible to precisely control the power of the emitted light emitted from the light emitting device 10, which leads to stable recording and reproduction of information.

It is possible not only to separately use each of the embodiments described above, but to properly combine these embodiments so as to obtain further integration in functions.

As described above, the polarizer and optical element in accordance with the present invention are useful as a component element for use in an optical recording/reproducing device or for use in an optical head that is a key component of an optical recording/reproducing device. In particular, these are very suitable for mass production of small sized and integrated optical heads with a simple configuration. The optical head of such a type makes a great contribution to a reduction of the size of a device for recording and reproducing information on/from a magneto-optical recording medium. Furthermore, a great degree of improvement of performance and great cost reduction can be achieved. The polarizer in accordance with the present invention can be applied not only to an optical recording/reproducing device, but to general optical devices. For example, it can be used as an polarization control element in a liquid crystal display or the like.

What is claimed is:

1. An optical element consisting of a member having a single piece through which converging or diverging forward and returning light beams pass that is configured such that the optical length of said forward light beam is different from that of said returning light beam, said one-piece member including a transparent substrate having at least one inclined plane in a portion of said substrate and a thin polarizing film disposed on said at least one inclined plane;

said forward optical beam and said returning optical beam pass through said member formed in a single piece; and a refracting power associated with a region through which a forward optical beam passes is different from a refracting power associated with a region through which the returning optical beam passes.

2. An optical element according to claim 1, wherein a convex or concave curved surface is formed locally on the surface thereof.

3. An optical head for use in an optical recording device for recording/reproducing information on/from an magneto-optical recording medium, wherein:

a light source and a light receiving device are contained in one package;

both of light from said light source and returning light from said magneto-optic recording medium pass through the same optical member;

a plurality of inclined planes are formed in said optical member at three or more locations;

said plurality of inclined planes are provided with a polarizing optical thin film;

a first inclined plane is disposed in the optical path from said light source such that the polarization direction of an incident light beam may be P-polarization with respect to the inclined plane;

the returning light from said magneto-optical recording medium is incident on a second and third inclined planes;

said second inclined plane is arranged such that the plane containing the optical axis of the incident light and the normal line to said second inclined plane makes an angle of A° with respect to the polarization direction of the light beam from said light source; and said third inclined plane is arranged such that the plane containing the optical axis of the incident light and the normal line to said third inclined plane makes an angle of −A° with respect to the polarization direction of the light beam from said light source.

4. An optical head according to claim 3, wherein the incident angles of light associated with said second inclined plane and said third inclined plane are equal to or larger than 20° and said angle A is about 45°.

5. An optical element consisting of a member having a single piece through which converging or diverging forward and returning light beams pass that is configured such that the optical length of said forward light beam is different from that of said returning light beam, said one-piece member including a transparent substrate having at least one inclined plane in a portion of said substrate and a thin polarizing film disposed on said at least one inclined plane;

at least two different values of refractive indices are partially provided; and said forward light beam and said returning light beam pass through different areas with different refractive indices.

6. An optical element according to claim 5, wherein said optical element is molded with a transparent resin or glass into a single piece, and a step is provided on the surface thereof.

7. An optical element according to claim 5, wherein said optical element comprises at least two discrete parts that are bonded to each other, and in a situation in which said discrete parts are bonded to each other, a step is formed on the surface thereof.

8. An optical head comprising:

an optical element comprised of a one-piece member through which converging or diverging forward and returning light beams pass that is configured such that the optical length of the forward light beam is different from that of the returning light beam, said one-piece member including a transparent substrate having at least one inclined plane in a portion of said substrate and a thin polarizing film disposed on said at least one inclined plane;

a light receiving device disposed behind said optical element such that said light receiving device is approximately opposed to said optical element, said light receiving device receiving the returning light beam reflected from an optical recording medium;

a semiconductor laser light source that generates the forward light beam and is disposed at a position slightly higher or slightly lower than a position of the light receiving surface of said light receiving device; and a housing holding said light receiving device and said light source;

wherein said light receiving device and said light source are sealed between said optical element and said housing.

9. An optical head according to claim 8, further comprising means for generating a focusing error signal by detecting a change in a shape of a spot of said returning light beam formed on said light receiving device.

10. An optical head according to claim 8, wherein:

said optical element is made of a transparent resin;

said optical element has a flange at its periphery; and said flange has a gate for use in injection molding.

11. An optical head according to claim 8, wherein:

said optical element is made of a transparent resin; and an alignment mark for positioning is formed or printed on the primary surface or the back surface of said optical element and on the surface of said light receiving device.

12. An optical head according to claim 8, wherein a diffraction grating or a hologram is formed on the primary surface or the back surface of said optical element.

13. An optical head according to claim 12, wherein said hologram is a blazed hologram which is blazed into the form of triangular teeth with a pitch of diffraction grooves.

14. An optical head according to claim 8, wherein:
said optical element and said housing are fixed to each other via an adhesive; and
the hardness of said adhesive as cured is lower than the hardness of the materials of said optical element and said housing.

15. An optical head for use in an optical recording device for recording/reproducing information on/from a magneto-optical recording medium, comprising:
a semiconductor laser light source;
a light receiving device;
a polarizer;
a transparent substrate formed on said polarizer having at least one inclined plane and a polarizing optical thin film formed on said at least one inclined plane; and
a light beam splitter that splits light into at least two directions, wherein said polarizer is disposed between said light beam splitter and said light receiving device, said light beam splitter is bonded to one surface of said polarizer via a transparent material, and a package containing said light receiving device and said semiconductor laser light source is bonded to the other surface of said polarizer.

16. An optical head according to claim 15, wherein:
a light beam which has passed through said at least one inclined plane reaches said light receiving device, which includes a pair of sensors, and the resultant outputs of the sensors are added together by an adder, circuit, wherein the plane containing the optical axis of the light beam and the normal line to said at least one inclined plane makes an angle of −A° with respect to the plane containing the optical axis of the light beam and its polarization direction;
a light beam which has passed through another inclined plane is sensed by another pair of sensors of said light sensing device and the resultant outputs of the sensors are added together by another adder circuit, wherein the plane containing the optical axis of the light beam and the normal line to said inclined plane makes an angle of A° with respect to the plane containing the optical axis of the light beam and its polarization direction; and
the difference between said addition outputs is detected by a differential amplifier to reproduce a magneto-optical signal.

17. An optical head according to claim 11 wherein said light beam splitter is a hologram consisting of a diffraction grating.

18. An optical head according to claim 17, wherein said hologram is a blazed hologram on which blazing processing is performed.

19. An optical head according to claim 15, wherein said polarizer is bonded to said light beam splitter with a transparent material.

20. An optical head according to claim 15, wherein said polarizer is formed on one surface of one optical member and said light beam splitter is formed on the other surface.

21. An optical head according to claim 15, further comprising an optical element, said optical element being divided into a mirror-finished region and an irregular reflection region with small irregularities, wherein a forward light beam and returning light beam pass through said mirror-finished region.

22. An optical head according to claim 8, further comprising an optical element, said optical element being divided into a region coated with an antireflection film and a non-coating region coated with no antireflection film, wherein:
the central portion of a divergence light beam emitted by a light emitting device passes through said region coated with an antireflection film;
a portion of said divergence light beam is reflected from said non-coating region; and
there is provided a second light receiving device for receiving said reflected light so as to detect the emitted light power.

23. An optical head according to claim 22, wherein:
a first light receiving device receives a returning light beam reflected from an optical recording medium; and
said first and second light receiving devices are formed on a substrate in the form of a single piece.

* * * * *